(12) United States Patent
Rocklitz

(10) Patent No.: US 10,058,812 B2
(45) Date of Patent: *Aug. 28, 2018

(54) PLEATED FILTRATION MEDIA HAVING TAPERED FLUTES

(75) Inventor: Gary J. Rocklitz, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 706 days.

This patent is subject to a terminal disclaimer.

(21) Appl. No.: 13/013,631

(22) Filed: Jan. 25, 2011

(65) Prior Publication Data

US 2011/0186504 A1 Aug. 4, 2011

Related U.S. Application Data

(60) Provisional application No. 61/298,109, filed on Jan. 25, 2010.

(51) Int. Cl.
| | |
|---|---|
| *B01D 25/26* | (2006.01) |
| *B01D 29/07* | (2006.01) |
| *B01D 46/52* | (2006.01) |
| *B01D 46/00* | (2006.01) |

(52) U.S. Cl.
CPC ......... *B01D 46/525* (2013.01); *B01D 25/26* (2013.01); *B01D 46/0001* (2013.01); *B01D 46/522* (2013.01)

(58) Field of Classification Search
CPC .... B01D 25/26; B01D 46/522; B01D 46/525; B01D 46/0001; B01D 46/523; B01D 46/521; B01D 46/023; B01D 29/21; B01D 29/07

USPC ......... 210/493.1, 493.3, 493.5; 55/521, 497, 55/DIG. 12

See application file for complete search history.

(56) References Cited

U.S. PATENT DOCUMENTS

| | | | |
|---|---|---|---|
| 2,058,669 | A | 10/1936 | Dollinger |
| 2,514,505 | A | 7/1950 | Morton |
| 2,514,506 | A | 7/1950 | Mueller |
| 2,599,604 | A | 6/1952 | Bauer et al. |
| 2,908,350 | A | 10/1959 | Buckman |
| 2,960,145 | A | 11/1960 | Ruegenberg |

(Continued)

FOREIGN PATENT DOCUMENTS

| | | |
|---|---|---|
| CA | 557255 | 5/1958 |
| CN | 1220617 | 6/1999 |

(Continued)

OTHER PUBLICATIONS

Non Final Office Action mailed Oct. 5, 2011 in co-pending U.S. Appl. No. 12/508,944, "Pleated Filtration Media, Media Packs, Filter Elements, and Methods for Filtering Fluids" (17 pages).

(Continued)

*Primary Examiner* — Madeline Gonzalez
(74) *Attorney, Agent, or Firm* — Pauly, DeVries Smith & Deffner LLC

(57) ABSTRACT

Pleated filtration media, media packs, filter elements, and methods for filtering fluid are provided which contain three dimensional tapered flutes in the media surface, the flutes configured to improve filter performance. In certain embodiments the flutes have defined peaks that reduce masking between adjacent pleats, the flutes have ridges along their length to modify flute cross sectional geometry, and/or the flutes provide for volume asymmetry across the media.

26 Claims, 35 Drawing Sheets

(56) References Cited

U.S. PATENT DOCUMENTS

| | | | |
|---|---|---|---|
| 2,980,208 A | 4/1961 | Neumann | |
| 3,025,963 A | 3/1962 | Bauer | |
| 3,053,309 A | 9/1962 | Saunders et al. | |
| 3,058,594 A | 10/1962 | Hultgren | |
| 3,062,378 A | 11/1962 | Briggs | |
| 3,077,148 A | 2/1963 | Mumby | |
| 3,146,197 A | 8/1964 | Getzin | |
| 3,198,336 A | 8/1965 | Hyslop | |
| 3,372,533 A | 3/1968 | Rummel | |
| 3,531,920 A | 10/1970 | Hart | |
| 3,799,354 A | 3/1974 | Buckman et al. | |
| 3,807,150 A | 4/1974 | Maracle | |
| 3,948,712 A | 4/1976 | Stannard | |
| 4,102,792 A | 7/1978 | Harris | |
| 4,154,688 A | 5/1979 | Pall | |
| 4,268,290 A * | 5/1981 | Barrington | 55/521 |
| 4,290,889 A | 9/1981 | Erickson | |
| 4,310,419 A | 1/1982 | Nara et al. | |
| 4,389,315 A | 6/1983 | Crocket | |
| 4,410,316 A | 10/1983 | Yoke | |
| 4,410,427 A | 10/1983 | Wydeven | |
| 4,439,321 A | 3/1984 | Taki et al. | |
| 4,452,619 A | 6/1984 | Wright et al. | |
| 4,488,966 A | 12/1984 | Schaeffer | |
| 4,537,812 A | 8/1985 | Elbers | |
| 4,589,983 A | 5/1986 | Wydevan | |
| 4,615,804 A | 10/1986 | Wright | |
| 4,617,072 A | 10/1986 | Merz | |
| 4,652,286 A | 3/1987 | Kusuda et al. | |
| 4,732,678 A | 3/1988 | Humbert, Jr. | |
| 4,735,720 A | 4/1988 | Kersting | |
| 4,766,453 A | 8/1988 | Shiokama et al. | |
| 4,925,561 A * | 5/1990 | Ishii et al. | 210/493.3 |
| 4,954,249 A | 9/1990 | Gero et al. | |
| 5,002,666 A | 3/1991 | Matsumoto et al. | |
| 5,049,326 A | 9/1991 | Matsumoto et al. | |
| 5,066,400 A | 11/1991 | Rocklitz et al. | |
| 5,080,790 A | 1/1992 | Widmann | |
| 5,089,202 A * | 2/1992 | Lippold | 264/145 |
| 5,120,296 A | 6/1992 | Yamaguchi et al. | |
| 5,128,039 A | 7/1992 | Gabrielson | |
| 5,240,540 A | 8/1993 | Matsumoto et al. | |
| 5,262,899 A | 11/1993 | Iizuka | |
| 5,274,413 A | 12/1993 | Nomura et al. | |
| 5,290,447 A | 3/1994 | Lippold | |
| 5,346,519 A | 9/1994 | Williams et al. | |
| 5,419,796 A | 5/1995 | Miller | |
| 5,435,870 A | 7/1995 | Takagaki et al. | |
| 5,487,224 A | 1/1996 | Gabalda et al. | |
| 5,522,909 A | 6/1996 | Haggard | |
| 5,562,825 A | 10/1996 | Yamada et al. | |
| 5,591,329 A | 1/1997 | Davidson | |
| 5,613,992 A | 3/1997 | Engel | |
| 5,766,289 A | 6/1998 | Haggard | |
| 5,772,883 A | 6/1998 | Rothman et al. | |
| D396,098 S | 7/1998 | Gillingham | |
| 5,792,247 A | 8/1998 | Gillingham et al. | |
| D398,046 S | 9/1998 | Gillingham | |
| 5,804,014 A | 9/1998 | Kahler | |
| 5,804,073 A | 9/1998 | Horst | |
| D399,944 S | 10/1998 | Gillingham | |
| 5,820,646 A | 10/1998 | Gillingham et al. | |
| 5,851,250 A | 12/1998 | Sugie et al. | |
| 5,871,641 A | 2/1999 | Davidson | |
| 5,882,288 A | 3/1999 | Paul et al. | |
| 5,888,262 A | 3/1999 | Kahler | |
| 5,895,574 A | 4/1999 | Friedmann et al. | |
| 5,902,364 A | 5/1999 | Tokar et al. | |
| 5,904,793 A | 5/1999 | Gorman et al. | |
| 5,970,609 A | 10/1999 | Shioda | |
| 5,987,399 A | 11/1999 | Wegerich et al. | |
| 6,039,778 A | 3/2000 | Coulonvaux | |
| 6,048,298 A | 4/2000 | Paul et al. | |
| D428,128 S | 7/2000 | Gillingham | |
| 6,089,761 A | 7/2000 | Sakurai et al. | |
| 6,179,890 B1 | 1/2001 | Ramos | |
| D437,401 S | 2/2001 | Ramos | |
| 6,190,432 B1 | 2/2001 | Gieseke et al. | |
| 6,202,038 B1 | 3/2001 | Wegerich et al. | |
| 6,210,469 B1 | 4/2001 | Tokar | |
| 6,235,195 B1 | 5/2001 | Tokar | |
| 6,238,561 B1 | 5/2001 | Liu et al. | |
| 6,348,084 B1 | 2/2002 | Gieseke | |
| 6,348,085 B1 | 2/2002 | Tokar | |
| 6,350,291 B1 | 2/2002 | Gieseke | |
| 6,350,296 B1 | 2/2002 | Warner | |
| 6,402,800 B1 | 6/2002 | Rey | |
| 6,433,748 B1 | 8/2002 | Ekelund | |
| 6,517,598 B2 | 2/2003 | Anderson | |
| 6,544,310 B2 | 4/2003 | Badeau et al. | |
| 6,554,503 B2 | 4/2003 | Imanari et al. | |
| 6,582,490 B2 | 6/2003 | Miller et al. | |
| 6,598,749 B2 | 7/2003 | Paul et al. | |
| 6,610,117 B2 | 8/2003 | Gieseke et al. | |
| 6,610,126 B2 | 8/2003 | Xu | |
| 6,620,223 B2 | 9/2003 | Bloomer | |
| 6,673,136 B2 | 1/2004 | Gillingham et al. | |
| 6,685,833 B2 | 2/2004 | Lippold | |
| 6,743,270 B2 | 6/2004 | Oda et al. | |
| 6,746,518 B2 | 6/2004 | Gieseke et al. | |
| 6,783,565 B2 | 8/2004 | Gieseke et al. | |
| 6,790,397 B2 | 9/2004 | Richerson et al. | |
| 6,846,342 B2 | 1/2005 | Mertz et al. | |
| 6,848,435 B2 | 2/2005 | Kitamura et al. | |
| 6,893,282 B2 | 5/2005 | Schadhauser | |
| 6,946,012 B1 | 9/2005 | Miller | |
| 6,953,124 B2 | 10/2005 | Winter et al. | |
| 6,955,775 B2 | 10/2005 | Chung et al. | |
| 6,966,940 B2 | 11/2005 | Krisko et al. | |
| 6,986,842 B2 | 1/2006 | Bortnik et al. | |
| 7,070,642 B2 | 7/2006 | Scott et al. | |
| 7,122,068 B2 | 10/2006 | Tate et al. | |
| 7,149,153 B2 | 12/2006 | Meylan | |
| 7,166,216 B2 | 1/2007 | Woodard, Jr. et al. | |
| 7,213,595 B2 | 5/2007 | Capon et al. | |
| 7,235,115 B2 | 6/2007 | Duffy | |
| 7,258,719 B2 | 8/2007 | Miller et al. | |
| 7,270,693 B2 | 9/2007 | Chung et al. | |
| 7,311,747 B2 | 12/2007 | Adamek et al. | |
| 7,329,326 B2 | 2/2008 | Wagner et al. | |
| 7,396,375 B2 | 7/2008 | Nepsund | |
| 7,396,376 B2 | 7/2008 | Schrage et al. | |
| 7,425,227 B1 | 9/2008 | Hutchison et al. | |
| 7,438,812 B2 | 10/2008 | Denton et al. | |
| 7,488,365 B2 | 2/2009 | Golden et al. | |
| 7,556,663 B2 | 7/2009 | Niakan | |
| 7,588,619 B2 | 9/2009 | Chilton | |
| 7,622,063 B2 | 11/2009 | Brandner et al. | |
| 7,625,419 B2 | 12/2009 | Nelson et al. | |
| 7,661,540 B2 | 2/2010 | Choi | |
| 7,754,041 B2 | 7/2010 | Brandner et al. | |
| 7,927,393 B2 | 4/2011 | Sanami | |
| 7,959,702 B2 | 6/2011 | Rocklitz et al. | |
| 7,997,425 B2 | 8/2011 | Golden et al. | |
| 8,034,145 B2 | 10/2011 | Bohers et al. | |
| 8,042,694 B2 | 10/2011 | Driml et al. | |
| 8,226,786 B2 | 7/2012 | Risch et al. | |
| 8,241,384 B2 | 8/2012 | Murphy et al. | |
| 8,268,053 B2 | 9/2012 | Risch et al. | |
| 8,277,532 B2 | 10/2012 | Osendorf et al. | |
| 8,292,983 B2 | 10/2012 | Reichter et al. | |
| 8,361,183 B2 | 1/2013 | Rocklitz et al. | |
| 8,397,920 B2 | 3/2013 | Moy et al. | |
| 8,409,316 B2 | 4/2013 | Nelson et al. | |
| 8,460,442 B2 | 6/2013 | Risch et al. | |
| 8,496,723 B2 | 7/2013 | Reichter et al. | |
| 8,512,499 B2 | 8/2013 | Golden et al. | |
| 8,545,589 B2 | 10/2013 | Rocklitz | |
| 8,673,196 B2 | 3/2014 | Treier et al. | |
| 8,685,128 B2 | 4/2014 | Murphy et al. | |
| 8,734,557 B2 | 5/2014 | Rocklitz et al. | |
| 8,814,972 B2 | 8/2014 | Waibel et al. | |
| 8,961,722 B2 | 2/2015 | Osendorf et al. | |
| 9,084,957 B2 | 7/2015 | Murphy et al. | |

(56) References Cited

U.S. PATENT DOCUMENTS

| | | | |
|---|---|---|---|
| 9,433,884 B2 | 9/2016 | Rocklitz et al. | |
| 9,517,430 B2 | 12/2016 | Rocklitz et al. | |
| 9,808,752 B2 | 11/2017 | Moe et al. | |
| 9,855,519 B2 | 1/2018 | Rocklitz | |
| 2002/0046654 A1 | 4/2002 | Bloomer | |
| 2002/0060183 A1 | 5/2002 | Paul et al. | |
| 2002/0108359 A1 | 8/2002 | Powell | |
| 2002/0174770 A1 | 11/2002 | Badeau et al. | |
| 2003/0056479 A1 | 3/2003 | LeMaster | |
| 2003/0075500 A1 | 4/2003 | Kleingünther et al. | |
| 2003/0121845 A1 | 7/2003 | Wagner et al. | |
| 2004/0060861 A1 | 4/2004 | Winter et al. | |
| 2005/0139544 A1 | 6/2005 | Choi | |
| 2005/0144916 A1 | 7/2005 | Adamek et al. | |
| 2005/0166561 A1 | 8/2005 | Schrage | |
| 2005/0217226 A1 | 10/2005 | Sundet et al. | |
| 2005/0223687 A1 | 10/2005 | Miller et al. | |
| 2005/0252182 A1 | 11/2005 | Golden et al. | |
| 2006/0005518 A1 | 1/2006 | Duffy et al. | |
| 2006/0021926 A1 | 2/2006 | Woodard | |
| 2006/0042209 A1 | 3/2006 | Dallas et al. | |
| 2006/0042210 A1 | 3/2006 | Dallas et al. | |
| 2006/0091066 A1 | 5/2006 | Driml et al. | |
| 2006/0091084 A1 | 5/2006 | Merritt | |
| 2006/0151383 A1* | 7/2006 | Choi | 210/493.1 |
| 2006/0163150 A1 | 7/2006 | Golden et al. | |
| 2006/0246260 A1 | 11/2006 | Sundet et al. | |
| 2006/0272305 A1* | 12/2006 | Morgan | B01D 25/001 55/521 |
| 2007/0039296 A1 | 2/2007 | Schrage et al. | |
| 2007/0251634 A1 | 11/2007 | Choi | |
| 2008/0022643 A1 | 1/2008 | Fox et al. | |
| 2008/0209875 A1 | 9/2008 | Treier et al. | |
| 2008/0216654 A1 | 9/2008 | Wagner et al. | |
| 2008/0282890 A1* | 11/2008 | Rocklitz et al. | 95/273 |
| 2009/0102094 A1 | 4/2009 | Golden et al. | |
| 2009/0127211 A1 | 5/2009 | Rocklitz et al. | |
| 2009/0188219 A1 | 7/2009 | Sanami et al. | |
| 2009/0211696 A1 | 8/2009 | Moe et al. | |
| 2009/0302390 A1 | 12/2009 | Van Dal et al. | |
| 2010/0032365 A1 | 2/2010 | Moe | |
| 2010/0078379 A1 | 4/2010 | Rocklitz | |
| 2011/0277431 A1 | 11/2011 | Rocklitz et al. | |
| 2012/0196733 A1 | 8/2012 | Moe et al. | |
| 2012/0312167 A1 | 12/2012 | Wagner et al. | |
| 2013/0228077 A1 | 9/2013 | Rocklitz et al. | |
| 2014/0182251 A1 | 7/2014 | Rocklitz | |
| 2014/0325946 A1 | 11/2014 | Rocklitz et al. | |
| 2015/0375142 A1 | 12/2015 | Rocklitz | |
| 2017/0028341 A1 | 2/2017 | Rocklitz et al. | |
| 2017/0216758 A1 | 8/2017 | Rocklitz et al. | |

FOREIGN PATENT DOCUMENTS

| | | |
|---|---|---|
| CN | 1902384 | 1/2007 |
| DE | 3815145 | 10/1989 |
| DE | 8910110 | 2/1990 |
| DE | 4126126 | 2/1993 |
| DE | 19735993 | 2/1999 |
| DE | 10113077 | 4/2002 |
| DE | 60033469 | 10/2007 |
| DE | 102008029480 | 12/2009 |
| EP | 0504038 | 9/1992 |
| EP | 0522692 | 1/1993 |
| EP | 0630672 | 12/1994 |
| EP | 1595590 | 11/2005 |
| EP | 1681087 | 7/2006 |
| GB | 1336841 | 11/1973 |
| GB | 2395537 | 4/2006 |
| JP | 5982919 | 5/1984 |
| JP | 6071018 | 4/1985 |
| JP | 60071018 | 4/1985 |
| JP | 60071018 | 5/1985 |
| JP | 61011921 | 1/1986 |
| JP | S61200116 | 9/1986 |
| JP | S6485109 | 3/1989 |
| JP | 01128811 | 5/1989 |
| JP | H01163410 | 6/1989 |
| JP | 1-163408 | 11/1989 |
| JP | 2-25009 | 2/1990 |
| JP | 3229230 | 10/1991 |
| JP | H06064709 | 3/1994 |
| JP | H06327910 | 11/1994 |
| JP | 3006350 | 1/1995 |
| JP | 8238413 | 9/1996 |
| JP | 08309138 | 11/1996 |
| JP | 2002113798 | 4/2002 |
| JP | 2002303122 | 10/2002 |
| JP | 2003166446 | 6/2003 |
| WO | WO-89/10781 | 11/1989 |
| WO | 8912137 | 12/1989 |
| WO | WO-9302769 | 2/1993 |
| WO | 9740918 | 11/1997 |
| WO | WO-9908771 | 2/1999 |
| WO | 0050153 | 8/2000 |
| WO | 0249741 | 6/2002 |
| WO | 03033952 | 4/2003 |
| WO | 03047722 | 6/2003 |
| WO | 2004007054 | 1/2004 |
| WO | WO-2004039476 | 5/2004 |
| WO | 2004082795 | 9/2004 |
| WO | 2005077487 | 8/2005 |
| WO | WO-2005/082484 | 9/2005 |
| WO | 2005123222 | 12/2005 |
| WO | 2006014941 | 2/2006 |
| WO | 2006017790 | 2/2006 |
| WO | 2006076456 | 7/2006 |
| WO | 2006076479 | 7/2006 |
| WO | WO-2006/132717 | 12/2006 |
| WO | 2007056589 | 5/2007 |
| WO | 2007133635 | 11/2007 |
| WO | WO-2008095196 | 8/2008 |
| WO | WO2008095196 * | 8/2008 |
| WO | WO-2009/003119 | 12/2008 |
| WO | WO-2009100067 | 8/2009 |
| WO | WO-2010011910 | 1/2010 |
| WO | 2011017352 | 2/2011 |
| WO | 2011/091432 | 7/2011 |
| WO | 2011091432 A1 | 7/2011 |
| WO | 2012067729 | 5/2012 |

OTHER PUBLICATIONS

"Type 101 Automatic Corrugator", Solent Technology Deep Pleating Equipment http://www.solentech.com/html/101_info.html Dec. 23, 2009, 1 page.

"Type 102 Computerized Pleating System", Solent Technology Deep Pleating Equipment, http://www.solentech.com/html/102_info.html Dec. 23, 2009, 1 page.

"Type 103 Box Pleater", Solent Technology Deep Pleating Equipment http://www.solentech.com/html/103_info.html Dec. 23, 2009, 1 page.

"Type 104 Blade Pleater", Solent Technology Deep Pleating Equipment http://www.solentech.com/html/104_info.html Dec. 23, 2009, 1 page.

"Type 106 Dedicated Pleating System", Solent Technology Deep Pleating Equipment http://www.solentech.com/html/106_info.html Dec. 23, 2009, 1 page.

"Type 202 Computerized Pleating System", Solent Technology Deep Pleating Equipment http://www.solentech.com/html/202_info.html Dec. 23, 2009, 1 page.

"Communication Relating to the Results of the Partial International Search", received in corresponding International Application No. PCT/US2009/051670, 3 pages, dated Oct. 14, 2009.

"File History", for co-pending U.S. Appl. No. 12/508,944, entitled "Pleated Filtration Media, Media Packs, Elements, and Methods for Filtering Fluids," Filed on Jul. 24, 2009 (234 pages).

"PCT International Search Report and Written Opinion", from International Application No. PCT/US2009/051670, corresponding to U.S. Appl. No. 12/508,944, mailed Feb. 9, 2010, pp. 1-26.

(56) References Cited

OTHER PUBLICATIONS

"PCT International Search Report and Written Opinion", from International Application No. PCT/US2011/022446, corresponding to U.S. Appl. No. 61/298,109, mailed Apr. 5, 2011, pp. 1 15 , 15.
"PCT Notification Concerning Transmittal of International Preliminary Report on Pantentability", from International Application No. PCT/US2009/051670, corresponding to U.S. Appl. No. 12/508,944, mailed Feb. 3, 2011, pp. 1-15.
First Office Action, for Application Serial No. 200980131774.5, issued Mar. 20, 2013, 7 pages.
/Mg/ Communication pursuant to Article 94(3) EPC, European Examination Report, from the European Patent Office in EP Patent Application No. 09790799.2 mailed Aug. 21, 2012, pp. 1-7.
Non-Final Office Action, mailed Dec. 17, 2012 in co-pending U.S. Appl. No. 12/508,944, "Pleated Filtration Media, Media Packs, Filter Elements, and Methods for Filtering Fluid," 11 pages.
PCT International Preliminary Report on Patentability, mailed Aug. 9, 2012, from International Application No. PCT/US2011/022446, pp. 1-12.
Partial File History (from Oct. 5, 2011) for co-pending U.S. Appl. No. 12/508,944, entitled "Pleated Filtration Media, Media Packs, Elements, and Methods for Filtering Fluids," filed on Jul. 24, 2009 (60 pages).
Communication Pursuant to Article 94(3) EPC for European Application No. 11703321.7, PCT/US2011/022446, mailed Jun. 6, 2013, 4 pages.
Final Office Action from U.S. Appl. No. 12/508,944, mailed Aug. 26, 2013, 12 pages.
Notice of Rejection (translated) for Japanese Application No. 2011-520223, mailed Jun. 4, 2013, 1 page.
Communication Pursuant to Article 94(3) EPC for European Patent Application No. 11703321.7, mailed Mar. 7, 2014 (3 pages).
First Office Action for Chinese Patent Application No. 201180011588.5, mailed Mar. 4, 2014 (18 pages).
Non-Final Office Action for Mexican Patent Application No. MX/a/2011/000965, mailed Apr. 27, 2014 (4 pages).
Partial File History (from Aug. 26, 2013) for co-pending U.S. Appl. No. 12/508,944, (70 pages).
Second Office Action for Chinese Patent Application No. 200980131774.5, mailed Jan. 24, 2014 (7 pages).
Examiner's Report from CA Application No. 2676825, mailed Sep. 11, 2013, 3 pages.
Figures 1-6 from Japanese Patent JP2-129231, dated Oct. 2002, 3 pages.
File History for co-pending U.S. Appl. No. 12/215,718, (downloaded from USPTO Website Dec. 8, 2014), 214 pages.
File History for co-pending U.S. Appl. No. 12/322,616 (downloaded from USPTO Website Dec. 16, 2014), 258 pages.
File History for co-pending U.S. Appl. No. 12/508,944 (downloaded from USPTO Website Dec. 8, 2014), 213 pages.
File History for co-pending Application U.S. Appl. No. 13/110,742 (downloaded from USPTO Website Dec. 8, 2014), 148 pages.
File History for co-pending U.S. Appl. No. 13/744,200, (downloaded from USPTO Website Dec. 8, 2014), 126 pages.
File History for co-pending U.S. Appl. No. 14/040,929, downloaded Jan. 16, 2015, 147 pages.
File History for related U.S. Appl. No. 12/012,785, downloaded Dec. 8, 2014, 103 pages.
File History from related European Application Serial No. 08714184.2-2113, now Issued EP Patent No. 2117672, (downloaded from EPO Register Nov. 25, 2014), 152 pages.
File History from related European Application Serial No. 08781029.7-1365, now Issued EP Patent No. 2170488,(downloaded from EPO Register Nov. 25, 2014), 134 pages.
File History from related European Application Serial No. 09708023.8, (downloaded from EPO Register Dec. 31, 2014), 40 pages.
File History from related European Application Serial No. 09790799.2, (downloaded from EPO Register Feb. 3, 2015) 148 pages.
File History from related European Application Serial No. 10807046.7-1356, (downloaded from EPO Register Dec. 31, 2014), 33 pages.
File History from related European Application Serial No. 11703321.7, (downloaded from EPO Register Dec. 31, 2014), 50 pages.
File History from related European Application Serial No. 12163091.7, (downloaded from EPO Register Feb. 3, 2015), 127 pages.
File History from related European Application Serial No. 12163098.2-1356, (downloaded from EPO Register Feb. 3, 2015), 132 pages.
File History from related European Application Serial No. 12163105.5-1356, (downloaded from EPO Register Feb. 3, 2015), 130 pages.
File History from related European Application Serial No. 14166293.2, (downloaded from EPO Register Feb. 3, 2015), 117 pages.
Final Rejection for Chinese Application No. 200980103965.0, mailed May 14, 2013 (14 pages) including English translation.
First Chinese Office Action Received First Office Action for Chinese Application No. 200880006683.4, mailed May 31, 2011, Including English translation, 7 pages.
First Examination Report for India Patent Application No. 3070/KOLNP/2009, mailed Aug. 7, 2014 (2 pages).
First Examiner Report from Australian Application No. 2008268271, mailed Feb. 24, 2012, 2 pages.
First Office Action for Chinese Application No. 200880104082.7, mailed Aug. 9, 2013 (7 pages) with English translation.
First Office Action for Chinese Patent Application No. 20120181182.8, mailed Feb. 21, 2014 (16 pages) with English translation.
First Office Action for Chinese Patent Application No. 201210180467.X, mailed Jan. 28, 2014 (10 pages) with English translation.
First Office Action for Chinese Patent Application No. 201210181810.2 mailed Jan. 10, 2014 (8 pages) with English translation.
First Office Action from CN Application No. 200980103965.0, mailed Jul. 20, 2012, (18 pages) including English translation.
First Office Action from CN Application No. 201080037254.0, mailed Oct. 29, 2013, with English translation (20 pages).
First Office Action Received for Australian Application No. 2008210304, mailed Nov. 23, 2011 (2 pages).
International Preliminary Report on Patentability for International Application No. PCT/US2009/032965 mailed Aug. 19, 2010 (9 pages).
International Preliminary Report on Patentability from International Application No. PCT/US2008/068394, mailed Jan. 14, 2010 (9 pages).
International Preliminary Report on Patentability from International Application No. PCT/US2010/044286, mailed Feb. 16, 2012, 7 pages.
International Search Report and Written Opinion for International Application No. PCT/US2009/032965, mailed May 18, 2009 (13 pages).
International Search Report and Written Opinion from International Application No. PCT/US2008/068394, mailed Oct. 7, 2008, (11 pages).
International Search Report and Written Opinion from International Application No. PCT/US2010/044286, mailed Apr. 14, 2011, 10 pages.
Non Final Office Action for Chinese Patent Application No. 201210181810.2, mailed on Feb. 10, 2015 (13 pages) with English translation.
Office Action for JP Application No. 2012-523711, with English translation, mailed Jul. 1, 2014 (5 pages).
Response and RCE filed in co-pending U.S. Appl. No. 12/322,616, submitted to USPTO Feb. 17, 2015, (11 pages).
Response to Final Office Action mailed Nov. 14, 2014 in co-pending U.S. Appl. No. 12/508,944, submitted to USPTO Feb. 17, 2015, (8 pages).

(56) References Cited

OTHER PUBLICATIONS

Response to First Office Action from JP Application No. 2010-515132, submitted Sep. 19, 2012, (11 pages) Including English translation of claim amendments.
Second Non-Final Office Action for Chinese Patent Application No. 201180011588.5, mailed Dec. 25, 2014 (9 pages) with English translation.
Second Office Action for Chinese Patent Application No. 200880104082.7, mailed Mar. 11, 2014 (49 pages) with English translation.
Second Office Action for Chinese Patent Application No. 2009801039650, mailed Oct. 29, 2014 (6 pages) including English translation.
Second Office Action for Chinese Patent Application No. 201080037254.0, mailed Nov. 15, 2014 (15 pages) with English translation.
Second Office Action for Chinese Patent Application No. 201210180467.X, mailed Nov. 2, 2014 (7 pages) with English translation.
Second Office Action for Chinese Patent Application No. 201210181182.8, mailed Dec. 9, 2014 (6 pages) with English translation.
Third Office Action for Chinese Patent Application No. 200980131774.5, mailed Jan. 16, 2015 (15 pages) with English translation.
Translation of Final Rejection for Japanese Patent Application No. 2011520223, mailed Sep. 2, 2014, 2 pages.
Translation of Mexican Office Action Received, MX Application No. MX/a/2009/008242, mailed Jun. 8, 2012, 1 page.
Translation of Office Action for Mexican Application No. MX/a/2010/008530, mailed Jul. 10, 2014 (3 pages).
Translation of Office Action for Mexican Patent Application No. MX/a/2010/008530, mailed Dec. 3, 2013 (2 pages).
Translation of Office Action for Mexico Application No. MX/a/2010/008530, mailed May 28, 2013 (3 pages).
Translation of Office Action from Mexican Application No. MX/a/2009/014134 mailed Apr. 19, 2012 (3 pages).
Translation of Second Office Action for Mexican Patent Application No. MX/a/2011/000965, mailed Nov. 6, 2014 (2 pages).
Amendment and Response to Non-Final Office Action mailed Jan. 14, 2015, filed via EFS-Web on Jul. 13, 2015, 10 pages
Communication Pursuant to Article 94(3) EPC for European Patent Application No. 11703321.7, mailed May 27, 2015 (4 pages).
"Communication Pursuant to Article 94(3) EPC," for European Patent Application No. 12163091.7, mailed Jul. 7, 2015 (5 pages).
"Communication Pursuant to Article 94(3) EPC," for European Patent Application No. 12163098.2, mailed Jul. 20, 2015 (5 pages).
"Communication Pursuant to Article 94(3) EPC," for European Patent Application No. 12163105.5, mailed Jul. 3, 2015 (5 pages).
Examiner's Report for Canadian Patent Application No. 2691867, mailed on Jan. 30, 2015 (3 pages).
Final Rejection for Chinese Patent Application No. 201080037254.0, mailed Mar. 30, 2015 (15 pages) with English translation.
"First Examiner Report," for Australian Patent Application No. 2014201109, mailed Jul. 20, 2015 (3 pages).
First Examiner's Report for Australian Patent Application No. 2013270543 mailed Apr. 23, 2015 (3 pages).
Fourth Office Action for Chinese Patent Application No. 200980131774.5, mailed Apr. 29, 2015 (14 pages) with English translation.
Non-Final Office Action for U.S. Appl. No. 13/388,956, mailed Mar. 13, 2015 (35 pages).
Non-Final Office Action for U.S. Appl. No. 14/198,246, mailed Jun. 18, 2015, (11 pages).
Notice of Allowance for U.S. Appl. No. 12/508,944, mailed Feb. 27, 2015 (14 pages).
Office Action for Chinese Application No. 200880104082.7, mailed on Feb. 12, 2015 (6 pages) with English Translation.
Office Action for Mexico Patent Application No. MX/a/2011/000965, mailed Apr. 28, 2015 (2 pages). English Translation.

"Response to Examiner's Report," for Canadian Patent Application No. 2,691,867, mailed and filed with the CIPO Jul. 30, 2015 (86 pages).
Response to Non-Final Office Action mailed Mar. 13, 2015 in co-pending U.S. Appl. No. 13/388,956, filed Jun. 15, 2015, 10 pages.
Supplemental Notice of Allowability for U.S. Appl. No. 12/508,944 mailed Apr. 9, 2015 (7 pages).
Third Non Final Office Action for Chinese Patent Application No. 201180011588.5, mailed on Jun. 15, 2015 (7 pages) with English translation.
Third Office Action for Chinese Patent Application No. 201210180467.X, mailed Jul. 6, 2015 (8 pages) with English translation.
Translation of Office Action for Mexican Patent Application No. MX/2010/008530, mailed on Jan. 30, 2015 (3 pages). English Translation.
"Communication Pursuant to Article 94(3) EPC," for European Patent Application No. 09708023.8, mailed Sep. 1, 2015 (5 pages).
"Communication Pursuant to Article 94(3) EPC," for European Patent Application No. 10807046.7, mailed Aug. 13, 2015 (6 pages).
"Final Office Action," for U.S. Appl. No. 13/388,956 mailed Oct. 7, 2015 (17 pages).
"First Examination Report," for Indian Patent Application No. 3243/kolnp/2010, mailed Oct. 12, 2015 (2 pages).
"Non-Final Office Action," for U.S. Appl. No. 12/322,616 mailed Oct. 23, 2015 (30 pages).
Communication Pursuant to Article 94(3) EPC for European Patent Application No. 10807046.7, mailed Jul. 29, 2015 (6 pages).
First Examination Report for Australian Patent Application No. 2011207507, mailed Dec. 1, 2015 (3 pages).
Fourth Office Action for Chinese Patent Application No. 201210180467.X, mailed Dec. 29, 2015 (10 pages) with English translation.
Non-Final Office Action for Japanese Patent Application No. 2014-263546, mailed Nov. 10, 2015 (5 pages) with English Summary.
Non-Final Office Action for U.S. Appl. No. 14/040,929 mailed Dec. 8, 2015 (19 pages).
Notification for Patent Reexamination for Chinese Patent Application No. 201080037254.0, mailed Oct. 26, 2015 (9 pages) with English translation.
Office Action by the Appeal Examiner for Japanese Patent Application No. 2010-545266, mailed Dec. 11, 2015 (3 pages) with English Summary.
Response to Communication Pursuant to Article 94(3) EPC for European Patent Application No. 11703321.7, mailed May 27, 2015, and filed with the EPO Dec. 7, 2015 (9 pages).
Response to Communication Pursuant to Article 94(3) for European Patent Application No. 12163105.5, mailed Jul. 3, 2015 and filed with the EPO Jan. 13, 2016 (8 pages).
Response to First Examination Report for Indian Patent Application No. 283/KOLNP/2010, filed with the IPO Dec. 28, 2015 (54 pages).
Second Examiner's Report for Canadian Patent Application No. 2691867, mailed on Nov. 2, 2015 (3 pages).
Communication Pursuant to Article 94(3) EPC for European Patent Application No. 12163098.2, mailed Apr. 26, 2016 (5 pages).
Communication Pursuant to Article 94(3) EPC for European Patent Application No. 12163105.5, mailed May 2, 2016 (5 pages).
Final Rejection for Japanese Patent Application No. 2013-232560 mailed Jan. 5, 2016 (3 pages) with English Summary.
First Examination Report for India Patent Application No. 283/KOLNP/2010, mailed Dec. 30, 2014 (3 pages).
First Office Action for Japanese Patent Application No. 2014114346, mailed Jul. 31, 2015 (10 pages) with English Summary.
Non Final Office Action for U.S. Appl. No. 14/198,246, mailed Mar. 10, 2016 (18 pages).
Non-Final Office Action for U.S. Appl. No. 12/322,616, mailed Mar. 11, 2016 (37 pages).
Non-Final Office Action for U.S. Appl. No. 13/388,956, mailed Mar. 25, 2016 (23 pages).

(56) References Cited

OTHER PUBLICATIONS

Office Action for Japanese Patent Application No. 2015-043876 mailed Mar. 1, 2016 (6 pages) with English translation.
Office Action for Mexican Patent Application No. MX/a/2012/001455 mailed Apr. 7, 2016 (2 pages), translation only.
Response to Communication Pursuant to Art 94(3) EPC for European Patent.Application No. 09708023.8 filed with the EPO Mar. 11, 2016 (10 pages).
Response to Communication Pursuant to Article 94(3) EPC for European Patent Application No. 10807046.7, filed with the EPO Feb. 8, 2016 (13 pages).
Response to Communication Pursuant to Article 94(3) EPC for European Patent Application No. 12163098.2 filed with the EPO on Feb. 1, 2016 (11 pages).
"Final Office Action," for Japanese Patent Application No. 2014-114346, mailed Aug. 5, 2016 (6 pages).
"Final Office Action," for U.S. Appl. No. 12/322,616 mailed Sep. 22, 2016 (33 pages).
"First Office Action," for Chinese Patent Application No. 201510507854.3, mailed Jun. 28, 2016 (15 pages) with English translation.
"First Office Action," for Japanese Patent Application No. 2015-077921, mailed Jul. 4, 2016 (5 pages).
"Examination Report," for Australian Patent Application No. 2016202520 mailed Nov. 21, 2016 (2 pages).
"Final Office Action," for Japanese Patent Application No. 2015-043876 mailed Nov. 8, 2016 (9 pages) with English translation.
"Final Office Action," for U.S. Appl. No. 13/388,956 mailed Nov. 17, 2016 (25 pages).
"First Office Action," for Chinese Patent Application No. 201510828027.4 mailed Dec. 16, 2016 (14 pages) with English Translation.
"Non-Final Office Action," for U.S. Appl. No. 14/708,993 mailed Jan. 26, 2017 (38 pages).
Notification for Patent Reexamination for Chinese Patent Application No. 200980131774.5 mailed Nov. 18, 2016 (16 pages) with English translation.
Office Action for Mexican Patent Application No. MX/a/2012/001455 received by the associate Dec. 7, 2016 (2 pages), translation only.
Communication Pursuant to Article 94(3) EPC for European Patent Application No. 10807046.7, mailed Nov. 30, 2016 (5 pages).
Final Office Action for Japanese Patent Application No. 2015-077921 dated Feb. 17, 2017 (5 pages) with English summary.
Second Office Action for Chinese Patent Application No. 201510507854.3 dated Feb. 13, 2017 (8 pages) with English translation.
CN Decision by Rexam Board for Chinese Patent Application No. 200980131774.5, dated Apr. 21, 2017 (15 pages) with English summary.
Communication Pursuant to Article 94(3) EPC for European Patent Application No. 11703321.7, dated May 10, 2017 (5 pages).
Decision of Rejection for Japanese Patent Application No. 2015-043876 dated Jun. 20, 2017 (4 pages) with English translation.
Final Office Action for U.S. Appl. No. 14/708,993 dated Jun. 9, 2017 (15 pages).
First Office Action for Chinese Patent Application No. 201510896382.5 dated Mar. 27, 2017 (17 pages).
Office Action for Mexican Patent Application No. MX/a/2012/001455 dated May 4, 2017 (3 pages), translation only.
Final Office Action for U.S. Appl. No. 13/388,956 dated Dec. 13, 2017 (15 pages).
Office Action for Mexican Patent Application No. MX/a/2012/001455 received by the associate Nov. 14, 2017 (5 pages) with English summary.
Second Office Action for Chinese Patent Application No. 201510896382.5 dated Nov. 29, 2017 (14 pages) with English translation.
Communication Pursuant to Article 94(3) EPC for European Patent Application No. 09708023.8, dated Feb. 9, 2017 (5 pages).
Communication Pursuant to Article 94(3) EPC for European Patent Application No. 12163091.7 dated Aug. 2, 2016 (6 pages).
Communication Pursuant to Article 94(3) EPC for European Patent Application No. 12163091.7 dated Jun. 23, 2017 (5 pages).
Communication Pursuant to Article 94(3) EPC for European Patent Application No. 12163098.2, dated Jun. 30, 2017 (4 pages).
Communication Pursuant to Article 94(3) EPC for European Patent Application No. 14166293.2 dated Jul. 20, 2017 (6 pages).
Communication Pursuant to Article 94(3) EPC for European Patent Application No. 14166293.2 dated Jul. 27, 2016 (4 pages).
Notice of Opposition for European Patent Application No. 09790799.2 on behalf of MAHLE International GmbH, dated Sep. 15, 2017 (13 pages) with translation through Google Translate.
Notice of Opposition for European Patent Application No. 09790799.2 on behalf of Mann+Hummel International GmbH & Co. KG, dated Sep. 15, 2017 (45 pages) with translation through Google Translate.
Office Action for Japanese Patent Application No. 2014114346, dated Aug. 4, 2017 (23 pages) with English translation.
"Final Office Action," for Chinese Patent Application No. 201510507854.3 dated Oct. 9, 2017 (& pages) with English translation.
Office Action for Japanese Patent Application No. 2016-233484 dated Sep. 4, 2017 (7 pages) with English translation.
Second Office Action for Chinese Patent Application No. 201510828027.4 dated, Sep. 11, 2017 (15 pages) with English Translation.
"Communication Pursuant to Article 94(3) EPC," for European Patent Application No. 09708023.8 dated Feb. 9, 2018 (4 pages).
"Non-Final Office Action," for U.S. Appl. No. 13/388,956 dated Mar. 26, 2018 (23 pages).
"Response to Final Rejection," dated Dec. 13, 2017, for U.S. Appl. No. 13/388,956, submitted via EFS-Web on Mar. 9, 2018, 13 pages.
Communication Pursuant to Article 94(3) EPC for European Patent Application No. 10807046.7 dated Jan. 31, 2018 (5 pages).
Reconsideration Report for Japanese Patent Application No. 2015-043876 dated Dec. 12, 2017 (2 pages), English translation.
"Non-Final Office Action," for U.S. Appl. No. 15/372,944 dated Apr. 19, 2018 (81 pages).
"Office Action," for Japanese Patent Application No. 2016-233484 dated May 7, 2018 (10 pages) with English translation.
"Response to Non-Final Office Action" dated Mar. 26, 2018 for U.S. Appl. No. 13/388,956, submitted via EFS-Web on Jun. 25, 2018, 13 pages.

* cited by examiner

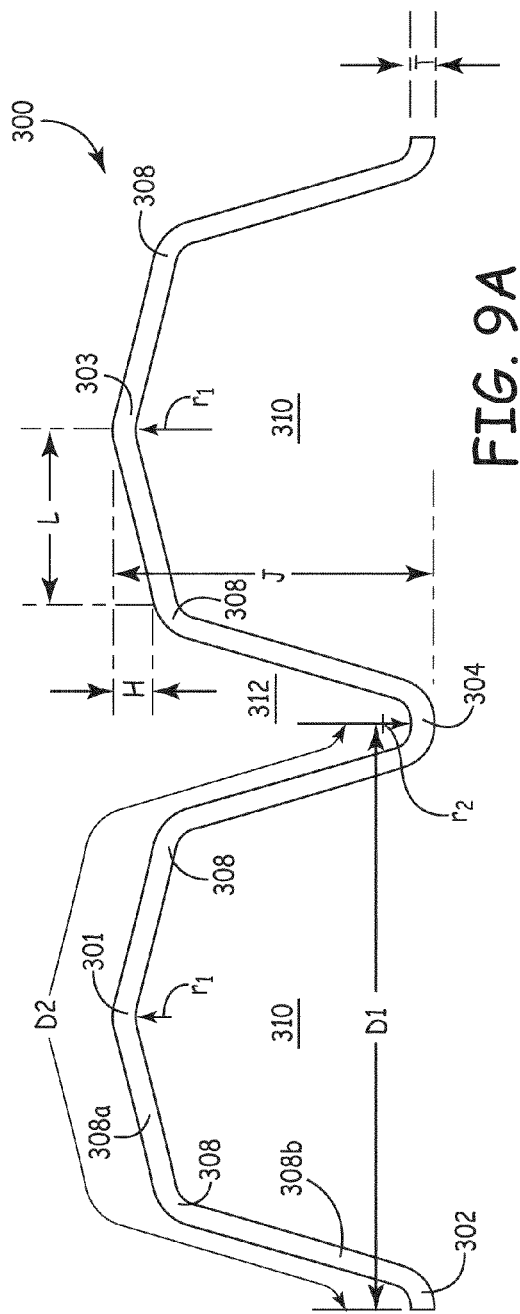
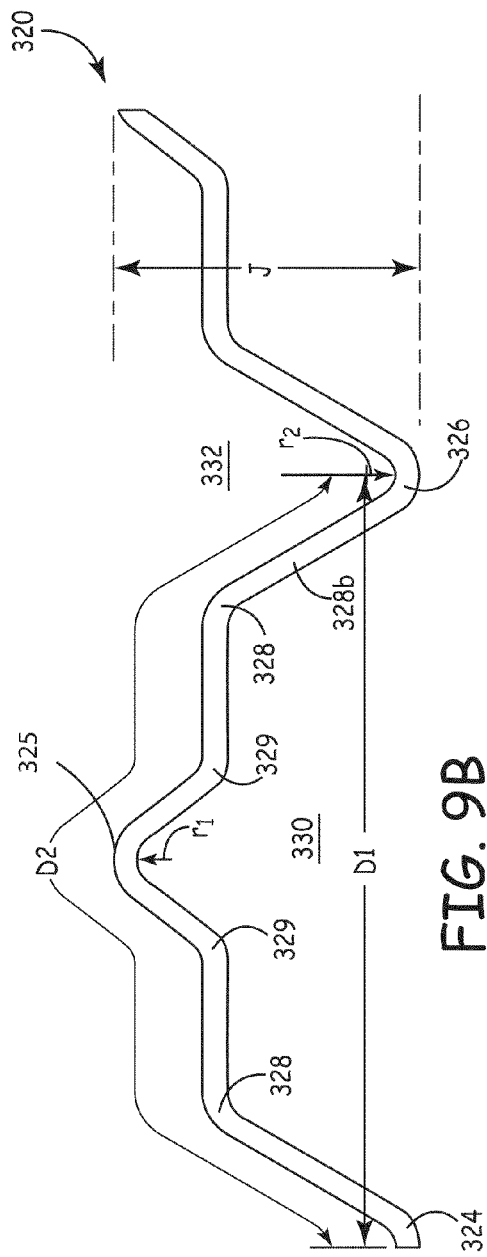

PLEATED FILTRATION MEDIA HAVING TAPERED FLUTES

PRIORITY

This application claims the benefit of U.S. Provisional Patent Application Ser. No. 61/298,109, entitled "PLEATED FILTRATION MEDIA HAVING TAPERED FLUTES," filed Jan. 25, 2010, the contents of which is herein incorporated by reference in its entirety.

FIELD OF THE INVENTION

The present invention relates to pleated filtration media, media packs, filter elements, and methods of making media, media packs, and filter elements.

BACKGROUND

Fluid streams, such as gases and liquids, often carry contaminant material therein. In many instances, it is desirable to filter some or all of the contaminant material from the fluid stream. For example, particulate contaminants are often present in air streams to engines for motorized vehicles and for power generation equipment, air and gas streams to gas turbine systems, air and gas streams to various combustion furnaces, and air and gas streams to heat exchangers (e.g., heating and air conditioning). Liquid streams in engine lube systems, hydraulic systems, coolant systems and fuel systems, can also carry contaminants that should be filtered. It is preferred for such systems that selected contaminant material be removed from the fluid (or have its level reduced in the fluid). A variety of fluid filters (gas or liquid filters) have been developed for contaminant reduction. In general, however, continued improvements are sought.

Pleated filtration media has been in use for many years, and is widely adopted for fluid filtration applications, including gas and liquid filtration. Pleated filtration media provides a relatively large media surface area in a given volume by folding the media back and forth such that a large amount of media can be arranged in a relatively small volume. Pleated media is typically formed from continuous or rolled webs of filter media, with the pleats formed perpendicular to the machine direction of the media. The machine direction of the media generally refers to the continuous direction of the media as it comes from a source, such as a supply roll. The continuous direction is also sometimes referred to as the machine direction of the media. The pleat folds, therefore, are generally transverse to the continuous direction of the media. In general, a first set of pleat folds forms a first face of the media pack and a second set of pleat folds forms a second face of the media pack, with the first and second pleat folds alternating with one another. It will be understood that in certain embodiments the "face" described herein can be substantially uneven or irregular, and can be planer or non-planer.

One challenge to designing filter elements containing pleated filter media is that an undesirable level of fluid flow restriction can occur as the number of pleats within a given volume increases. This restriction becomes critical as the pleats are pressed too close to each other, which can cause significant interference with filter performance. For example, pleats can be so close together that it is difficult for a fluid to enter the area between the pleats. Due to this restriction, the media in some prior pleated filters is modified to create an uneven surface with raised areas of shallow repeating arcs along the media surface. As pleats having this uneven surface become pressed toward one another, the raised areas on the media help maintain fluid flow between pleat surfaces by forming channels which aid fluid flow. Although pleats with uneven surfaces can provide advantages, the improvement is limited, especially with deeper pleat constructions.

Therefore, a need exists for improved pleated filtration media.

SUMMARY

The present invention is directed to pleated filtration media and filtration media pleat packs containing the pleated filtration media. These pleat packs can in turn be formed into filter elements, which are also the subject of the present invention. The media and media pleat packs contain flutes extending between the pleat folds. The flutes are three dimensional structures formed in the filtration media that provide advantageous flow paths along the surfaces of the pleats, that allow for advantageous flow of fluids through the media, that assist in controlling pleat spacing, that aid in providing rigidity and structure to the pleat face, and that provide for efficient contaminant removal.

At least some of the flutes in the media pack have a tapered geometry. The tapered geometry typically includes a change in the width, and/or height, and/or cross sectional areas of flutes along their length. The use of tapered flutes in a pleated media can have significant benefits in regard to filtering performance. For example, tapered flutes can allow for deeper pleat packs to be formed while offering benefits in fluid flow through the pleat pack. Such benefits can be realized by having flutes with relatively large cross sectional areas on the upstream side of the media pack near the front face of the media pack (where fluids enter the media pack), along with opposing flutes having relatively large cross sectional areas on the downstream side of the media pack near the back face of the media pack (where fluids exit the media pack). This changing of upstream and downstream flute cross sectional areas can decrease contraction and expansion pressure losses associated with flow entering and exiting the pleat pack, and can reduce pressure losses as flow moves along channels formed by tapered flutes. Thus, tapered flutes then can reduce pleat pack initial pressure drop, and affecting the flow distribution through media along flutes, tapered flutes can increase filter capacity and life.

The changes in width, height and/or cross sectional area are often gradual along the length of the flutes, but in some implementations the changes can be step-wise or otherwise non-gradual. In most implementations the tapered flutes will display a substantially uniform taper along all or most of the flute length. However, in some implementations it is possible to have the taper vary along the flute length, so that the taper is not uniform or not continuous. For example, the flute may transition from a tapered area to a non-tapered area, to another tapered area.

Although the cross-sectional area of specific flutes may vary from one end of the flute to the other, it is not necessary that the width of the flute or the height of the flute also taper. Indeed, in some implementations the width, the height, or both are constant or substantially constant along the length of the flute. As will be explained in the Detailed Description, it is possible to change the cross sectional area of a flute without changing its width or height. This can be done by changing the shape of the side walls of the flute, such as by forming ridges along the flute wall and modifying the position of those ridges along the flute. As used herein, a ridge is generally a defined bend, crease, or deformation in the media along some or all of the length of a flute. A ridge is typically a discontinuity in the curve of the media, which is not found in generally curving media. Thus, a ridge is generally not simply an inflection point between or gradual curve, but rather a more significant discontinuity in the curvature (as shown, for example, in FIGS. 9A and 9B of the present invention). As is elaborated in the Detailed Description, ridges constructed in accordance with the teachings of the invention allow for specialized tapered flutes. In particular, it possible to have the position of ridges varies along the length of the flutes so as to promote controlled taper of the flutes. Thus, the addition of formed ridges along the length of a flute, and the changing of those ridge shapes and locations, can result in significant tapering of the flute cross sectional area; and such tapering can optionally be conducted without significant changes to height or width of the flute.

The pleated media of the present invention is further advantageous in that the tapered flutes allow for high utilization levels of the filter media. By high utilization levels it is meant that there is relatively little masking of the media. As used herein, masking refers to the area of proximity between adjacent and touching media faces. Where upstream or downstream adjacent media faces touch, there is a lack of substantial pressure difference across the media or there is significant resistance to flow across the media that is greater than would be observed if the sheets were not in close proximity. In general, masking is experienced at the location in the media where there is close proximity or contact to another media sheet or flow bounding surface. This close proximity can result in a decrease in pressure to drive flow through the media at that location. As a result, masked media is not as useful to the filtration performance of filtration media. Significant reduction in masking of media can represent a major improvement in filter performance and design because it increase the amount of media available for filtering the fluid.

Accordingly, it is desirable to reduce masking so as to increase the amount of filtration media available for filtration. Reduction in masking increases the dust storage capacity of the filtration media pleat pack, increases the throughput of fluids through the filtration media for a given pressure drop, and/or decreases the pressure drop of the filtration media pleat pack for a given overall fluid flow rate. Flutes in the pleated media made in accordance with the teachings of the present invention allow for a reduction in masking of the media. This reduction is accomplished by controlling the shape of the flutes, in particular by having flute tips that have reduced surface area in contact with flutes on adjacent pleats. Sharp flute tips can be created by having a sharp radius or a defined tip that reduces masking between pleats. As will be described in the Detailed Description, in various embodiments of the invention the sharp flute tips are simultaneously formed in conjunction with ridges along the flute, so as to increase the media surface area, to create tapered flutes, and to otherwise control filter media performance.

While the specific media area subject to masking along a given flute may be relatively small, the total amount of masked media over an entire filter element can be substantial. Therefore even modest improvements at reducing masking can have significant value. It is possible to reduce the amount of masked media in a filter element while simultaneously modifying flute geometry to even further increase the amount of effective media present in the filter. By reducing masking, the performance or life of the filter element can be increased, or the size of the filter element can be reduced while maintaining the same performance or filter life. In general, enhancing the filter element life or decreasing filter initial pressure drop for a given filter element size or reducing the filter element size for a given filter element performance can be referred to as enhancing the filter's performance. The tapered flutes of the present invention can be constructed with reduced masking of the media, even though the width, height, or cross section of the flutes are varied along their length; and this ability to limit masking allows for increased filter performance as a result of maximizing useful media.

Pleated media made in accordance with the invention is further advantageous in that the tapered flutes can be constructed such that there is little strain on the media during production, allowing relatively non-stretchable media to be formed into tapered flutes running directionally from one pleat face to the other pleat face of a pleated media pack. Media having high cellulose content is often desirable due to its low cost, and the present invention allows for incorporation of high-cellulose media and formation of suitable tapered flutes without unacceptable damage of the media. Similarly, media having high glass fiber content can be used and formed into tapered flutes without unacceptable degradation of the media.

In certain embodiments the filtration media pleat packs made in accordance with the invention are constructed with flutes that have different flute shapes such that there are different open volumes on the upstream and downstream sides of the pleat pack, a property referred to herein as pleat pack volumetric asymmetry. This pleat pack volumetric asymmetry can, in some embodiments, promote contaminant material storage, improved flow and better filtration. Pleat pack volumetric asymmetry can be particularly helpful for improving performance in filter configurations that have shallow pleat packs. Pleat pack volumetric asymmetry is distinct from tapering of flutes, but in combination the volumetric asymmetry and tapering can result in significant improvements in pleat pack performance and useful life. Indeed, tapering of flutes can be used to create or increase volumetric asymmetry.

The present invention is also directed to pleated filtration media packs. The phrase "pleated filtration media pack" refers to a media pack constructed or formed by folding, pleating, or otherwise forming filtration media into a three-dimensional network. A pleated filtration media pack can be referred to, more simply, as a media pack. Pleated filtration media packs can optionally be combined with other features found in filter elements including a seal, a seal support, and pleat pack end encapsulation. In general, a pleated filtration media pack includes filtration media having a first set of pleat folds forming a first face, a second set of pleat folds forming a second face, and the filtration media extending between the first set of pleat folds and the second set of pleat folds in a back and forth arrangement.

The folds are typically formed transverse to the machine direction of the media, but that is not a requirement. The folds can be formed at an angle that is different than an angle transverse to the machine direction. The first face is generally the inlet or outlet of the pleated filtration media, and the second face is the other of the inlet or outlet of the filtration media. For example, unfiltered fluid can enter the pleated filtration media pack via the first face, and filtered fluid can exit the pleated filtration media pack via the second face, or vice versa.

Pleated media made in accordance with the invention can be assembled into numerous shapes and configurations, including panel filters, cylindrical filters, and conical filters.

In panel filters, pleated media typically extends in a planar or panel configuration having a first face of the pleated media formed from a first set of pleat folds (also called pleat tips) and a second face of the pleated media formed from a second set of pleat folds (also called pleat tips). The first and second faces formed by the pleat folds are generally parallel. Fluid flows into the panel filter through one face and out of the panel filter through the other face.

In cylindrical or conical filters, pleated media is generally formed into a tube or cone (or a partial section of a tube or cone), with a first face of the pleated media (formed by a first set of pleat folds) creating an interior face, and the second face of the pleated media (formed by a second set of pleat folds) forming an outside face. In the case of cylindrical and conical filters for air filtration, air typically flows into the filter element from the outside face to the interior face (or vice versa in what are sometimes referred to as reverse flow filters).

The above summary of the present invention is not intended to describe each disclosed embodiment of the present invention. This is the purpose of the detailed description and claims that follows.

BRIEF DESCRIPTION OF THE DRAWINGS

The invention may be more completely understood in consideration of the following detailed description of various embodiments of the invention in connection with the accompanying drawings, in which:

FIGS. 9A-9C are enlarged, schematic, cross-sectional views of filtration media according to the principles of the invention.

Figure 1:
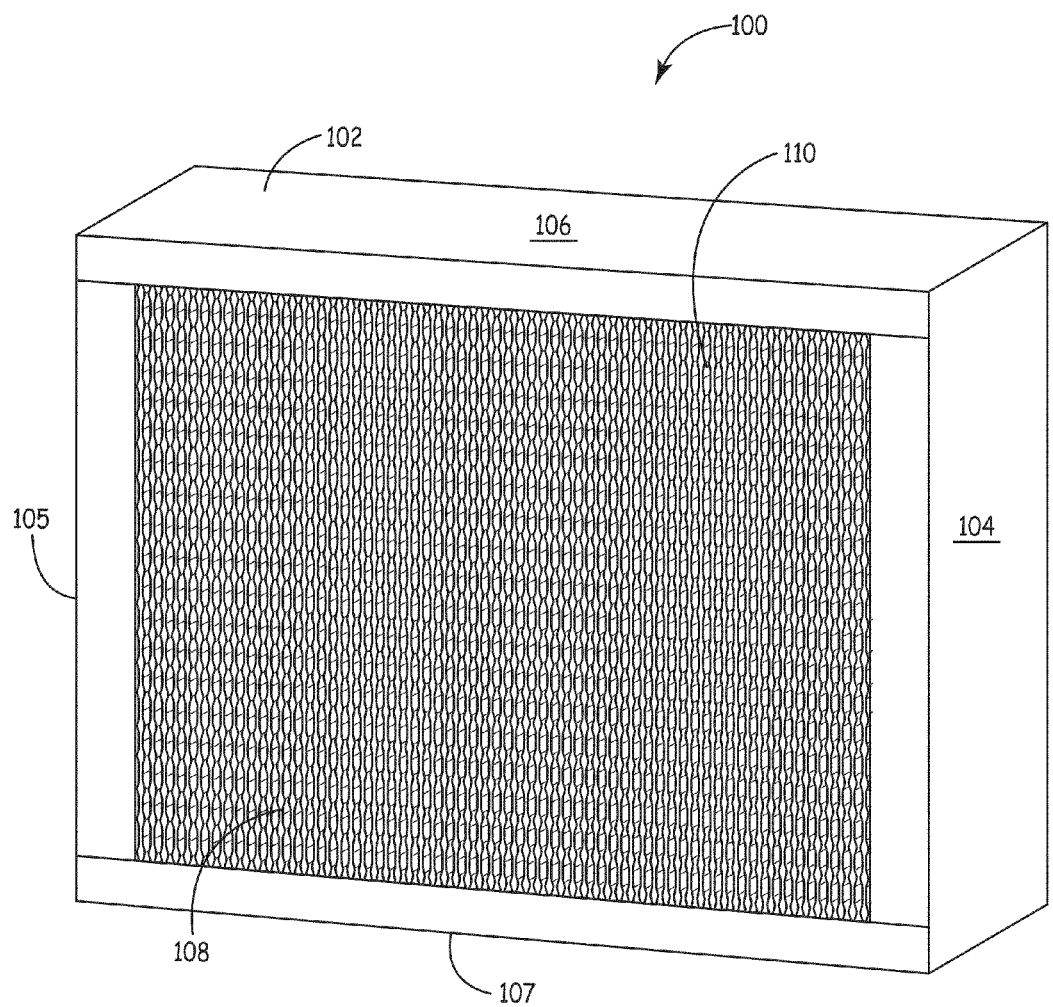
FIG. 1 is a perspective view of a filter element according to the principles of the invention.

These drawings are to be considered general representations of the invention, and it will be appreciated that they are not drawn to encompass all embodiments of the invention, nor are they always drawn to scale. It will also be understood that media made in accordance with the invention will generally exhibit variation.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed to pleated filtration media and filtration media pleat packs that contain flutes extending directionally between the pleat folds, as well as methods and equipment for producing pleated filtration media and media pleat packs. The flutes are three dimensional structures formed in the filtration media that provide advantageous flow paths along the pleat surfaces, allow for advantageous flow of fluids through the media, and provide for efficient contaminant removal.

At least some of the flutes in the media and pleat packs have a tapered geometry. The tapering is typically manifest by a change in the width, height, and/or cross sectional area of a flute along at least a portion of its length. Although the cross-sectional area of specific flutes may vary from one end of a flute to the other, it is not necessary that the width of the flute or the height of the flute also taper. Indeed, in some implementations the width, the height, or both are constant or substantially constant along the length of the flute, while the cross sectional area of the flute changes. In other implementations the height and width of the flutes changes along their length.

The changes in width, height and/or cross sectional area are often gradual along the length of the flutes, but in some implementations the changes can be step-wise or otherwise non-gradual. In many implementations the tapered flutes display a substantially uniform taper along all or most of the flute length. However, in some implementations it is possible to have the taper vary along the flute length, so that the taper is not uniform. In some implementations it is possible that only portions of one or more flutes exhibit taper, while other portions of one or more flutes are substantially straight. Generally the tapered flutes do not get wider and then narrower along their length. In other words, typically a flute that is tapering down in cross sectional area will not switch to tapering up in cross sectional area; and a flute that is tapering up in cross sectional area will not taper down in cross sectional area. However, in some implementations discontinuous tapering can occur, such as a flute that tapers down in cross sectional area for part its length, followed by tapering up in cross sectional area, followed by tapering down again in cross sectional area. In some such implementations the starting and ending cross sectional areas of the flute do not change, but tapering of the cross sectional area occurs along portions of the flute.

The use of tapered flutes in pleated media can have significant benefits in regard to filtering performance. For example, tapered flutes can allow for use of deeper pleat packs while offering benefits in fluid flow through the media. Such benefits can be realized by having flutes with relatively large cross-sectional areas on the upstream side of the media pack near the front face (where fluids enter the media pack), along with opposing flutes on the downstream side of the media pack near the back face (where fluids exit the media pack) which also have relatively large cross-sectional areas. This changing of upstream and downstream flute cross sectional areas decreases pleat pack area contraction entrance pressure losses associated with flow entering the pleat pack and pleat pack area expansion exit pressure losses associated with flow exiting the pleat pack. Flow uniformity may be used to beneficially decrease media and/or channel pressure losses as flow moves along flutes and through media formed by tapered flutes. More uniform flow through media in flutes can provide more uniform dust loading within flutes. Tapered flutes then can be used to reduce pleat pack initial pressure drop. By reducing initial pressure drop, and affecting the flow distribution through media along flutes, tapered flutes may be used to increase filter dust capacity (filter life). By reducing pressure losses and increasing flow uniformity, tapered flutes also are particularly well suited to media that will be pulse cleaned by reversal of fluid flow through the filter element. Pleated media with tapered flutes may also be useful for various other filtering applications.

The pleated filtration media pack can be used to filter a fluid that can be a gaseous or liquid substance. An exemplary gaseous substance that can be filtered using the filtration media is air, and exemplary liquid substances that can be filtered using the filtration media include water, oil, fuel, and hydraulic fluid. The filtration media pack can be used to separate or remove at least a portion of a component from a fluid to be filtered. The component can be a contaminant or another material targeted for removal or separation. Exemplary contaminants and materials targeted for removal include those characterized as solids, liquids, gases, or combinations thereof. The contaminants or materials targeted for removal can include particulates, non-particulates, or a mixture thereof. Materials targeted for removal can include chemical species that can be captured by the media. The reference to removal of components and contaminants should be understood to refer to the complete removal or separation or a partial removal or separation.

Referring now to the figures, various example embodiments of the invention will be described. FIGS. 1 through 6 show an example filter element constructed in accordance with the invention. While example flutes on opposing pleat faces in this example filter element are shown substantially touching along the entire flute's length, it is understood that flutes of this invention may not touch along their length or may touch only occasionally along their length. FIG. 1 shows a filter element 100 from a front perspective view. The filter element 100 includes a frame 102 surrounding pleated filter media 110. The front face 108 of filter media 110 is shown in FIG. 1, and the filter media 110 has a corresponding back face 109 shown in FIG. 3. In addition, the frame has a right side 104, a left side 105, a top 106, and a bottom 107.

Figure 2A:
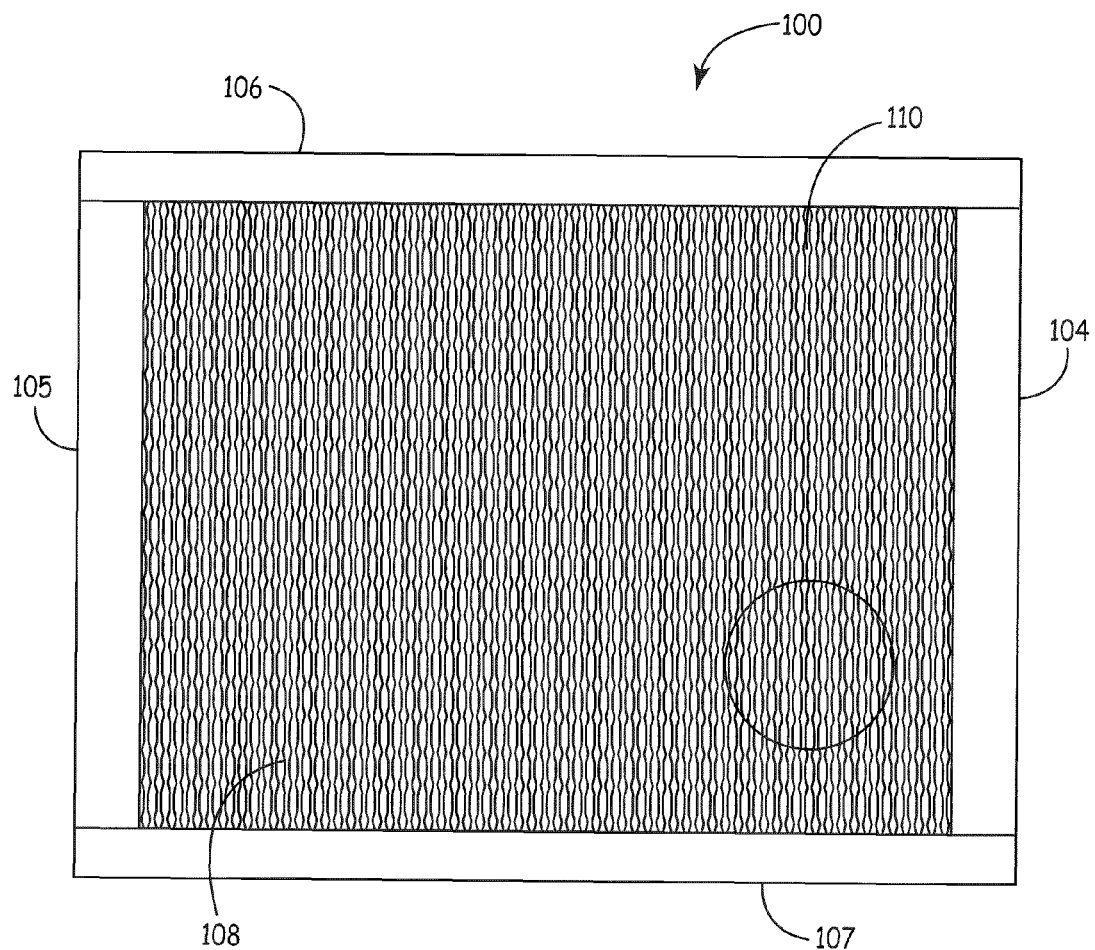
FIG. 2A is a front view of the filter element of FIG. 1.
Figure 2B:
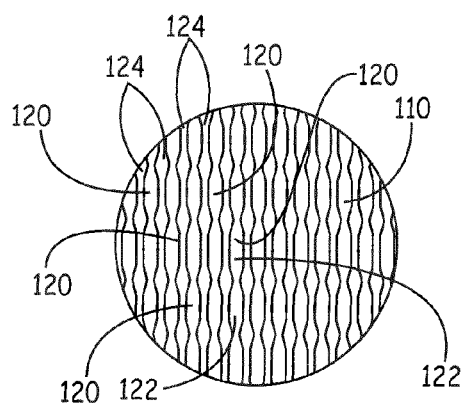
FIG. 2B is a close-up front view of the filter element of FIG. 1.

FIG. 2A shows a schematic front view of the filter element 100 depicted in FIG. 1, with FIG. 2B showing a simplified close-up view of the front face of pleated filter media 110. The close-up view of the pleated filter media 110 depicts an end view of the pleats 120, including the tips 122 of numerous pleats, along with a space 124 between each pleat. It will be understood that the close-up view of the pleated media remains substantially schematic in presentation, and is thus not intended to be a detailed representation of actual media.

Figure 3A:
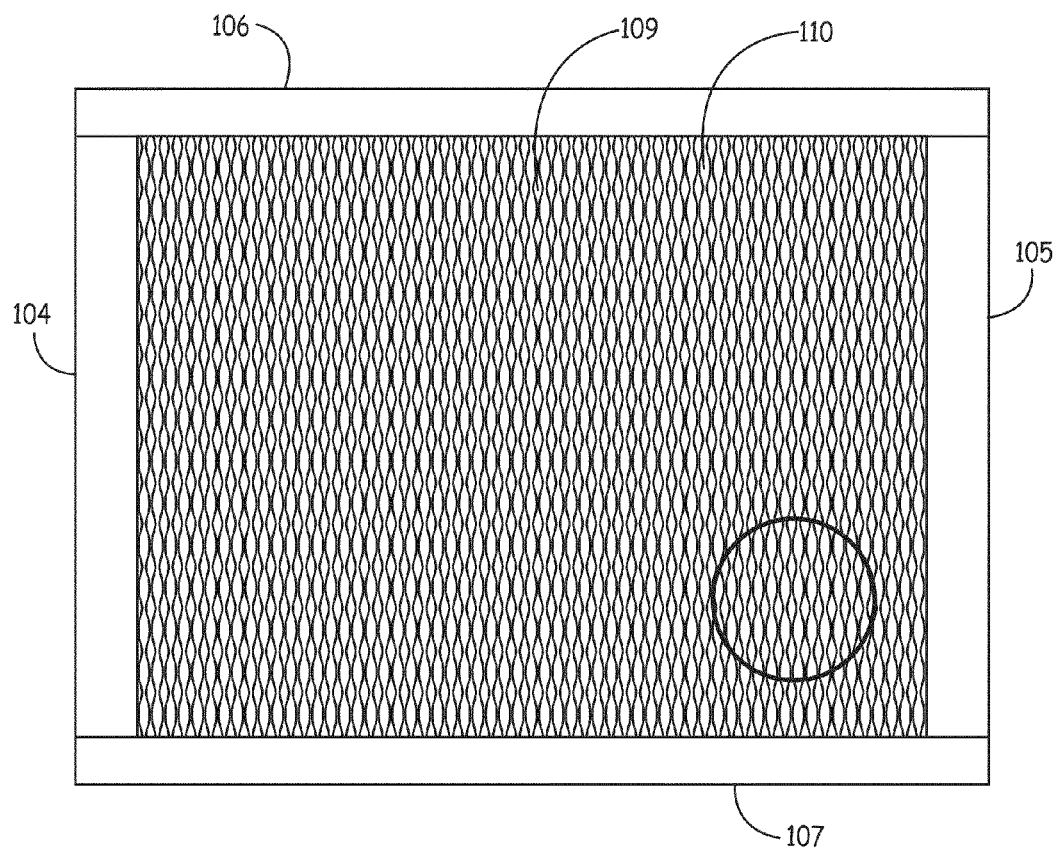
FIG. 3A is a back view of the filter element of FIG. 1.
Figure 3B:
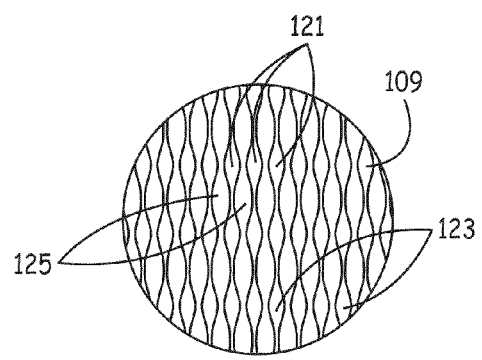
FIG. 3B is a close-up back view of the filter element of FIG. 1.

The front face 108 of the filter media 110 is typically the "upstream" side of filter element 100, and the back face 109 (shown in FIGS. 3A and 3B) is the "downstream" side of the filter element 100. Thus, in a typical embodiment, the flow of fluids through the filter element 100 is from the front face 108, into the interior of filter element, and then out through the back face 109 (while passing through the filter media 110). The back face 109 shown in FIG. 3B depicts a simplified schematic view of the pleat pack surface, including a plurality of pleats 121 with pleat tips 123 and spaces 125 between the pleats 121.

Reference is now made to FIGS. 4, 5A, 5B, and 5C, which show further details of an example of pleated media having tapered flutes made in accordance with the teachings of the invention.

Figure 4:
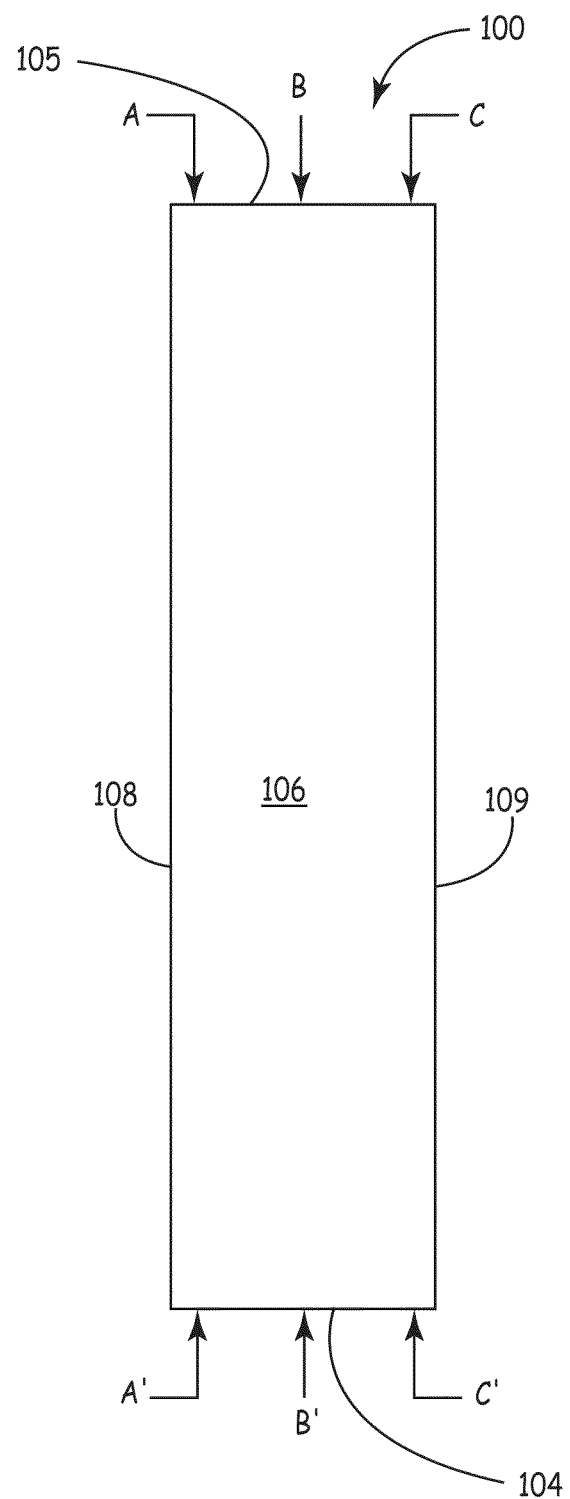
FIG. 4 is a side view of the filter element of FIG. 1, showing a series of planes dividing the filter element into cross sections depicted in FIG. 5A-5C
Figure 5A:
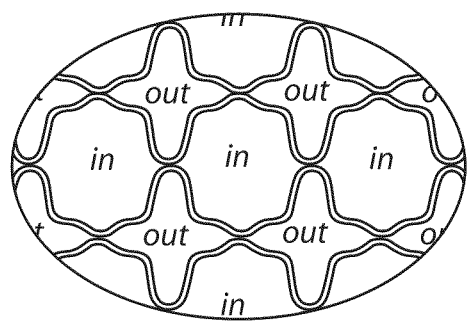
FIG. 5A is a close-up cross section of filtration media from the filter element of FIG. 1, the cross section taken along plane A-A' of FIG. 5.
Figure 5B:
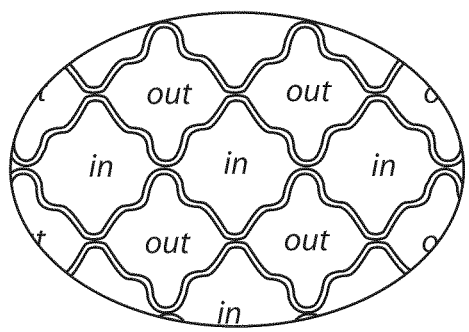
FIG. 5B is a close-up cross section of filtration media from the filter element of FIG. 1, the cross section taken along plane B-B' of FIG. 5.
Figure 5C:
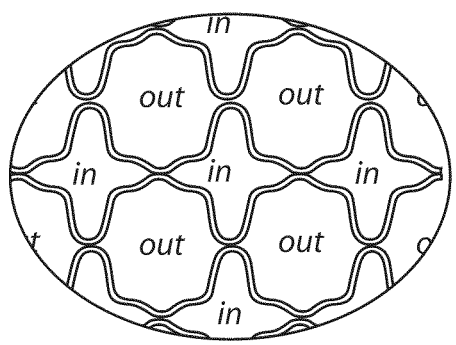
FIG. 5C is a close-up cross section of filtration media from the filter element of FIG. 1, the cross section taken along plane C-C' of FIG. 5.

FIG. 4 shows the right side panel 104 of the filter element 100 depicted in FIG. 1. Sections of planes A-A', B-B', and C-C' are depicted in FIGS. 5A to 5C. Plane A-A' corresponds to a cross section of element 100 taken near the front face 108 of the element 100; plane B-B' corresponds to a cross section of element 100 taken near the center of element 100, approximately half way between front face 108 and back face 109; plane C-C' corresponds to a cross section of element 100 taken near the back face 109 of the element 100. Although sections A-A' and B-B' can be taken very close to adjacent front face 108 and back face 109, typically there will be at least modest deformation of the flutes at the location where the pleat fold is made. Therefore, FIGS. 5A to 5C represent cross sections that are close to the pleat folds, but not necessarily immediately next to the pleat folds.

FIG. 5A shows a close-up of the media 110 taken along plane A-A'. Flutes that are deemed to be upstream in the media pack are identified with the title "in" (because fluids are flowing into the pleat pack in these flutes), while flutes that are designated downstream in the media pack are identified with the title "out" (because fluids are flowing out of the pleat pack in these flutes). FIG. 5A shows upstream flutes 210 surrounded by adjacent downstream flutes 220. A fluid entering a pleat pack by way of an upstream flute 210 is able to flow along the flute, but eventually passes through filter media 110 and then out of the pleat by way of a downstream flute 220 (with the exception of small amounts of fluid that will pass through the actual pleat fold).

It will be observed in FIG. 5A that the upstream flutes 210 have a significantly larger cross sectional area than the downstream flutes 220 (at location A-A' of FIG. 4). It will also be observed in FIG. 5A that there is relatively little masking between adjacent layers of filter media 110. As the flutes extend deeper into the filter element, the upstream flutes 210 begin to reduce, or taper down, in cross sectional area while the downstream flutes 220 begin to increase, or taper up, in cross sectional area. By the center of the filter element, shown in FIG. 5B, the downstream flutes 220 are substantially equal in cross sectional area to the upstream flutes 210. The tapering continues until the cross section shown in FIG. 5C, where the upstream flutes 210 have a significantly smaller cross sectional area than the downstream flutes 220. Of note is the fact that this significant amount of tapering has been accomplished in the depicted embodiment without any increase in masking along the flute length, and while maintaining the height and width of the flutes and that the upstream and downstream flutes each have substantially the same perimeter length of media forming each flute. In this example, only the cross sectional areas of each flute change along the flute length. As will be further described later, alternative embodiments can change flute height and width. Thus, FIGS. 5A through 5C show a useful embodiment of tapered flutes constructed in pleated media, but alternatives are possible while remaining within the scope of the invention.

It will also be observed, from FIGS. 5A to 5C that the tapered flute configuration is accomplished with relatively little masking of media between adjacent flutes, and with no change in the surface area available for filtration. In other words, the tapering of the flutes occurs without changes to the amount of exposed media on either the upstream or downstream flutes. The arrangement of the tapered flutes in FIGS. 5A to 5C show an implementation where the upstream side of the media near the front face has large open flutes, and the downstream side of the media near the back face also has large open flutes. The result is a configuration allowing improved filter performance in many circumstances, such as for relatively deep pleated filter elements, including those that are greater than 2 inches deep, greater than 6 inches deep, and in particular greater than 10 inches deep.

Figure 6:
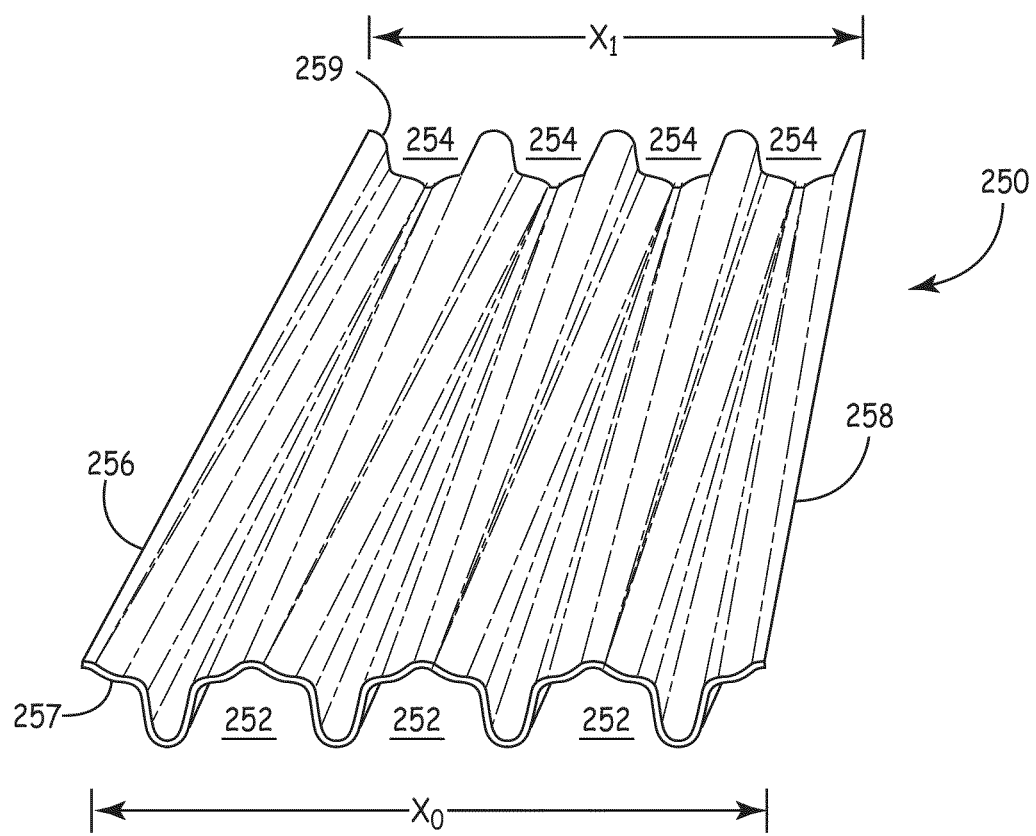
FIG. 6 is a close-up perspective view of a portion of a sheet of filtration media taken from filter element of FIG. 1.

FIG. 6 shows a section of a sheet of filter media 250 that will produce flute geometries consistent with the flutes shown in FIGS. 5A to 5C. The section of a sheet of media 250 reveals how the tapered flute transforms from relatively large upstream flutes 252 to relatively large downstream flutes 254. In this view, which is drawn as a perspective view and not to scale, the numbers $X_0$ and $X_1$ are used to represent the width of the pleated media (or at least the section depicted, which is 4 flutes wide). Generally the pleated media is formed such that $X_0$ and $X_1$ are equal, which allows for media to be easily created that has perpendicular sides. However, it should be understood that in some implementations $X_0$ can be either greater or less than $X_1$. In such configurations the difference in $X_0$ and $X_1$ can manifest itself by having pleat packs wherein the dimensions of the front face of the pleat pack are different than the dimensions of the back face of the pleat pack. While such variations will not be suitable for all applications, the ability to alter pleat pack geometry is advantageous for some implementations.

Of additional significance is that the tapered transitions evident in FIG. 6 from large to small flute cross sectional areas (and small to large flute cross sectional areas) can be created without significant strain on the media sheet 250. In particular, the flutes can be created without excess stretching of the media because the length of the media forming the flutes, when measured from side 256 to 258 is generally equal along the pleat surfaces from a front face of the pleat pack to a back face of the pleat pack (e.g. the lengths are substantially the same measured at sections A-A', B-B', and C-C' as represented in FIG. 4). Thus, tracing the distance along the front edge 257 of the media may equal or nearly equal the distance traced along the back edge 259 in certain embodiments. Therefore, excess stretching of the media does not typically occur in forming the flute geometries—a characteristic that can be very important to the production of fluted media using high-cellulose filter media and glass fiber filter media, as well as other media that does not easily stretch without degradation. In example implementations the amount of stretching of the media in the cross web direction is less than 10 percent, often less than 7.5 percent, and desirably less than 5 percent.

Figure 7:
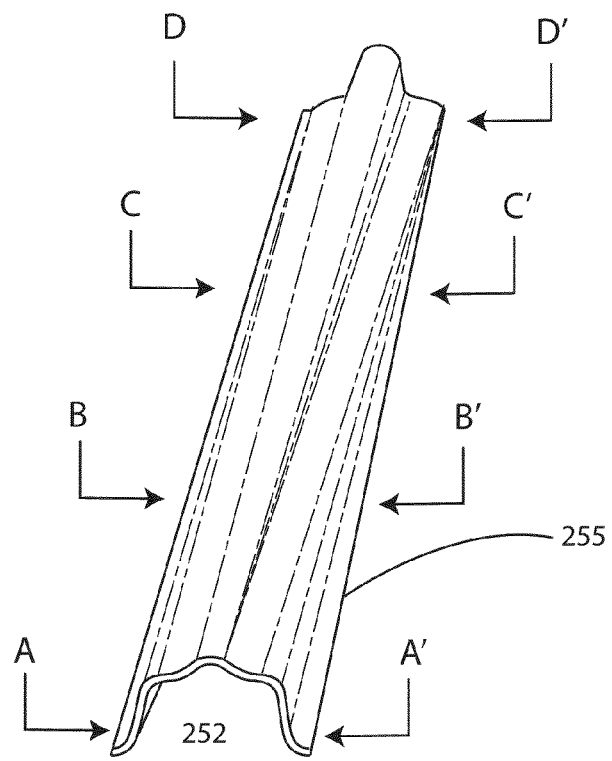
FIG. 7 is a close-up perspective view of an individual flute taken from the filter element of FIG. 1.
Figure 8A:
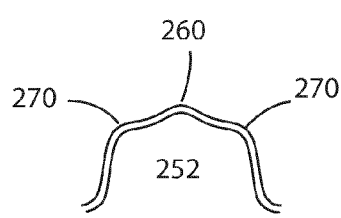
FIG. 8A is a cross sectional view of a portion of a sheet of filtration media shown in FIG. 7, the cross section taken along lines A-A' of FIG. 7.

A further aspect of the fluted media made in accordance with an implementation of the invention is revealed by reference to FIG. 7, along with cross sections shown in FIGS. 8A, 8B, 8C, and 8D. Flute 252 is shown tapering from a front face with a large upstream opening to a back face with a smaller upstream opening. The manner in which this taper occurs is evident by reviewing cross sections taken along plane A-A'; plane B-B'; plane C-C'; and plane D-D'; corresponding respectively to FIGS. 8A, 8B, 8C, and 8D. In FIG. 8A the volume underneath the media 255 is enhanced by having a ridge 270 that causes the media to extend outwardly from the interior of flute 252. In addition, the flute 252 includes peaks 260 that project upward slightly from the adjacent media (so as to reduce masking). Although this upward projection of peak 260 is relatively subtle and can be difficult to visually observe, it still aids in reduction of masking of the media.

Figure 8B:
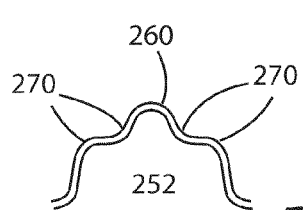
FIG. 8B is a cross sectional view of a portion of a sheet of filtration media shown in FIG. 7, the cross section taken along lines B-B' of FIG. 7.
Figure 8C:
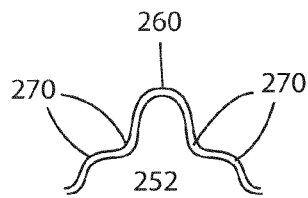
FIG. 8C is a cross sectional view of a portion of a sheet of filtration media shown in FIG. 7, the cross section taken along lines C-C' of FIG. 7.
Figure 8D:
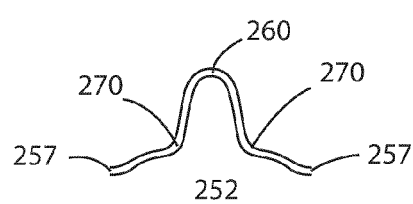
FIG. 8D is a cross sectional view of a portion of a sheet of filtration media shown in FIG. 7, the cross section taken along lines D-D' of FIG. 7.

Progressing down the flute 252, at cross section B-B' shown in FIG. 8B, the peak 260 has become even more defined. In addition, the single ridge 270 on each side of the peak 260 of FIG. 8A has diverged into two ridges 270 on each side of peak 260. The two ridges help to modify the shape of the flute such that the cross sectional area of flute 252 is starting to show a decrease from that shown in FIG. 8A. This change continues through cross section C-C' in FIG. 8C, where the peak 260 remains, but the two ridges 270 on each side of the peak 260 have moved further from the peak 260, thereby even further diminishing the cross sectional area of the flute 252. Finally, at the far end of flute 252, taken along cross section D-D', the cross sectional area of the flute is even smaller, with peak 260 being very well defined, but with only one ridge 270 evident, due to the second ridge merging into the edge 257 of the flute 252 (which also corresponds to a peak of an adjacent flute). The flute geometry shown in FIGS. 7 and 8A-8D describe an example embodiment demonstrating how the tapered flutes can be created, but are not meant to represent the exclusive manner in which such flutes can be formed.

Flute Features and Fluted Media Characteristics

Explanation will now be made of features of tapered flutes made in accordance with the invention, including the presence of flute ridges, flute width and height, cord length of the flutes, media cord percentages, media volume asymmetry, flute density, flute peak radius, and flute orientation.

Flute Ridges

Figure 9C:
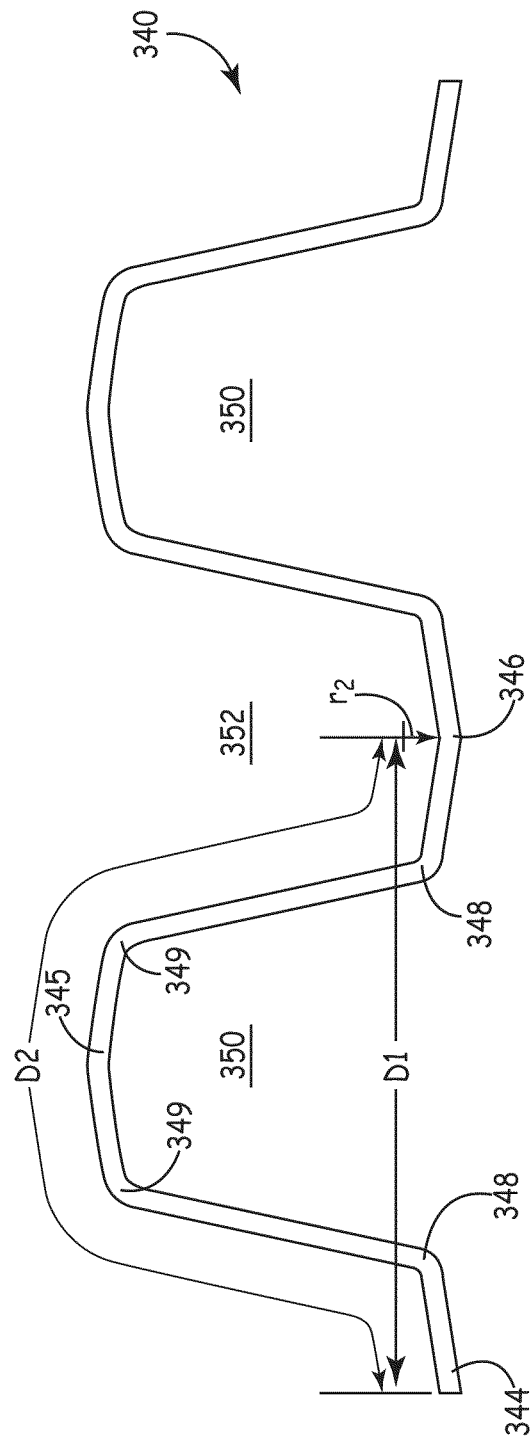

Now referring to FIGS. 9A-9C, cross-sectional views of various fluted media sheets suitable for construction of tapered flutes are shown. It will be noted that FIGS. 9A-C are not intended to be scale drawings of all acceptable flute geometries, but rather merely show example implementations.

In FIG. 9A, a segment of fluted media sheet 300 is shown with flutes 310. In addition, media sheet 300 also forms a flute 312 between flutes 310. Although not depicted in FIG. 9A, media 310 would typically extend with numerous additional flutes, and additional media sheets would be present in a media pack, such as shown in FIGS. 5A to 5C. The fluted media sheet 300 reveals a number of features which provide for superior filtration performance. One feature of the flutes 310 in media sheet 300 is that the tallest extent at peaks 301 and 303 have a sharp tip or point, rather than simply a curved surface. A sharp tip or point may be approximated by a model of the flute tip consisting of a relatively small radius. Sharp tips can be useful because large radii result in increased masking of media when adjacent flutes from opposing pleat faces touch. Flutes 310 further have peaks 302 and 304. The peaks 302, 304 in media sheet 310 are more curved than the peaks 301 and 303. However, in other implementations the peaks 302 and 304 can be constructed such that they are also relatively sharp. Flute peaks 301 and 303 can be referred to as adjacent first side peaks, and the peaks 302 and 304 can be referred to as adjacent second side peaks. The characterization of certain peaks as first side peaks and other peaks as second side peaks is arbitrary, and can be reversed, if desired.

The flutes 310 have a series of ridges 308 that help in defining the interior volume and shape of the flutes 310. Ridges can be created in the media as a result of deformation of the media at that location. The media can be deformed at the ridge as a result of applying pressure to the media. Changing of the location of the ridges 308 can significantly impact the taper of flutes 310 while simultaneously changing the taper of opposed flutes 312. Thus, for example, movement of ridges 308 toward lower pleat peak 304 can result in increasing the cross sectional area of flute 312 while decreasing the cross sectional area of flute 310. In some such implementations the relative width to height ratio of the flutes can change, while in other implementations this ratio stays substantially constant.

The fluted media 300 is shown having two ridges 308 for each flute 310. The ridges 308 extend along at least a portion of the length of the flute. In some embodiments each ridge 308 can be characterized as a general area where a relatively flatter portion of the fluted media 308a joins a relatively steeper portion of the fluted media 308b. The use of the term "ridge" is intended to characterize a portion of the media that is not considered a peak. That is, ridges can be provided between peaks, and ridges can be considered non-peaks. A ridge can be considered a line of intersection between differently sloped media portions.

In some implementations the appearance of the ridge will be somewhat obscured by irregularities in the media itself. The characterization of a ridge is not to be confused with the flute peaks. The characterization of a generally flatter portion 308a and a generally steeper portion 308b is intended as one way to characterize the presence of a ridge 308. In general, the flatter portion 308a and the steeper portion 308b may exhibit some curve. That is, it is expected that the flatter portion 308a and the steeper portion 308b will not be completely planar, particularly as fluids such as air or liquid flow through the media during filtration. More specifically, a ridge can be a region of transition between substantially differently sloped media portions within the profile of a section of fluted media. Ridges identify discontinuities in the curvature of the media, such as a crease or bend (see, e.g., 308 of FIG. 9A). The transition can be relatively abrupt. Under normal usage, ridges do not contact ridges from other adjacent pleats. Ridges promote efficiency of fluid flow and filtration through the media packs by allowing customization and optimization of the cross sectional area of the flutes, increases in the amount of media within a specific volume, and aiding in reduction of masking between flutes on opposed media surfaces.

Proper ridges are particularly useful for tapering the cross sectional area of the flute without changing the height or width of the flute and without requiring significant stretching of the media. Also, ridges may allow for tapered changes in the cross sectional area without changes in the total surface area of the flute.

For the example fluted sheet 300, the relatively flatter portion of the fluted media 308a can be seen in FIG. 9A as the portion of the fluted media extending between the peak 301 and the ridge 308. The relatively steeper portion of the fluted media 308b can be characterized as that portion of the media extending from the peak 302 to the ridge 308. The presence of the ridges of the media shown in FIG. 9A helps provide for reduced masking at adjacent peaks 301 and 302. The presence of the ridges 308 help increase the amount of media present between adjacent peaks (e.g., peaks 301 and 302; or 301 and 304) and helps sharpen the peaks.

It will also be observed that tapered flutes produced using ridges typically also have tapered ridges, such as ridges that converge toward one another, diverge from one another, or converge upon a flute peak. Such convergence is apparent, for example, in FIGS. 7 and 8A to 8D, discussed above.

A ridge can be formed as a result of creasing, bending, folding, coining or otherwise manipulating the media along a length of the fluted sheet during the formation of the fluted media. It may be desirable, but it is not always necessary, during the step of forming the fluted media to take steps to set the ridge. Setting the ridge means removing residual stress within the media in the ridge so that the media tends to stay in the formed shape. For example, the ridge can be set by heat treatment or moisture treatment or a combination thereof. In addition, the ridge can exist as a result of creasing, bending, or folding without an additional step of setting the ridge.

The presence of a ridge can be detected by visual observation. While the presence of the ridge may not be particularly apparent from viewing the end of a flute due to obscuring the flute at the pleat fold, one may cut into the filter element and see the presence of a ridge extending along a length of a flute. Furthermore, the presence of a ridge can be established (in some implementations) by a technique where the filter element is loaded with dust, and the fluted sheet peeled away to reveal a cake of dust having a ridge corresponding to the ridge on the fluted media. The intersection of the two portions of the dust surface cake forms an impression of the ridge, revealed as a discontinuity in the curvature of the media. In an example implementation, the dust that can be used to load the media to fill the flutes to provide a cake of dust within the flutes can be characterized as ISO Fine test dust. Impregnation of a clean filter element with a resin (such as epoxy) which is allowed to harden, and then cut into segments, is a further effective technique to identifying the interior geometry of a tapered flute made in accordance with the invention. Ridges, even very subtle ones, can be identified using this technique.

Although ridges are very useful, it is also possible to have suitable tapered flutes with significantly fewer ridges, less extensive ridges, or no ridges at all. In some implementations less than 25% of the flutes in the pleated filtration media pack have at least one ridge between adjacent flute peaks. Alternatively, in some implementations less than 50% of the flutes in the pleated filtration media pack comprise at least one ridge between adjacent flute peaks. It will be understood that in some implementations at least 75% of the flutes in the pleated filtration media pack comprise at least one ridge between adjacent flute peaks.

The characterization of the presence of a ridge should be understood to mean that the ridge is present along a length of the flute, but not necessarily along the entire length of the flute. In general, the ridge can be provided along the flute for a length sufficient to provide the resulting media with the desired performance, in particular a tapered form. While a ridge may extend the entire length of the flute, it is possible that the ridge will not extend the entire length of the flute (100% of the flute length) as a result of, for example, influences at the ends of the flute such as pleating or folding.

Preferably, the ridge extends at least 10% of the flute length, more typically 25% of the flute length. By way of example, the ridge can extend at least 30% of the flute length, at least 40% of the flute length, at least 50% of the flute length, at least 60% of the flute length, or at least 80% of the flute length. Such ridges can extend in a continuous or discontinuous fashion along the length of the flutes. Also, the ridges can be uniformly distributed along flutes, or can be non-uniformly positioned along the length of the flutes. For example, in certain embodiments in may be desirable to have the flutes distributed such that they have more or fewer ridges near either the upstream or downstream face of a media pack. In addition, the position of the ridge on the flute can be changed to modify taper.

For example, in some implementations at least 25% of the flutes in the pleated filtration media pack have at least one ridge between adjacent flute peaks, the ridge extending along at least 25% of the flute length between the first set of pleat folds and the second set of pleat folds. Alternatively, in some implementations at least 25% of the flutes in the pleated filtration media pack comprise at least one ridge between adjacent flute peaks, the ridge extending along at least 50% of the flute length between the first set of pleat folds and the second set of pleat folds. It will be understood that in some implementations at least 50% of the flutes in the pleated filtration media pack comprise at least one ridge between adjacent flute peaks, the ridge extending along at least 50% of the flute length between the first set of pleat folds and the second set of pleat folds.

Alternative designs are also contemplated and within the scope of the present invention. For example, in some implementations at least 25% of the flutes in the pleated filtration media pack have ridges between adjacent flute peaks that extend along at least 10% of the flute length between the first set of pleat folds and the second set of pleat folds. In some implementations at least 50% of the flutes in the pleated filtration media pack have at least one ridge located between adjacent flute peaks and extending along at least 10% of the flute length between the first set of pleat folds and the second set of pleat folds. In some implementations at least 10% of the flutes in the pleated filtration media pack contain at least one ridge between adjacent flute peaks and extending along at least 10% of the flute length between the first set of pleat folds and the second set of pleat folds.

One advantage of the present invention is that the flute geometries, typically including flute height, flute width, sharp flute peaks and optionally one or more ridges along the flutes, allow for greater amounts of overall media surface area to be included in filtration media pleat packs, for improved utilization of that media with minimal masking, and tapering of the media without excessive stretching of the media. This provides the capability to increase filter performance without increasing filter element size.

There is no requirement, however, that a ridge or two ridges be present between every adjacent peak, or that there is a repeating pattern. In some implementations, at least 25% of the flutes exhibit at least one ridge between adjacent peaks in order to achieve the benefits of the presence of the ridge. Even more preferably, at least 50% of the flutes, and more preferably 100% of the flutes exhibit at least one ridge between each adjacent peak of the flute.

Flute Width, Height and Media Length

In addition to characterization of the flutes 310 by presence of a flute peak 301, 303 and a ridge 308, it is possible to characterize the flutes in regard to width, height, and media length. In flute 310 of FIG. 9A, the flute width D1 is measured from the center point of the peak 302 to the center point of the peak 304. Alternatively, the flute width D1 can be measured from the center point of the peak 301 to the center point of the peak 303. With repeating regular flute geometries, these two measurements of D1 will be the same.

The absolute dimension of D1 will vary depending upon the application. Generally, however, D1 can scale up or down for various applications. For example, in a large diesel engine, D1 may have typical measures up to 0.5 inches or greater, with common ranges of 0.1 to 0.3 inches. In a fuel filter for a small gasoline powered engine, D1 may have typical measures of 0.010 inches to 0.030 inches. In a filter for a large gas turbine, D1 may typically be from 0.1 inches to 1.5 inches. These flute widths are mere examples, and it will be understand that D1 can be variable depending upon the application. Also, it will be understood that D1 can vary along the length of a flute in some implementations of the invention.

Yet another important dimension for the tapered flutes of the invention is the distance J, which is the flute height, measured from the flute peak 303 perpendicular to the plane formed by opposing peaks 302, 304. Distance J will also vary depending upon the application. Generally, however, J can scale up or down for various applications. For example, in a large diesel engine, J may have typical dimensions of from 0.03 inches to 0.08 inches. In a fuel filter for a small gasoline powered engine, J may have typical dimensions of from 0.03 inches to 0.08 inches. In a filter for a large gas turbine, J may typically be from 0.010 inches to 0.300 inches. In example gas turbine implementations J is, for example, less than 0.5 inches. These flute heights are mere examples, and it will be understand that J can be variable depending upon the application. Also, it will be understood that J can vary along the length of a flute in some implementations of the invention.

The ratio of flute width to height is also adjusted in some implementations of the invention. The flute width to height ratio is the ratio of the flute width D1 to the flute height J. The flute width to height ratio can be expressed by the following formula:

flute width to height ratio=$D1/J$

Measured distances such as flute width D1 and flute height J can be characterized as average values for the filtration media. Such measurements can be made along the flute length excluding a certain amount (such as 20%) of the flute length at each end (due to distortions in the flutes as a result of forming the pleat folds). Thus, the distances D1 and J can be measured away from the ends of the flutes because the ends of the flutes are typically deformed as a result of pleating. The flute width to height ratio can vary or remain over the length of the flute. An advantage of providing a tapered flute wherein the flute height or flute width varies over the length of the flute is the ability to reduce potential contacts between adjacent media surfaces and thereby reduce masking.

Generally suitable D1/J ratios will be less than 10, more typically less than 8, and often less than 6. If D1/J becomes too high, then the flow through the flutes can become too restricted because the flutes are too short, despite being quite wide. Also, significant structural deformation of the flute under pressure loads becomes more likely, which can result in the collapse of downstream flutes. Suitable D1/J ratios include greater than 1, more often greater than 1.5, and usually greater than 2. In most implementations the width to height ratio is at least about 2.0, generally at least 2.1, more typically at least 2.2, often at least 2.3, optionally at least 2.5, and optionally at least 3.0.

Other suitable D1/J ratios include, in example implementations, greater than 4, greater than 6, or greater than 8. Thus, suitable ranges include, but are not limited to, D1/J ratios of 2 to 10, 4 to 8, and 5 to 7. However, in some implementations flutes with extremely low D1/J ratios can be used (although such flutes are generally more difficult to manufacture). For example, D1/J ratios of less than 1.0, less than 0.75, and less than 0.50 are possible. In some implementations, flutes containing very high or very low D1/J values have better performance than flutes containing D1/J near values of 0.5 to 2.0. Suitable ranges of such ratios for D1/J include 2 to 8 and 0.075 to 0.500.

A further dimension for characterizing geometries of a flute is the dimension D2, corresponding to the media length along the perimeter of a flute at any given spot along the flute. D2 is greater than D1 with fluted media. The length D2 is defined as the length of the fluted sheet 300 for a period of the fluted sheet 300. In the case of the fluted sheet 300, the distance D2 is the length of the fluted sheet from the peak 302 to the peak 304. This distance includes two ridges 308. By providing one or more ridge between adjacent peaks of the fluted media, the distance D2 can be increased relative to prior art media, resulting in increased media in a given volume. As a result of the presence of a ridge or a plurality of ridges, it is possible to provide filtration media having more media available for filtration compared with, for example, pleated media not having the ridges. This is particularly valuable when combined with sharp flute peaks to reduce masking. This increase in media can be accomplished with little, or no, increase in masking, or even a decrease in masking. D2 is an especially useful parameter in the design and manufacture of tapered flutes. If the D2 values at different sections along the length of a pleat vary by an amount greater than the strain limit of the media, then rupture of the media can occur. Therefore, variations in D2 along the pleat face should be controlled to keep the variations within the strain limit of the media.

An additional aspect of flute geometry of importance is the relative values of flute width (D1) and media length along the flute (D2). The D2/D1 value is also useful in describing the pleated media. In some embodiments at least a portion of the flutes extending from the first set of pleat folds to the second set of pleat folds comprises a D2/D1 value that is greater than 1.0, often at least 1.05, and frequently at least 1.1. In some implementations D2/D1 is at least 1.15, and in other implementations at least 1.20. A higher D2/D1 value indicates increases in the amount of media provided along a given flute width, and can also result in an increase in height J of the flute. In some implementations D2/D1 is greater than 1.30, 1.40, or 1.50. Typical ranges for D2/D1 include, for example, from 1.05 to 2.0; from 1.10 to 1.75; and from 1.20 to 1.50.

Another property similar to flute width to height ratio that can provide a meaningful way to understand the flutes is "open channel width height ratio." In general, open channel width height ratio can be determined according to the formula:

open channel width height ratio=$D1/C$

In this formula, C is the open channel flute height which is the flute height (J) minus the media thickness (T) (See FIG. 9A). In order to enhance media performance, it is generally desirable to provide an open channel width to height ratio greater than about 2.25, greater than about 2.5, greater than about 2.75, or greater than about 3. The open channel width to height ratio is preferably less than about 10, less than about 9.5, less than about 9, less than about 8.5, less than about 8, less than about 7.5, or less than 6. In example implementations the open channel width to height ratio is from 2 to 7, is from 3 to 6, or from 4 to 5.

Cord Length, Media Cord Percentage, and Media Density

While reducing masking is desirable in order to enhance filtration media performance, another technique to enhance filtration media performance is to increase the amount of media area available for filtration in a given volume. The media configurations shown in FIGS. 9A-9C show techniques for enhancing the amount of media surface area present in a given volume. The media-cord percentage can help measure how a flute configuration, including a tapered flute, can provide a filtration media pack with enhanced media surface area in a given volume.

Another aspect of some implementations of the invention involves the cord length (CL) of the media to determine media-cord percentage. Cord length refers to the straight line distance from the center point of one peak to the center point of an adjacent peak (see, for example, adjacent peaks 301, 302 of FIG. 9A). In order to minimize the effect of the thickness of the media, the measurement for cord length is determined from a center point within the media.

The media-cord percentage requires a measurement of the cord length (CL). The relationship between the cord length CL and the media length D2 can be characterized as a media-cord percentage. The media-cord percentage can be determined according to the following formula:

$$\text{media-cord percentage} = \frac{((1/2D2) - CL) \times 100}{CL}$$

By providing a single ridge or multiple ridges between adjacent peaks of the fluted media, the distance D2 can be increased relative to prior art media. As a result of the presence of a ridge or a plurality of ridges, it is possible to provide filtration media having more media available for filtration compared with, for example, pleated media not having the ridges. The measurement of media-cord percentage can be used to characterize the amount of media provided between adjacent peaks.

The measurement of media-cord percentage can be used to characterize the amount of media provided between adjacent peaks. In example embodiments the media-cord percentage is greater than 1%, alternatively greater than 2%, 3%, 4%, or 5%. In some implementations media cord percentage is greater than 7.5 percent, or greater than 10 percent. Suitable ranges for media cord percentage include, for example, from 0.1% to 15%, from 0.5% to 10%, and from 1% to 5%. The media cord-percentage will not always be the same along the entire length of a flute, thus in some implementations of the invention, at least 25% of the flutes exhibit a media-cord percentage of at least 1% along 50% of the flute length. In alternative implementations at least 25% of the flutes exhibit a media-cord percentage of at least 2%, 3%, 4% or 5% along 50% of the flute length.

The existence of increased filtration media between adjacent peaks as a result of providing one or more ridges between adjacent peaks can be characterized by the media-cord percentage. For the flutes made in accordance with the present invention, the media-cord percentage can be greater than about 1%, greater than about 1.5%, and greater than about 2%. In some implementations the media-cord percentage is greater than 3%, and optionally greater than 4%. The media cord percentage can exceed 5% in some implementations. The media-cord percentage is generally less than about 25%, more typically less than about 20%.

It is also desirable to have a relatively large amount of media in a filter element, provided that there is not excessive masking of the media and that fluid flow through the media is not compromised. In this regard an increase in media length relative to flute width (D2/D1), while height J remains unchanged, reflects an increase in media within a given volume. Thus one measure of the media density within a pleated filter is the measure of the amount of media relative to volume. This can be calculated using the formula:

$$\frac{D2}{(D1 \times J)}$$

Generally media density as an indicator of filter performance is optimized by characterizing pleated media in terms of media density in addition to other parameters.

The flute cross section shown in FIG. 9A is an example of a flute constructed in accordance with the invention. An alternative flute construction is shown in FIG. 9B, showing fluted media 320 including flute 330 with four ridges 328 and 329 between adjacent peaks 324 and 326. Thus, a single period length of the media includes four ridges in the depicted embodiment. It should be understood that the ridges 328 and 329 are distinct from the peaks 324, 325, and 326. The media 320 can be provided so that there are two ridges 328 and 329 between adjacent peaks (e.g., peaks 325 and 326). In the alternative, there may be three or more ridges.

Flute 330 is similar to the flutes shown in FIGS. 5A, 5B, and 5C. Tapering of flute 330 can be accomplished by changing the positions of the ridges 328, 329 along the length of flute 330. Thus, if ridges 328, and 329 are slowly moved downward (away from peak 325 and toward the plane created by peaks 324 and 326), then the cross sectional area of flute 330 will gradually decrease, while the cross sectional area of adjacent flute 332 (defined by the media between peaks 325 and 327) increases. Thus, flute 330 can be a preferred "upstream" flute that gradually tapers down in cross sectional area until it reaches its minimum area near the back face of the media pack, while flute 332 can be a preferred "downstream" flute that gradually increases in cross sectional area until it reaches its maximum area near the back face of the media pack.

By varying the position of the ridges 328, 329 to alter the cross sectional area of the flutes 330, 332, it is possible to create significant taper in the flutes without changing the total length of media 320 in the flutes. This is advantageous for at least two reasons: First, there is no need to waste media to create the taper, such as by requiring some area of the media to fold over onto other areas of media. Second, formation of the tapered flutes shown in FIG. 9B by changing the location of the ridges 328, 329 avoids the need to significantly stretch the media, which permits high-cellulose media and other relatively low-stretch media to be used, such as media containing glass and ceramic fibers.

It is thus possible to taper the flutes 330 and 332 by changing the position of the ridges 328 and 329 relative to the peaks 324, 325, and 326, while simultaneously keeping the distances between the peaks relatively constant (within the limitations of the irregularities of the media). The height J and width D1 of the flutes 330 and 332 are not changed along the length of the flute (in the embodiment depicted). In the alternative, it is also possible to create a taper that demonstrates changes in these relative dimensions. For example, the height J of the flute 330 can be reduced along the length of the flute while simultaneously decreasing the distance between ridges 328 and 329.

The ridges 328, 329 can be provided as a result of the intersection of the relatively flatter portion of the fluted media and the relatively steeper portion of the fluted media. The relatively steeper portion of the fluted media can be characterized as that portion of the fluted media extending between the ridge 329 and the peak 325 and can be characterized (for example) as having an angle between the ridge 328 and the ridge 329. Peak 325 extends above the flatter portions of the fluted media. Thus, the peak 325 shows a defined protrusion from the adjacent fluted media, which helps to reduce masking between flutes on adjacent pleats of media.

Now referring to FIG. 9C, fluted media 340 is depicted, and includes flutes 350 and 352. Each flute 350 includes at least two ridges 348 and 349 between the adjacent peaks 344 and 345 (for a total of four ridges per flute at the cross-section shown). Thus, along the length D2 of flute 350, the media 340 includes four ridges 348 and 349. Tapering of flutes 350 and 352 can be accomplished by moving the positions of ridges 348 and 349. To increase the area under flute 350, the ridges 348 and 349 are moved away from peak 345 and toward peaks 344 and 346, as shown in FIG. 9C. This results in a simultaneous diminishment in the cross sectional area of flute 352, but can be accomplished with little or no need to stretch the media sheet 340. The tapering can also occur, for example, by having the ridges 349 converge upon the peak 345; by having the ridges 348 converge on peaks 344 and 346, or by having the two ridges converge on one another.

There is no requirement that between each adjacent peak there are two ridges. There can be more than two or less than two ridges. There can be an absence of ridges between peaks if it is desirable to have the presence of ridges alternate or provided at intervals between adjacent peaks. However, even in the absence of ridges, it is desirable to have even slightly pointed peaks, such as the peak 345 shown in FIG. 9C, because such peaks can provide meaningful reductions in masking.

In general, a pattern of flutes can be provided where the pattern of flutes repeats and includes the presence of ridges between adjacent peaks. The fluted sheets 300, 320, and 340 are shown as relatively symmetrical from peak to peak. That is, the flutes repeat having the same number of ridges between adjacent peaks. Adjacent peaks refer to the peaks next to each other along a length of fluted media. A period of media, however, need not have the same number of ridges between adjacent peaks, and the media can be characterized as asymmetrical in this manner. That is, the media can be prepared having a ridge on one half of the period and not having a ridge on the other half of the period.

FIG. 9A introduced the dimension D1, which is the flute width, and D2 which is the media length along a flute. In typical implementations of the invention, D1 and D2 will remain constant along the length of a flute. However, in some implementations it is possible to change either D1 or D2 along the length of a flute, but such changes are typically offset by opposite changes in D1 and/or D2 along the length of adjacent flutes. Thus, if one flute demonstrates a 50 percent total increase in D1 from one end to the other end of a pleat pack, it is typically necessary that opposite adjacent flutes demonstrate a 50 percent total decrease in D1 from one end to the other of the pleat pack.

If adjacent flutes do not undergo a corresponding opposite change in D1, the result is a tapered pleat pack where one face of the pleat pack will have a larger or smaller width than an opposite face. Similarly, if one flute demonstrates a 50 percent total increase in D2 from one end to the other end of a pleat pack, it is typically necessary that adjacent flutes demonstrate a 50 percent total decrease in D2 from one end to the other of the pleat pack. It is desirable to keep the sum of the D2 measurements across the width of the media constant, otherwise the media must undergo significant stretching, which is generally not feasible with high-cellulose media. This principle by which the total media length does not change along the pleat from one face to the other also generally holds true at the pleat folds. It is necessary that the pleat folds not require a greater cross-web media length than the width of the media used to form the fluted media. This is true because any increase in width of the media necessary to form the flutes results in increased strain on the media. Although many synthetic media materials can undergo more of such strain without significant deterioration in the media, high-cellulose media do not readily undergo more than just a few percent stretching. Therefore, especially when high-cellulose media is used, it is desirable and often necessary that the pleat folds not impart significant stretching forces on the pleated media.

Media Volume Asymmetry & Cross Sectional Area Asymmetry

A further characteristic of the tapered media of the present invention is the existence of media volume asymmetry in some implementations. Media volume asymmetry occurs when one side of a media pleat pack (either the upstream or downstream side) has a different volume than the other side of the media pleat pack. Such asymmetry may be created by the manner in which the flutes are constructed and how they taper. Media volume asymmetry, as used herein, generally measures the media volume ratio of the larger media volume bounded by the flute peaks to the smaller media volume bounded by opposite flute peaks (see, e.g., FIGS. 10 and 11A). In some, but not all implementations, the larger media volume corresponds to the upstream open media volume, and the smaller media volume corresponds to the downstream open media volume (during use the upstream volume may accumulate contaminants, such as dust).

Media volume asymmetry is beneficial for various reasons, including improved fluid flow and improved loading performance. In some implementations media will demonstrate a media volume asymmetry of more than 1%, more than 3%, more than 5%, or more than 10%. Example media constructions demonstrate a media volume asymmetry of greater than 15%, greater than 20%, greater than 50%, greater than 75%, greater than 100%, greater than 150%, and greater than 200%. Suitable media volume asymmetry ranges includes, for example, 1% to 300%, 5% to 200%; 50% to 200%; 100% to 200%; and 100% to 150%. Tapered flutes may incorporate media volume asymmetry to further enhance filter performance.

The media pack containing tapered flutes may also demonstrate media cross-sectional area asymmetry, which is calculated based upon a cross-section of the media at any given point. In a tapered flute, the cross-sectional area asymmetry will vary with measurement location along the depth of the fluted media pack. It will be understood that cross-sectional area asymmetry may lead to media volume asymmetry, but this is not always the case because tapered media cross sectional areas can be varied along the length of the flute so as to have a cumulative effect that the total volume on each side of the media is equal. Also, a given cross section of a media pack may indicate a higher cross-sectional area on an upstream side of the media, but subsequent tapering of the media could cause the overall media volume asymmetry to favor the downstream side in terms of total media volume.

In some embodiments the media pack will have a cross-sectional area asymmetry such that one side of the media has cross sectional area at least 1 percent greater than the opposite side the same piece of media. Often the difference in cross-sectional area across the media will be more than 3%, more than 5%, or more than 10%. Example media constructions demonstrate a media cross sectional area asymmetry of greater than 15%, greater than 20%, greater than 50%, greater than 75%, greater than 100%, greater than 150%, and greater than 200%. Suitable media cross sectional area asymmetry ranges includes, for example, 1% to 300%, 5% to 200%; 50% to 200%; 100% to 200%; and 100% to 150%.

The differences in cross sectional area are controlled by geometry of the flute design. Often the presence, number, and shape of ridges along the flutes significantly impacts, and often determines, the amount of cross sectional area asymmetry. Tapering of the flutes will generally result in a change in the cross sectional area asymmetry along the flute length. However, this is not always true, such as when the height J of a flute changes but the width D1 is kept constant. In such embodiments it is sometimes possible to keep the total cross sectional area constant by changing the relative position of ridges along the flute (or otherwise changing the distribution of the media along the flute).

Flute geometry that results in differences in cross sectional area can significantly impact flow properties through the flutes. Changes in relative cross sectional area of flutes typically results in changes in the cross sectional area of the upstream and downstream portion of the media pack in that area: If the upstream portion of the media pack undergoes an increase in cross sectional area, then the downstream portion of the media pack will also typically undergo an decrease in cross sectional area. The present invention allows for customization of media volume asymmetry and cross-sectional area asymmetry to improve filter performance.

Figure 10:
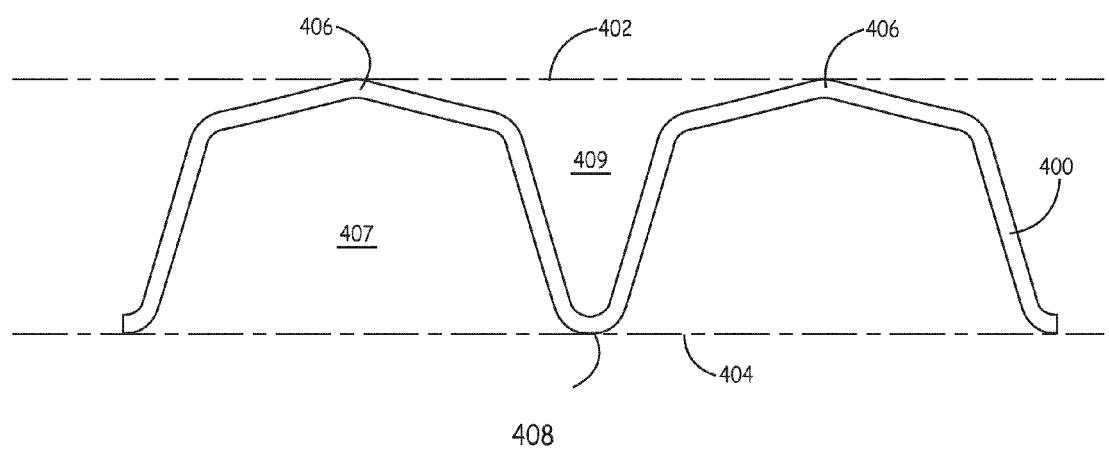
FIG. 10 is an enlarged cross sectional view of fluted media constructed in accordance with an implementation of the invention.
Figure 11A:
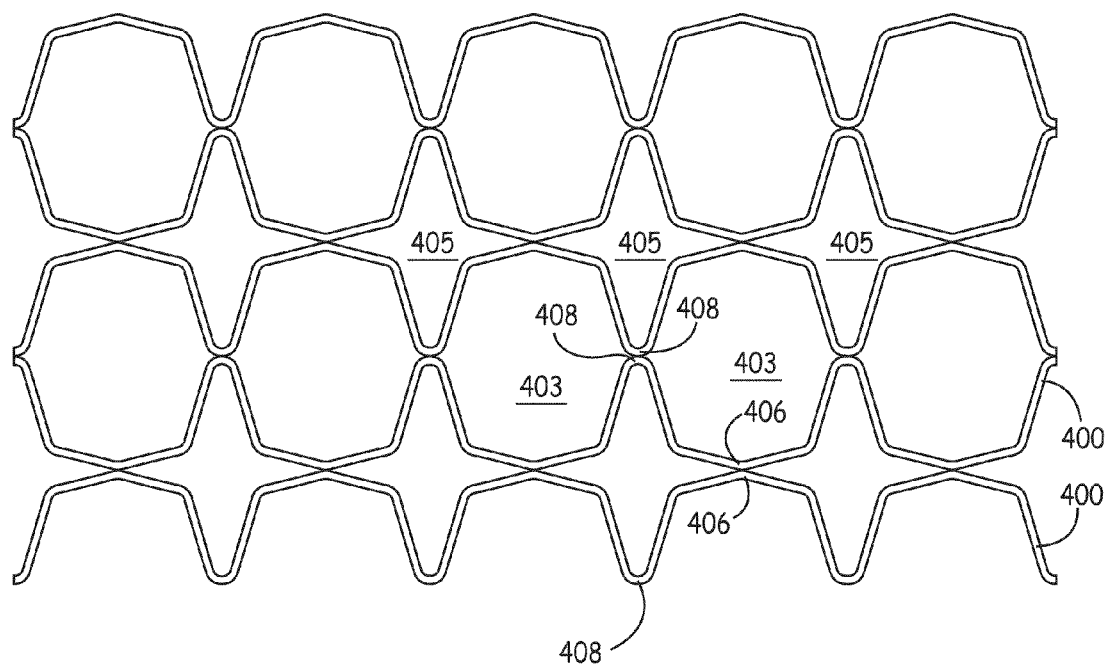
FIG. 11A is an enlarged, schematic cross-sectional view of a portion of a filtration media pack according to principles of the invention.
Figure 11B:
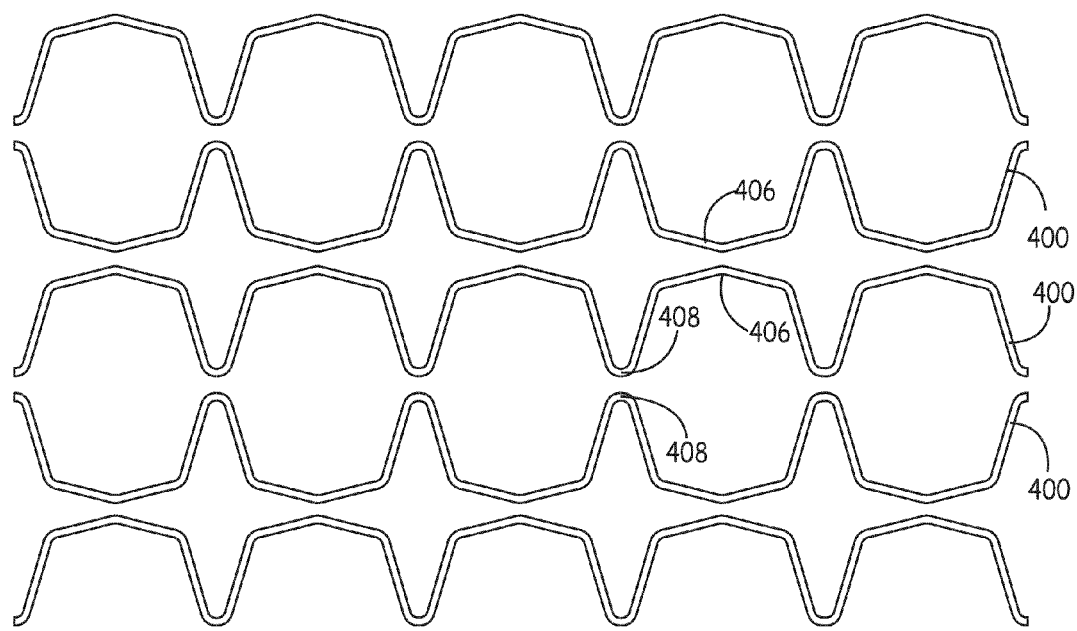
FIG. 11B is an enlarged, schematic cross-sectional view of a portion of a filtration media pack according to principles of the invention.
Figure 12:
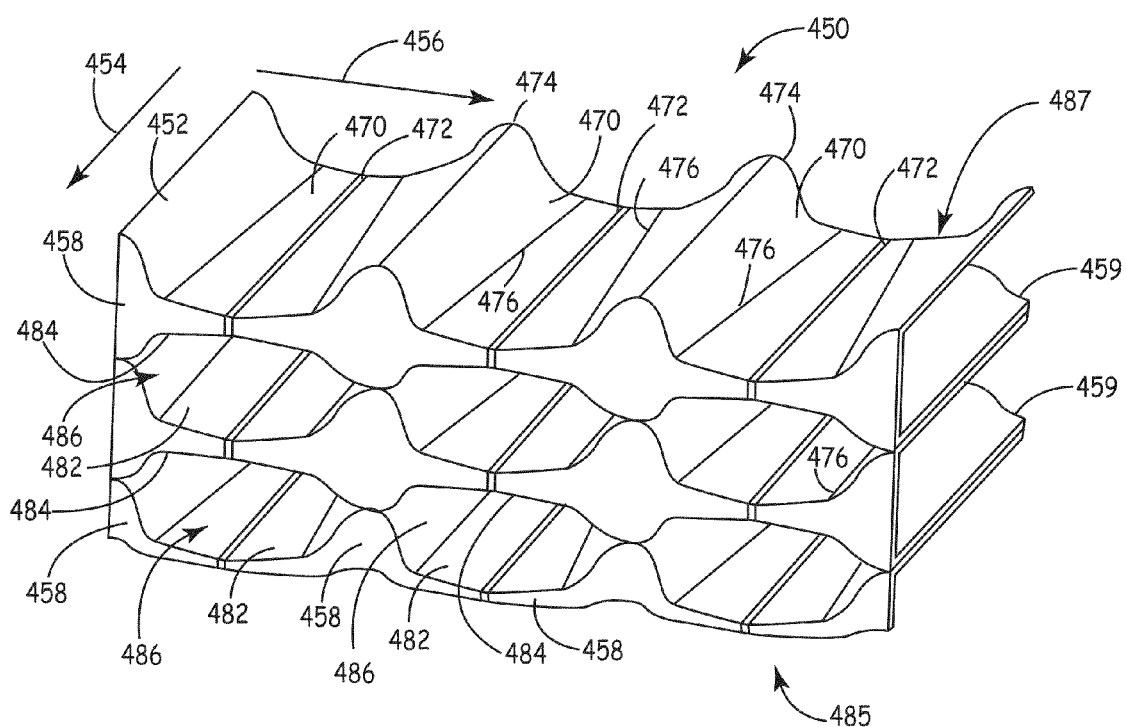
FIG. 12 is a perspective end view of a portion of a pleated filtration media pack according to the principles of the invention.

In order to further understand what is meant by the phrase, "media volume asymmetry," reference is made to FIGS. 10-12. In the case of FIG. 10, the media 400 is shown fluctuating between a first theoretical plane 402 and a second theoretical plane 404. The media volume asymmetry refers to the volume differential on one side of the media 400 compared with the other side of the media 400 between the theoretical planes 402 and 404 of the media pack. One way to characterize the theoretical planes 402 and 404 is to consider that the media 400 is pleated and sufficiently packed so that the peaks 406 and 408 contact opposing media surfaces as shown in FIG. 11a.

The media volume asymmetry is a measure of media fluting arrangement rather than by the packing arrangement within a media pack. An open cross-sectional area on one side of the media (FIG. 10, area 407) may be seen to be extending from one surface of the media, to a line defined by flute peaks on the same side of the media. This area is greater than an open cross-sectional area on the other side of the media (FIG. 10, area 409) bounded by the opposite surface of the media, and a line defined by opposing flute peaks. These cross-sectional areas define media cross-sectional area asymmetry for a given cross-section of media.

Extending cross-sectional area asymmetry from the upstream face to the downstream face of the pleat pack then characterizes upstream volumes and downstream volumes and in turn, media volume asymmetry. For a pleat pack, for cases where flute peaks do or do not extend from pleat fold to pleat fold, where the media between pleat folds shows little curvature and is substantially flat (where the centroids of sections of flutes in media between pleat folds substantially fall on a planar surface), the upstream media volume can be seen to be the volume enclosed by the upstream media surface, the contiguous surface at the pleat folds, and a convex hull formed over the flute peaks to center line of the pleat folds. The downstream media volume can be seen to be the volume enclosed by the downstream media surface, the contiguous surface at the pleat folds, and a convex hull formed over the flute peaks to center line of the pleat folds.

Referring now to FIG. 11A, the pleat packing arrangement shown can be characterized as pleat count maximum (PCMax) because it represents the largest number of pleats in a given volume wherein the flutes do not distort each other. In FIG. 11A, a sectional view of the media 400 is shown where the media 400 is pleated back and forth upon itself. Based upon the calculation of media volume asymmetry, the value of media volume asymmetry for the media arrangement shown in FIG. 11A is the same as the media volume asymmetry for the media arrangement shown in FIG. 11B, even though the peaks 406 and 408 do not touch in FIG. 11B. Accordingly, the definition of media volume asymmetry takes into account the potential separation between media surfaces that may exist when a media is pleated and formed into a pleated filtration media pack.

In regard to actual measurements, the theoretical planes 402 and 404 of FIG. 10 are determined based upon a statistical maximum peak value. Aberrations can be discarded from the calculation. For example, there may be an occasional peak that is either too high or too low and that does not significantly affect the packing density of the filtration media. Those peaks are not considered for purposes of calculating the theoretical planes 402 and 404. Furthermore, it should be understood that there may be occasions where peaks are skipped or formed at a height significantly below the average flute height in order to enhance volume asymmetry. In those cases, the reduced peak height would not affect the packing density calculation. In general, the packing density refers to the number of pleats available in a given volume with just the peaks of media surfaces touching as shown in FIG. 11A.

An advantage of calculating a "media volume asymmetry" is that the volume of the media (the upstream volume and the downstream volume) can be calculated based upon the media and the results can be different than the actual upstream and downstream volume of a filter element. For example, the media can be arranged as a panel where the peaks essentially just touch each other. In that case, the upstream volume and downstream volume of a filter element should be consistent with the "media volume asymmetry" calculation.

Alternatively, however, the media can be arranged in a configuration where the peaks do not touch each other. For example, the media surfaces can be sufficiently separated from each other in a panel filter element, or can be separated from each other as is the typical case in a cylindrical filter element. In those cases, the volume asymmetry in the filter element is expected to be different from the "media volume asymmetry" calculation. Accordingly, the use of the "media volume asymmetry" calculation is a technique for normalizing the calculation of volume asymmetry (or volume symmetry) for a filtration media pack based upon the media itself and irrespective of how the media is arranged or packed in a filter element. Another calculation that can have value is the actual volume asymmetry in a filter element. The actual volume asymmetry for a filter element refers to the volume asymmetry resulting from a difference in volume between an upstream side of the element and a downstream side of the element. The arrangement of the media (e.g., panel or cylinder) can affect this value.

Media cross-sectional area asymmetry can also be calculated by examination of a filter element, but the cross-sectional area is desirably measured away from the pleat folds. Thus, for example, the media cross-sectional area can be taken along a flute length over a distance that excludes three times the flute height from the pleat fold. The reason that the media cross-sectional area asymmetry is calculated away from the pleat folds is to avoid the influence of the pleat folds on the media cross-sectional area asymmetry calculation. Furthermore, it should be understood that the media cross-sectional area asymmetry may vary along a flute length. This variation can be a result of a flute taper.

With regard to media cross-sectional area asymmetry, the cross-sectional area of media will typically demonstrate asymmetry on each side of the media. As shown in FIG. 11A, a cross section shows an asymmetry in cross sectional area 403 with cross sectional area 405.

The three dimensional structure of flutes defines an open volume for flow of fluid, as well as space for contaminants (such as dust) to accumulate. In some embodiments the filtration media exhibits a media volume asymmetry such that a volume on one side of the media is greater than a volume on the other side of the media. In general, media volume asymmetry refers to the volume asymmetry between an upstream side and a downstream side of pleated filtration media containing flutes. The media volume asymmetry is caused by the media fluting arrangement rather than by the packing arrangement within a media pack.

Flute Density

Another technique for increasing the amount of filtration media available for filtration includes increasing the flute density of the media pack. The flute density refers to the number of flutes per cross-sectional area of filtration media in a filtration media pack. The flute density depends on a number of factors including the flute height J, the flute period D1, and the media thickness T. The flute density can be referred to as a media pack flute density, and is determined at pleat count maximum (PCMax). PCMax is the maximum pleat count concentration at which the pleat pack can be manufactured without deforming the flutes. In general, PCMax refers to the maximum number of pleats that can be placed in a given volume before performance suffers as a result of deformation of the flutes. For panel filters, PCMax pleat concentration is equal to 1/(2J). The equation for calculating the media pack flute density ($\rho$) for a filter element is:

$$\rho = \frac{\text{number of flutes}}{2 \times (\text{media pack cross sectional area})}$$

The flute density of a filter element can be calculated by counting the number of flutes including those flutes that are upstream and those flutes that are downstream in a cross sectional area of the filter element, and dividing that by two times the cross sectional area of the filter element at the location where the number of flutes was determined. In general, for regular media it is expected that the flute density will remain relatively constant across the length of the filter element from the inlet face to the outlet face, or vice versa.

It should be understood that the media cross sectional area refers to the cross sectional area of the media and not necessarily to the cross sectional area of the filter element. The filter element may have a sheath or a seal intended to engage a housing that would provide the filter element with a cross-sectional area that is greater than the cross-sectional area of the media. Furthermore, the cross-sectional area of the media refers to the effective area of the media pack, and does not include portions of the media pack not useful for filtration (such as areas obscured by the seal).

In general, providing a media pack having increased flute density has a tendency to increase the surface area of media within a volume of the media and, therefore, has a tendency to increase the loading capacity of the filtration media. Accordingly, increasing the flute density of media can have the effect of enhancing the loading capacity of the media. However, increasing the flute density of media can have the effect of increasing the pressure drop through the media assuming other factors remain constant.

Increasing the flute density of filtration media often results from decreasing the flute height (J) or the flute period length (D1), or both. As a result, the size of the flute (the size of the flute refers to cross sectional area of the flute) decreases as flute density increases. Smaller flute sizes can have the effect of increasing the pressure drop across the filtration media pack. The reference to a pressure drop across the media pack refers to the pressure differential determined at a first face of the media pack relative to the pressure measured at a second face of the media pack, wherein the first face and the second face are provided at generally opposite sides of the media pack. The pressure drop across the media pack depends, in part, on the flute density and the flute length.

Figure 13:
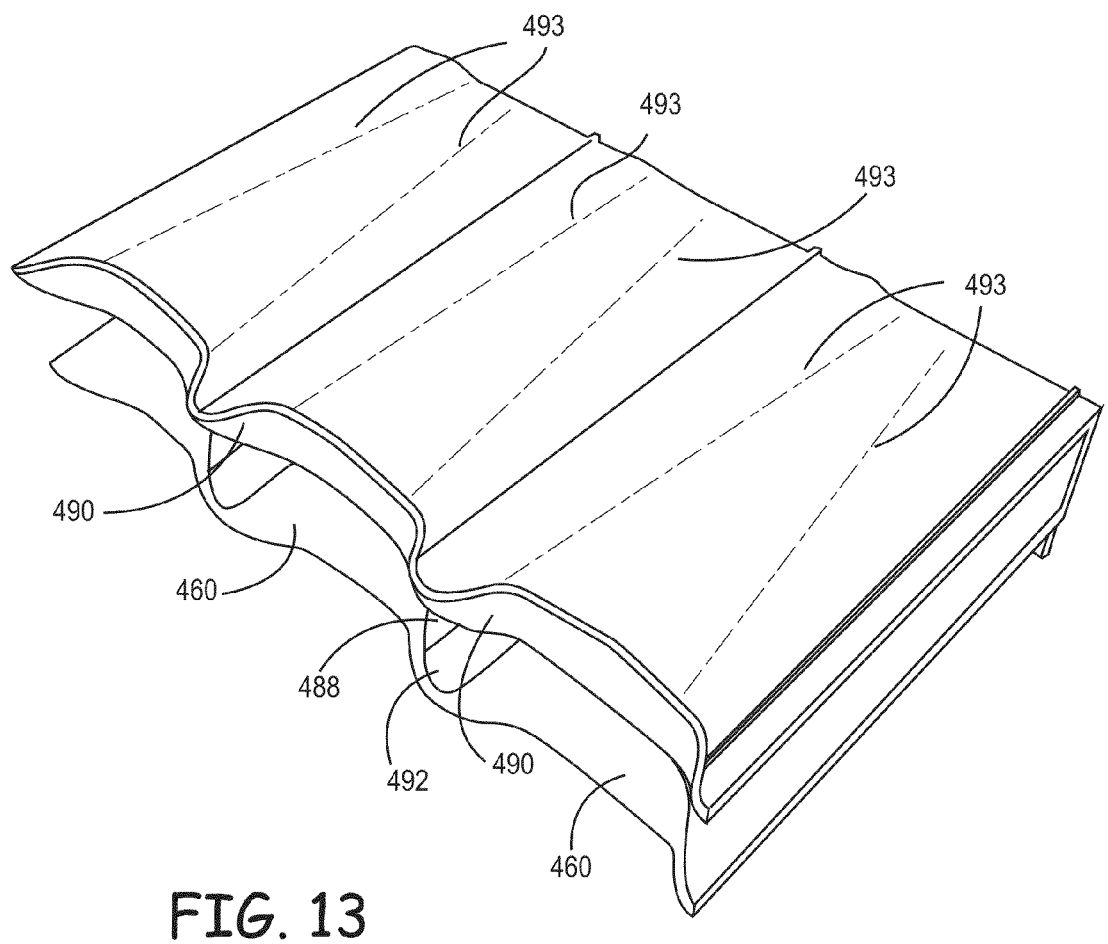
FIG. 13 is an enlarged partial perspective view of a portion of a filtration media pack made in accordance with an implementation of the invention.
Figure 14:
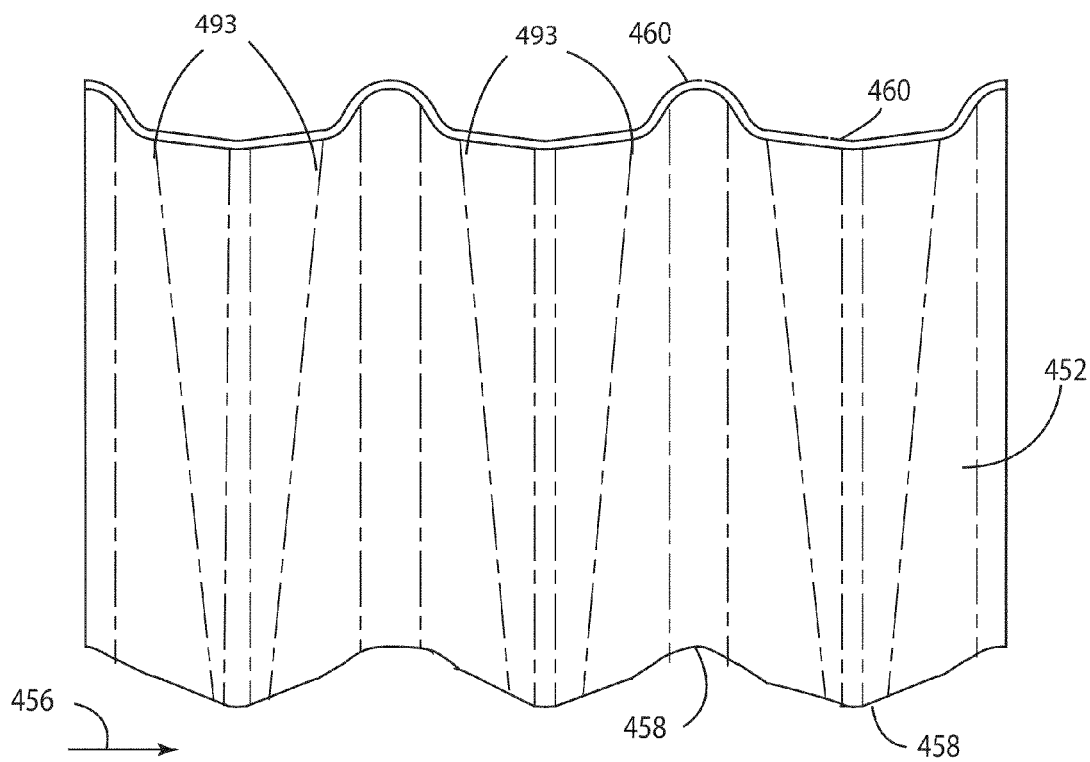
FIG. 14 is an enlarged partial perspective view of a sheet of fluted filtration media made in accordance with an implementation of the invention.

Now referring to FIGS. 12-14, a pleated filtration media pack is shown at reference number 450. The pleated filtration media pack 450 includes media 452 having a machine direction 454 and a transverse direction 456. The media is folded to provide a first series of pleat folds 458 and a second series of pleat folds 459 (see FIG. 12 for folds 458 and 459), wherein the media 452 extends in a back and forth arrangement between the first set of pleat folds 458 and a second set of pleat folds 459. The media 452 includes flutes 470. The flutes 470 include relatively sharp peaks 472 and 474. In addition, the flutes 470 include ridges 476 provided between adjacent peaks (e.g., peaks 472 and 474).

The pleated filtration media pack 450 includes media surfaces 482 and 484 that form openings 486 there between, and media surfaces 488 and 490 that form openings 492 there between. The pleated filtration media pack 450 can be characterized as having a first face 485 that includes the first set of pleat folds 458 and the openings 486. In addition, the pleated filtration media pack 450 can be characterized as having a second face 487 that includes the second set of pleat folds 460 and the openings 492. Accordingly, air can flow into the pleated filtration media pack 450 via the openings 486 in the first face 492, pass through the media 452 to provide filtration, and then flow out of the pleated filtration media pack 450 via the openings 492 in the second face 494. In certain circumstances, it may be advantageous to have the fluid flow into the pleated filtration media pack via the second face 494 and out of the pleated filtration media pack 450 via the first face 485. The media includes ridges 493 which are converging together. This taper is foreshortened, showing an exaggerated movement of the ridges.

Figure 15:
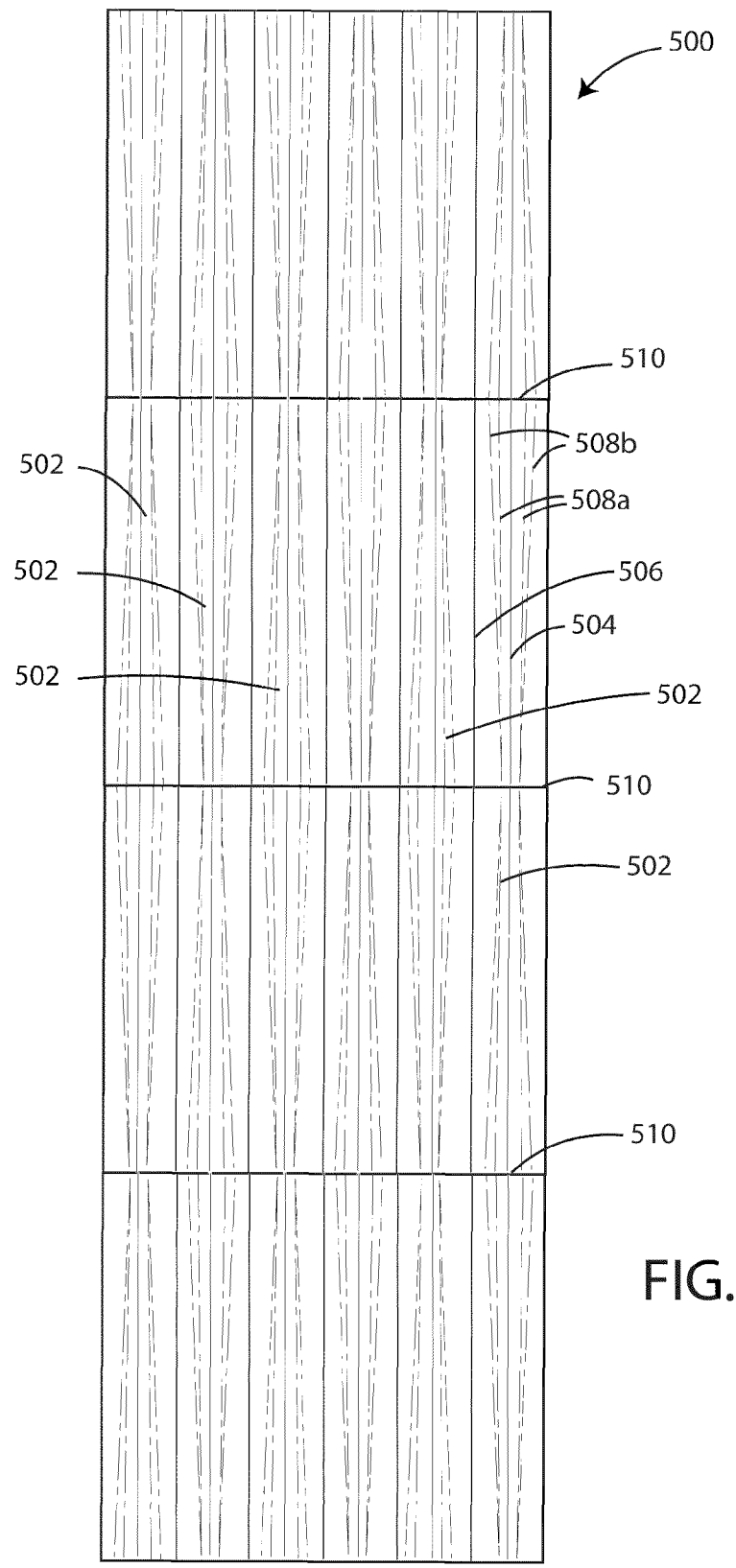
FIG. 15 is a partial top plan view of a continuous sheet of formed filter media with embossed flutes.
Figure 16:
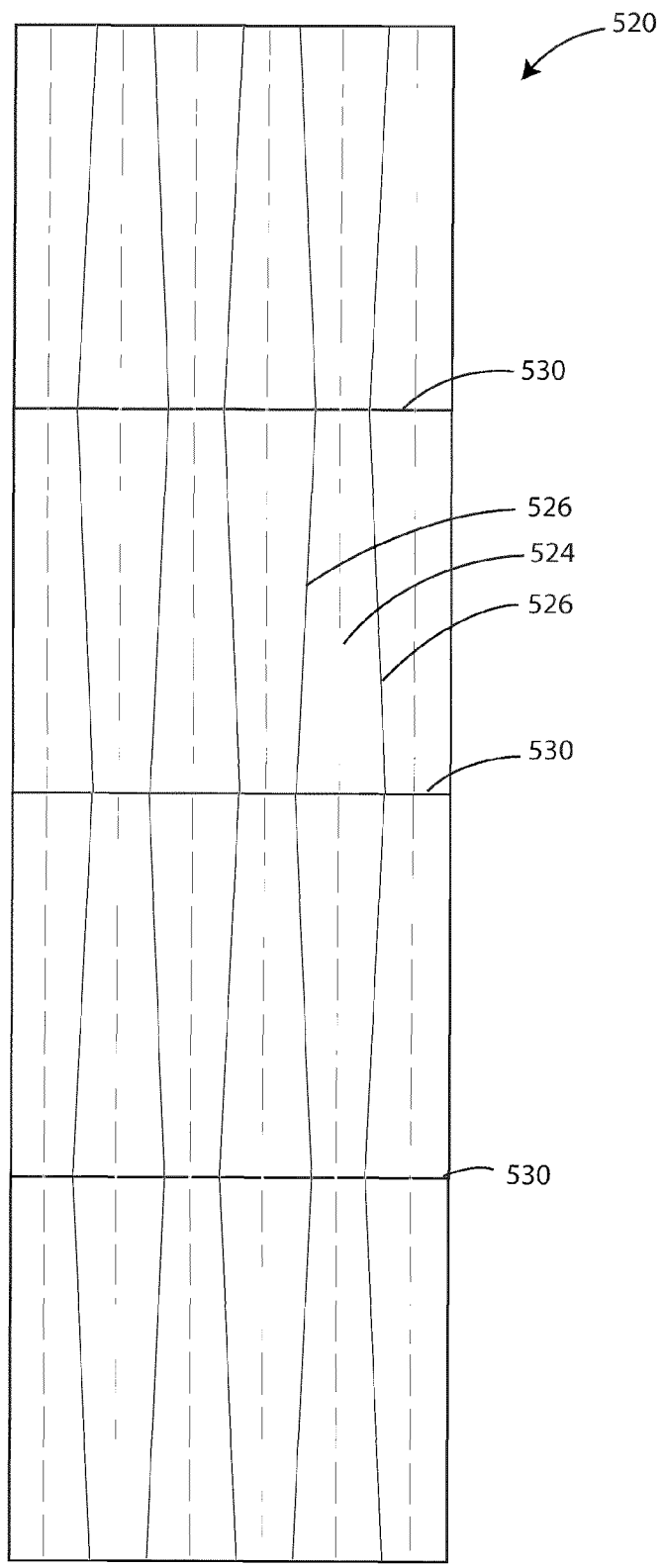
FIG. 16 is a partial top plan view of a continuous sheet of formed filter media with embossed flutes.

Referring now to FIGS. 15 and 16, top plan views of portions of two media arrangements made in accordance with the present invention are depicted. In FIG. 15, a simplified drawing of a web of filtration media 500 is shown with a depiction of the location of the portions of each flute, but before flute formation and pleating (thus, FIG. 15 shows filter media 520 in a flattened state that depicts where flute peaks and ridges are to be located during flute formation). The outline of each of the flutes 502 includes central peaks 504 and adjacent opposite-side peaks 506. Locations of subsequent pleats are shown by lines 510. The embodiment shown in FIG. 15 is shown with six flutes 502. Each of the flutes 502 includes four ridges 508a and 508b in dashed lines. The ridges are positioned such that one pair of ridges 508a and 508b are on each side of peak 504 of each flute 502. The ridges 508a and 508b converge toward one another to create a flute similar to that shown earlier in FIG. 7. Thus, on each side of each peak 504 is a pair of ridges 508a and 508b that converge upon one another along one pleat, then diverge from one another along the next pleat, and again converge upon one another in the subsequent peak. In this way it is possible to change the cross sectional area of the pleated media using the filtration media 500. It will be observed that in FIG. 15 the central peaks 504 and adjacent opposite-side peaks 506 are parallel to one another, which allows for creation of fluted media wherein the flutes have a constant width and height, while still having a change in cross sectional area along their length.

With regard to FIG. 16, media 520 is shown with a plurality of flutes defined by center peak 524 and adjacent opposite-side peaks 526. Pleat locations 530 are also depicted. The media shown in FIG. 16 is flattened, depicting the locations of the peak 524 and adjacent opposite-side peaks 526. In this embodiment the flutes do not have parallel peaks 524, 526. Thus, the media can be used to create tapered flutes while varying the width or height of the flutes. In the embodiment shown in FIG. 16, no ridges are necessary to create the tapered fluted media.

Flute Peak Radius

As noted above, the flute peaks are typically characterized by a sharp radius or a defined tip that reduces masking between pleats. This defined tip can extend from the general profile of the flute to create a protrusion at the flute peak that substantially reduces masking of adjacent media. While it will be understood that a given flute peak will have some variation in shape, and not necessarily form a perfect arc at its tip, it is still possible in some implementations to identify and measure a distance that corresponds substantially to a radius at the flute peak. This radius can be measured on the interior of the flute and is calculated as the effective inner radius. This effective inner radius will often be less than 4 millimeters, more often be less than 2 millimeters, frequently be less than 1 millimeter, and optionally less than 0.5 mm. Larger radii can also be used in some implementations, especially for large flutes. It will further be understood that flutes that fail to have a distinct or measurable radius still fall within the scope of the disclosure when they contain other characteristics described herein, such as the presence of ridges, media asymmetric volumes, etc.

Figure 17:
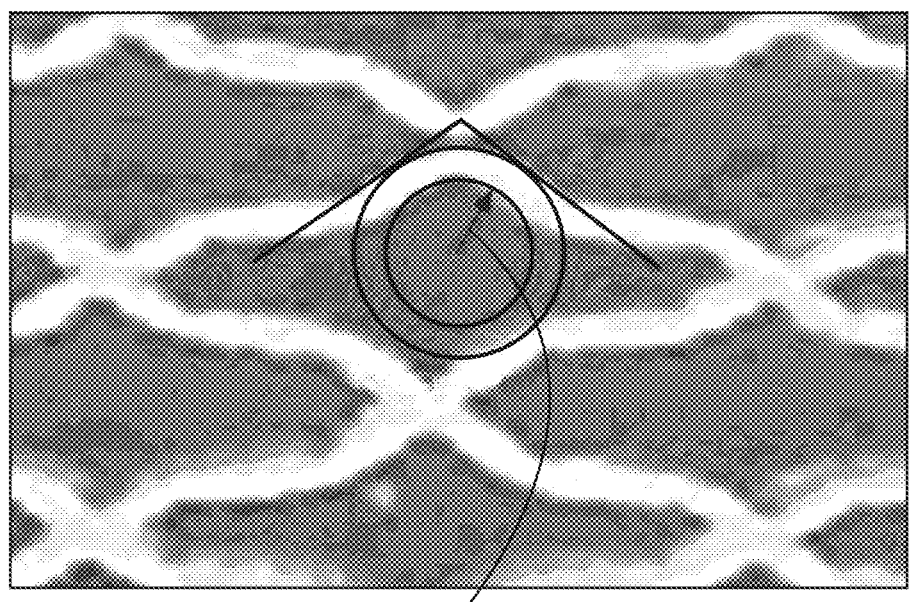
FIG. 17 is an enlarged scanned cross-sectional image of a flute according to principles of the invention, showing a method to measure the effective inner radius of a flute.

FIG. 17 shows an example of a radius determined on actual filter media. Radii can be measured, for example, by a methodology that uses a measure called the local effective inner radius. Local effective inner radius is defined as the minimum outer radius of curvature at a given flute tip, peak, or ridge, minus the average media thickness of the flute. The minimum outer radius of curvature is the smallest radius of curvature of an osculating circle fitting the curve formed by following the outermost surface of a cross section of a given flute tip, peak, or ridge. For reference, the osculating circle of a sufficiently smooth plane curve at a given point on the curve is the circle whose center lies on the inner normal line and whose curvature is the same as that of the given curve at that point.

In the alternative, a formula that can be used to describe an acceptable radius (for certain embodiments) is based on flute width (D1) and media thickness (T). An example formula that can be used to describe the radius at the peak that can be characterized as a relatively sharp radius is (D1−2T)/8. Preferably, a relatively sharp radius has a radius of less than about (D1−2T)/16.

Although the peaks are sharp, in many implementations they still contain a tightly curved outer surface, sometimes approximating an arc or a bend with a radius. By providing relatively sharp peaks, the area of contact and/or proximity between media surfaces may be reduced, which results in a reduction in masking During filtration the filtration media will typically deflect under pressure, and the relatively sharp peaks can continue to reduce the contact between media surfaces, thus providing an ongoing advantage with regard to reduction of masking.

A method of filtering a fluid is also provided according to the invention. The method includes a step of passing a fluid through a pleated filtration media pack provided as part of a filter element as a result of unfiltered fluid entering the first face or the second face of the pleated filtration media pack and out the other of the first face or the second face of the pleated filtration media pack. The flow of the fluid to be filtered through the pleated filtration media pack can be characterized as straight through flow.

Flute Orientation

It may be advantageous to have the flutes extending at a non-perpendicular angle relative to the first flow face or the second flow face depending upon whether the fluid is flowing toward the first face or the second face at an angle that is non-perpendicular. By providing the flutes at a non-perpendicular angle relative to the first face or the second face of the pleated filtration media pack, it is possible to enhance the flow of the fluid into the pleated filtration media pack by adjusting the flute angle to better receive the fluid flow without the fluid having to make a turn before entering the pleated filtration media pack. The first face and the second face of the media pack can be parallel or non-parallel. The angle at which the flutes extend can be measured relative to the first face, the second face, or both the first face and the second face.

Thus, the flutes can be formed so that they extend perpendicular to the first face or the second face, or can be provided extending at an angle relative to the first face or the second face that is greater than 0 degrees but less than 180 degrees. If the flutes extend at an angle of 0 degrees or 180 degrees to a face, then it is difficult for fluid to enter the pleated filtration media pack via the flutes. In general, it is desirable for the fluid to enter the pleated filtration media pack by entering through the flutes.

In some implementations the flutes will extend from about 85 degrees to 95 degrees to a face, in other implementations from about 60 to 120 degrees to a face, and in yet other implementations from about 70 to 110 degrees to a face. Preferably, the flutes are provided extending at an angle that is within about 60 degrees of perpendicular to the first face or the second face. In general, this range corresponds to about 30 degrees to about 150 degrees relative to the first face or the second face. Furthermore, the flutes can be provided extending within about 5 degrees of perpendicular to the first face or the second face (corresponding to about 85 degrees to about 95 degrees relative to the first face or the second face). The flutes can desirably be provided extending perpendicular (90 degrees) relative to the first face or the second face.

Methods of Making Pleated Media with Flutes

Pleated media containing flutes can be produced using various methods and equipment. Thus, the media, media pleat packs, and filter elements are not limited to their methods of manufacture. Fluted media can be prepared by any technique that provides the desired flute shapes. Thus, the invention is not limited to specific methods of forming the flutes. However, depending upon the flute geometry and the media being fluted and pleated, certain methods will be more or less successful. Dry media with high cellulose content is relatively non-stretchable, and is subject to tearing if it is stretched beyond just a few percent. In contrast, media with a high synthetic content is often much more stretchable. Both types of media are suitable for use with the invention.

During media formation, the limited dimension of the media is typically the width of the media because the machine on which the media is manufactured is limited in the width direction. The length of the media can be continuous until it is cut or until it ends. The continuous direction refers to the direction of the media along the length of the media. The transverse direction generally refers to the direction of the media across the width of the media. Pleated media generally includes pleats or folds formed transversely to the machine direction so that the number of pleats and the height of each pleat can be controlled, as desired. Pleats or folds are typically formed in the transverse direction such that the media folds back upon itself in an alternating fashion (e.g., a back and forth arrangement) to form a filter element having a first face, a second face, and an extension of media between the first face and the second face. In general, fluid to be filtered enters one of the first face and the second face of the filtration media pack, and exits the other of the first face and the second face.

Exemplary techniques for providing fluted media exhibiting relatively sharp peaks include bending, folding, or creasing the fluted media in a manner sufficient to provide a relatively sharp edge. The ability to provide a relatively sharp peak depends on a number of factors, including the composition of the media itself and the processing equipment used for providing the bend, fold, or crease. In general, the ability to provide a relatively sharp peak depends on the rupture strength and thickness of the media and whether the media contains fibers that stretch or resist tearing or cutting. It is desirable to avoid tearing, cutting, or otherwise damaging the filtration media during flute forming.

The present method can utilize media that can only handle a relatively small amount of strain because the pleat folds are formed to keep overall media length relatively constant and reduce strain. In general, media that can tolerate only a relatively small amount of strain includes media that has tendency to rupture when the strain is greater than as little as 3%, such as is often the case for media that has a high cellulose content and is cold and dry. Even wet, warm media will often have a tendency to rupture when the strain is greater than about 8% with some media, and about 10% in other media, or occasionally greater than about 12%. Thus, the flute designs and methods of manufacture of the present invention can be used, in some implementations, with media that has high cellulose content. In some embodiments the cellulose content is at, or near, 100%. In other implementations the cellulose content is greater than 90%, 80%, 70%, 60% or 50%.

As shown earlier, the total media width can be made constant across the transverse direction of the pleats. This allows for a pleat fold configuration that results in an overall strain on the media that is relatively small. Accordingly, the media that can be used in the filtration media pack can be characterized as media not capable of withstanding strain of greater than about 8% in some implementations, 10% in other implementations, or greater than about 12% in yet other implementations. However, it will be understood that media able to withstand high levels of strain can also be used with various implementations of the invention.

Figure 18:
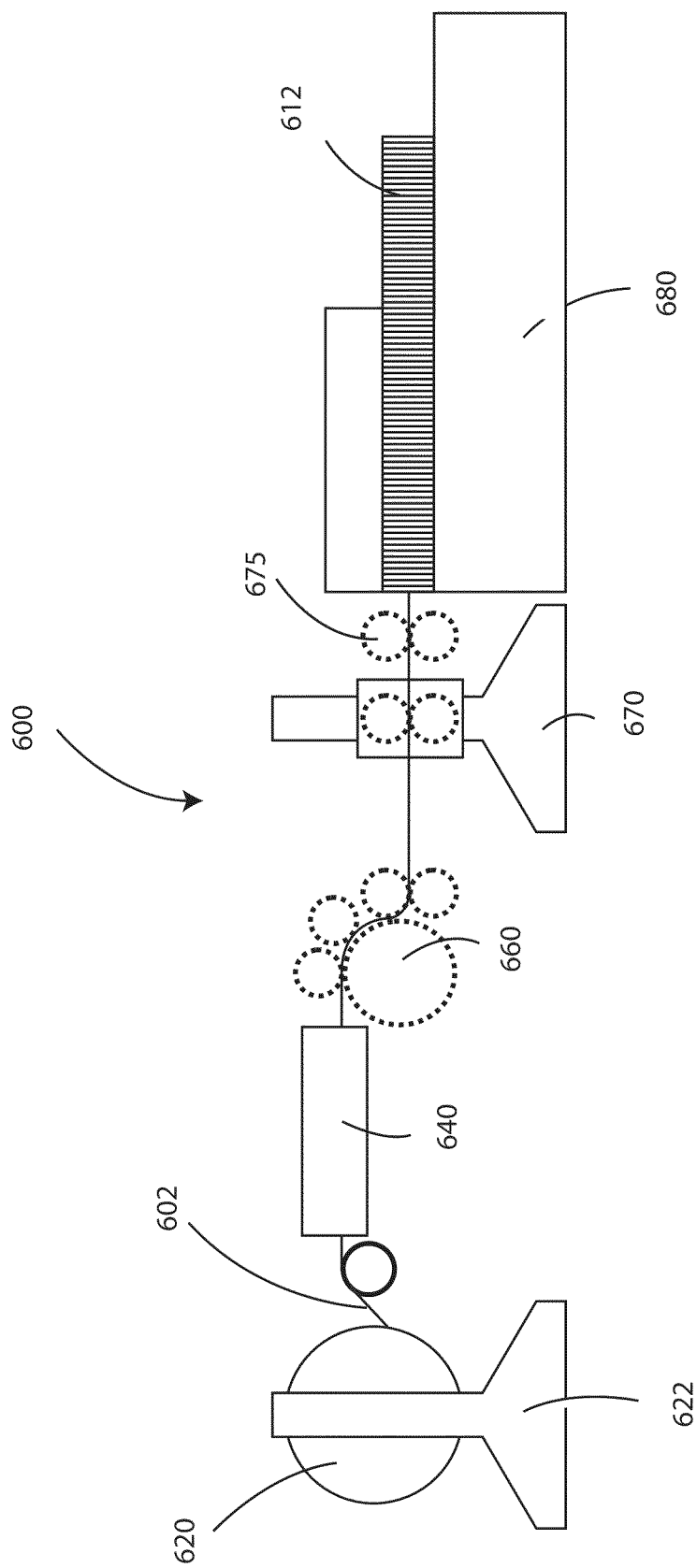
FIG. 18 is a schematic diagram of an apparatus for forming fluted media in accordance with an implementation of the invention.

FIG. 18 depicts one system 600 for forming pleated media consistent with the technology disclosed herein. A roll of media 620 is on an unwind stand 622 in communication with bunching mechanism 640 to bunch the media 602. The media 602 is passed through bunching mechanism 640 to shaping rolls 660 and scoring rolls 670 to be shaped and scored, respectively. After exiting the shaping rolls 660 and scoring rolls 670, the media 602 optionally passes through a coating station 675 and enters a reefing section 680, where it is folded along the scores and stored in packed segments 612.

The media roll 620 is used to store the media 602 until processing, and generally arrives at the processing location in such a configuration. The roll of media 620 can include a variety of types of media 602 that is wound on the roll 620. Generally, the media 602 will be a flat, relatively flexible sheet such that it is capable of being wound and unwound. The media 602 is, in a variety of embodiments, a cellulose media, although other types of media are also contemplated. For example, the media 602 could also be a synthetic media such as a flat sheet of a polymeric media.

Figure 19A:
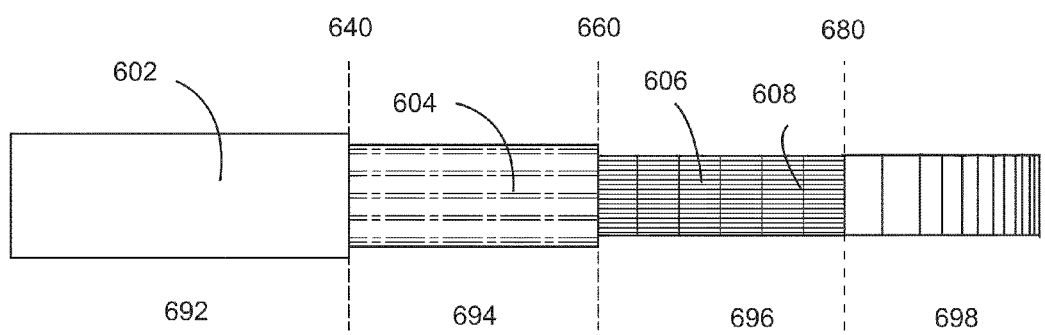
FIG. 19A is a top schematic diagram of the sheet of filter media being transformed from a flat continuous sheet to a fluted and pleated media.
Figure 19B:
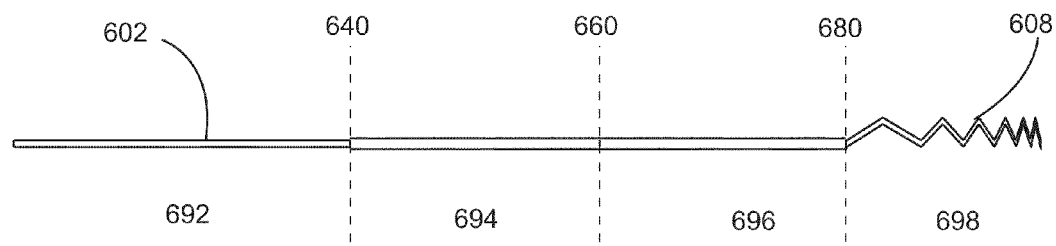
FIG. 19B is a side schematic diagram of sheet of filter media from FIG. 19A being transformed from a flat continuous sheet to a fluted and pleated media.

FIGS. 19A and 19B depict a top view and a side view, respectively, of the media as it passes through a system similar to that depicted in FIG. 18. The first section 692 represents the media after it leaves the media roll 620 and is introduced to the system. The second section 694 depicts the media generally after it exits processing by the bunching roll 640, which is represented by the first vertical sectioning line. The third section 696 represents the media 602 after exiting the shaping and scoring rolls 660, and the fourth section 698 represents the media 602 upon entering the reefing section 680 of the system.

"Bunching" is used to refer to a process undergone by the media 602, and also a physical state of the media 602, as depicted in the second section 694 of FIGS. 19A and 19B. The media 602 displays substantially parallel undulations 604 along the length of the media 602 where the length of the media 602 is generally in the machine direction, in other words, the direction parallel to the passage of the media 602 through the various system components. Bunching 640 avoids generation of strain in the media 602 as it is being fluted, which results in increased media 602 tolerance to creating flutes and otherwise shaping the media. As a result of bunching the media 602, the width of the media 602 decreases slightly and the height of the media 602 increases slightly as the undulations are created. The bunching mechanism can have a variety of configurations, and will be described in more detail by way of example in the description of FIG. 20, below.

Following bunching 640 of the media, the media can be shaped 660 and scored, as depicted in section 696 of FIG.

19A and FIG. 19B. "Shaping" forms flutes 606 in the machine direction along the length of the media 602, and "scoring" forms fold-lines 608 in the media 602, perpendicular to the flutes 606—which is generally in the cross-machine direction. The score 608 generally has a unique shape that corresponds to the shape of the flutes 606. In one embodiment, the media 602 passes between two nip rollers, and then passes between two scoring rolls. In another embodiment the media passes between two nip rollers that define a score-bar. Shaping and scoring the media will be described in more detail, below.

Adhesive can be applied in a variety of embodiments after the media is shaped and scored, which is not visible in FIG. 19A or 19B, but corresponds to coating rollers 675 of FIG. 18. The adhesive application puts a small amount of adhesive material at a point along the flute tips so that it can be bonded to another flute that touches it after the media is folded. The glue or adhesive material (various adhesives can be used, including hot-melt adhesives, hot-set adhesives, etc.) is preferentially applied in a manner so as to avoid excessively sealing the media by application of the glue or bonding material. For example, reference can be made to earlier FIG. 11A, which shows flute tips 406 and 408 in contact with flutes on adjacent pleats. Adhesive can be applied at these locations (such as where flutes come together at tips 406 or 408). Generally the amount of adhesive present must be sufficient to hold the pleats together during production as well as during use. Thus, a strong bond between adjacent pleats is normally necessary when an adhesive is used. In some embodiments the adhesive runs along the entire flute tips, but in other implementations the adhesive runs only along a portion of each flute tips. For example, the adhesive can be applied intermittently along the flute tips, can be applied primarily near the pleat folds, can be applied only to a fraction of the pleat tips, etc. In addition to the use of adhesive material to bond tapered flutes, it will be understood that non-tapered (i.e., regular) flutes can also be bonded together using adhesive material.

The media may also come into contact with a coating roll 675 to administer adhesives or other coatings. Following coating or, in the alternative, following shaping and scoring, the media enters the reefing section 680. The reefing section 680 is where the media 602 is folded along the score lines 608 in an accordion-like fashion, and stored as such until further processing. As more media 602 is processed through the system 600 and introduced into the reefing section 680, the media 602 becomes more packed and the compresses about the score lines 608.

Figure 20:
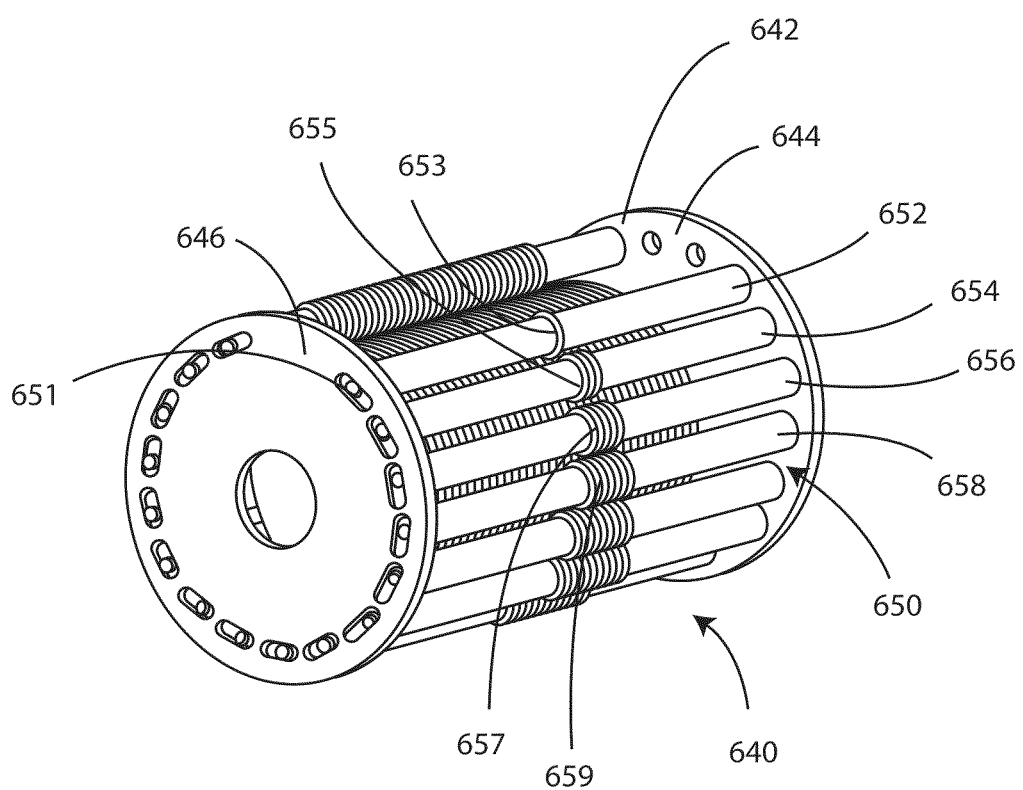
FIG. 20 is a side perspective view of a bunching mechanism made in accordance with an implementation of the invention, the bunching mechanism configured to gather media in the cross-web direction for subsequent formation into flutes.

Now components of the system 600 of FIG. 18 will be described in more detail. FIG. 20 depicts a bunching mechanism consistent with the technology disclosed herein. In at least one embodiment the bunching mechanism 640 has a primary roll 642 and a plurality of bunching axles 650 about the circumference of the primary roll 642, in mechanical communication with the primary roll 642. Each of the plurality of bunching axles 650 are configured to rotate about their respective axis. Each axis 651 of the plurality of bunching axles 650 can be rotatably disposed about the circumference of the primary roll 642. In the embodiment depicted, the plurality of bunching axles 650 are rotatably disposed on a first axle holder 644 and a second axle holder 646 on each side of the primary roll 642. The first axle holder 644 and the second axle holder 646 define openings that are configured to receive each end of each axle of each of the plurality of bunching axles. In the alternative, the bunching mechanism can comprise a series of rollers in a substantially planar arrangement (as opposed to the circular arrangement of FIG. 20) whereby media is bunched progressively as it passes from a first roller to a last roller.

Figure 21:
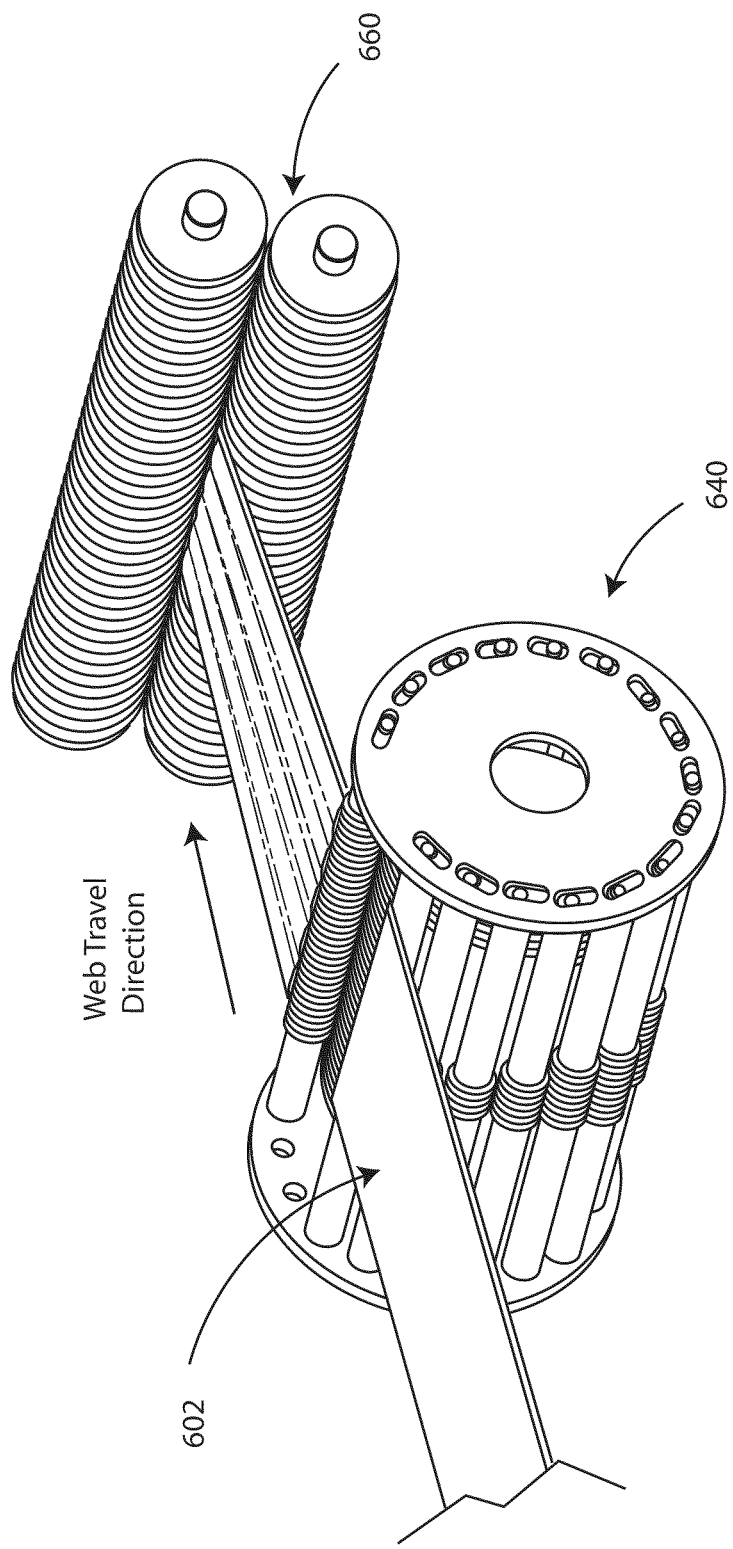
FIG. 21 is a side perspective view of a bunching mechanism and forming rollers made in accordance with an implementation of the invention, the bunching mechanism configured to gather media in the cross-web direction for subsequent formation into flutes.

FIG. 21 depicts the media 602 entering the bunching mechanism 640, leaving the bunching mechanism 640 bunched, and entering a pair of shaping rollers 660. The following description of the bunching mechanism can be understood in view of FIG. 20 and FIG. 21. In operation, the media is fed onto the circumference of the primary roll 642 and is progressed through the primary roll 642 and each of the plurality of bunching axles 650 separately, where each of the plurality of bunching axles 650 introduces two undulations: one undulation adjacent to each side of the media, which incrementally and progressively bunches the media. The exception to this is the first bunching axle 652, which introduces a single, first undulation along a central portion of the media.

As just mentioned, the media is first passed over the primary roll 642 and a first bunching axle 652, where the first bunching axle 652 defines a first bunching shape 653. The first bunching axle 652 is cylindrical and rotates about a central axis 651. The first bunching shape 653 defined on the first bunching axle 652 exerts force on the media as it passes between the first bunching shape 653 and the primary roll 642, which creates a first undulation along the central portion of the media. As such, the surface of the remainder of the first bunching axle 652 likely does not make contact with the media. In the current embodiment, the first bunching shape 653 is a single rounded, circular disk extending radially from the first bunching axle. The first bunching shape 653 has a first bunching width and is positioned substantially central to the width of the media.

After passing through the primary roll 642 and the first bunching axle, the media then passes through a second bunching axle 654 and the primary roll 642. The second bunching axle 654 defines a second bunching shape 655 having a second bunching width, where the second bunching width is greater than the first bunching width. The second bunching shape 655 includes the first bunching shape 653 and also includes an addition to the first bunching shape such that bunching the media is incrementally progressed. As such, the second bunching shape 655 has the circular disk of the first bunching shape 653, to engage and enforce the first undulation along the media, and a pair of circular disks that are each adjacent to opposite sides of the first bunching shape 653. The second bunching shape 655, and, accordingly, the second bunching width, is positioned substantially central to the width of the media. Also, the central disk of the second bunching axle 654 is substantially co-radial with the central disk of the first bunching axle 652 such that the central disk of the second bunching axle 654 and the disk of the first bunching axle 652 both engage the first undulation of the media.

Following passage of the media between the second bunching axle 654 and the primary roll 642, the media passes between a third bunching axle 656 and the primary roll 642. The third bunching axle 656 defines a third bunching shape 657 having a third bunching width greater than the second bunching width. The third bunching shape 657 and accordingly, the third bunching width, is positioned substantially central to the width of the media. The third bunching shape 657 includes the three disks of the second bunching shape 655, and then two additional disks: one adjacent to each side of the second bunching shape 655, respectively. The three central disks of the third bunching shape 657 are generally co-radial with the disks of the second bunching shape 655.

The media is then passed between a fourth bunching axle 658 and the primary roll 642, where the fourth bunching axle 658 defines a fourth bunching shape 659 having a fourth bunching width greater than the third bunching width and is positioned substantially central to the width of the media. The fourth bunching shape 659 is the five disks of the third bunching shape 657, and then two additional disks: one adjacent to each side of the third bunching shape, respectively.

The media can then be passed between the primary roll 642 and any additional number of bunching axles 650, depending on the width of the roll to be bunched, as each bunching axle after the first bunching axle increases the width of the bunched portion of media by a particular increment, namely, the width of two additional bunching disks. The five central disks of the fourth bunching shape 659 are generally co-radial with the disks of the third bunching shape 657.

Each incremental bunching axle of the plurality of bunching axles 650 includes the shape of the bunching axle preceding it to engage and enforce the existing shape of the media. Each of the plurality of bunching axles 650 adds an incremental addition to the shape of the bunching axle before it, to incrementally progress the bunching of the media. The bunching disks generally have a particular radius such that that depth and width of each undulation on the media is substantially consistent along the length of the media. Each disk is generally identical and equally spaced such that bunching is substantially consistent across the width of the media.

As the number of bunching axles increase, it may be desirable to use a primary roll 642 of a larger diameter to accommodate the plurality of bunching axles about the circumference of the primary roll. As such, a system could have multiple primary rolls that can be switched and changed depending on the width of the media to be bunched.

Figure 22:
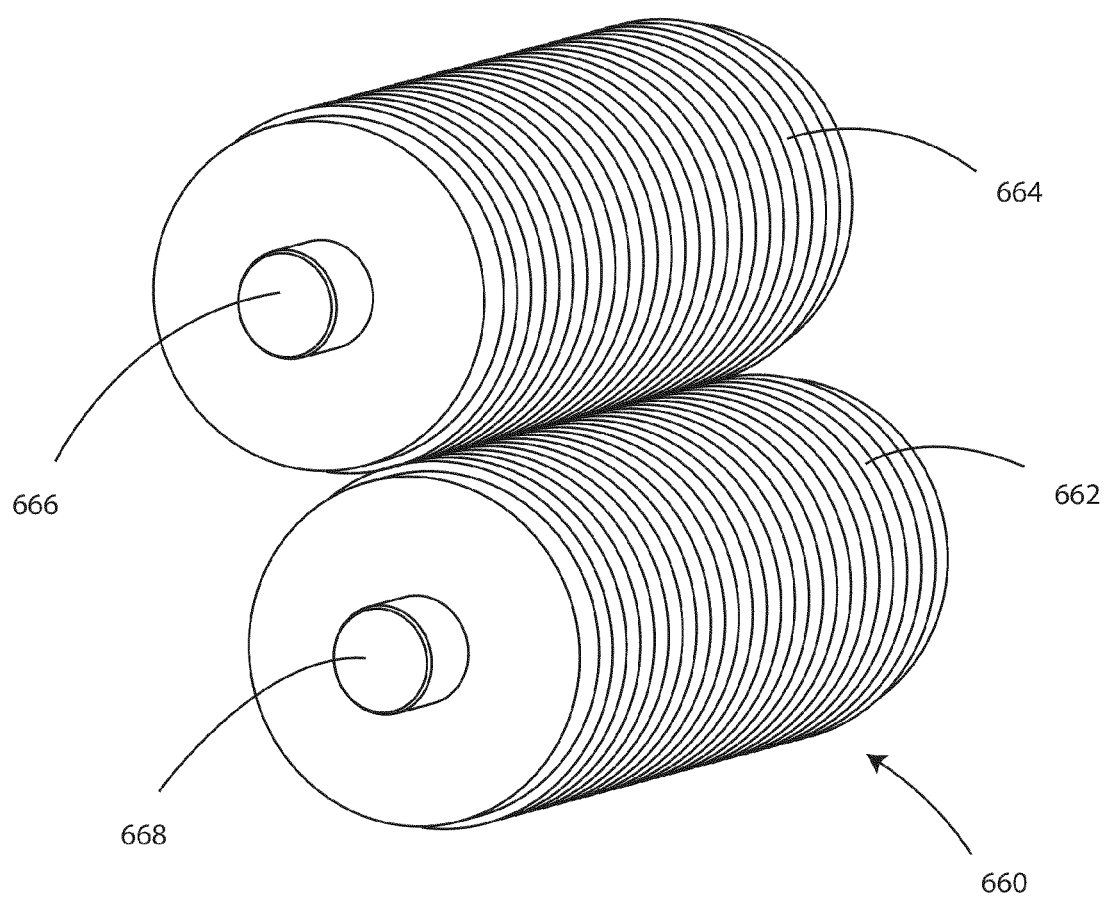
FIG. 22 is a side perspective view of forming rollers made in accordance with an implementation of the invention, the forming rollers configured to create flutes in filter media.

As mentioned above, bunching the media 602 can increase the strain tolerance of the media to withstand further shaping and processing. As such, after the media is bunched, it can be further shaped by other components of the system, such as the nip rollers 660 as depicted in FIG. 21. FIG. 22 also depicts a pair of nip rollers 660 to shape the media. In a variety of implementations, shaping the media includes forming flutes along the length of the media.

The media is generally fluted by passing between two nip rollers 660 after bunching the media 602. The nip rollers 660 impress the shape of the flutes along the length of the media as the media passes between the rollers 660. As such, the nip rollers 660 define the desired shape of the flutes. A first nip roller 666 of the pair of nip rollers 660 can define a particular flute shape 664, and a second nip roller 668 of the pair of nip rollers 660 can define a mating flute shape 662, such that each side of the rollers 660 enforces the same flute shape on the media. In another embodiment the mating flute shape 662 could be a pliable surface to receive the particular flute shape 664.

The flutes are generally established in the machined direction of the media. In some embodiments, the media is heated (such as by steam, infrared heaters, heated rollers, etc.) before or while it passes through the nip rollers 660, and cooled after the shaping process. As such, the nip rollers 660 can be heated in at least one embodiment. The flutes can have a variety of configurations. In one configuration the flutes are tapered. In another configuration the flutes are substantially straight. In yet another configuration the flutes are partially tapered.

Figure 23:
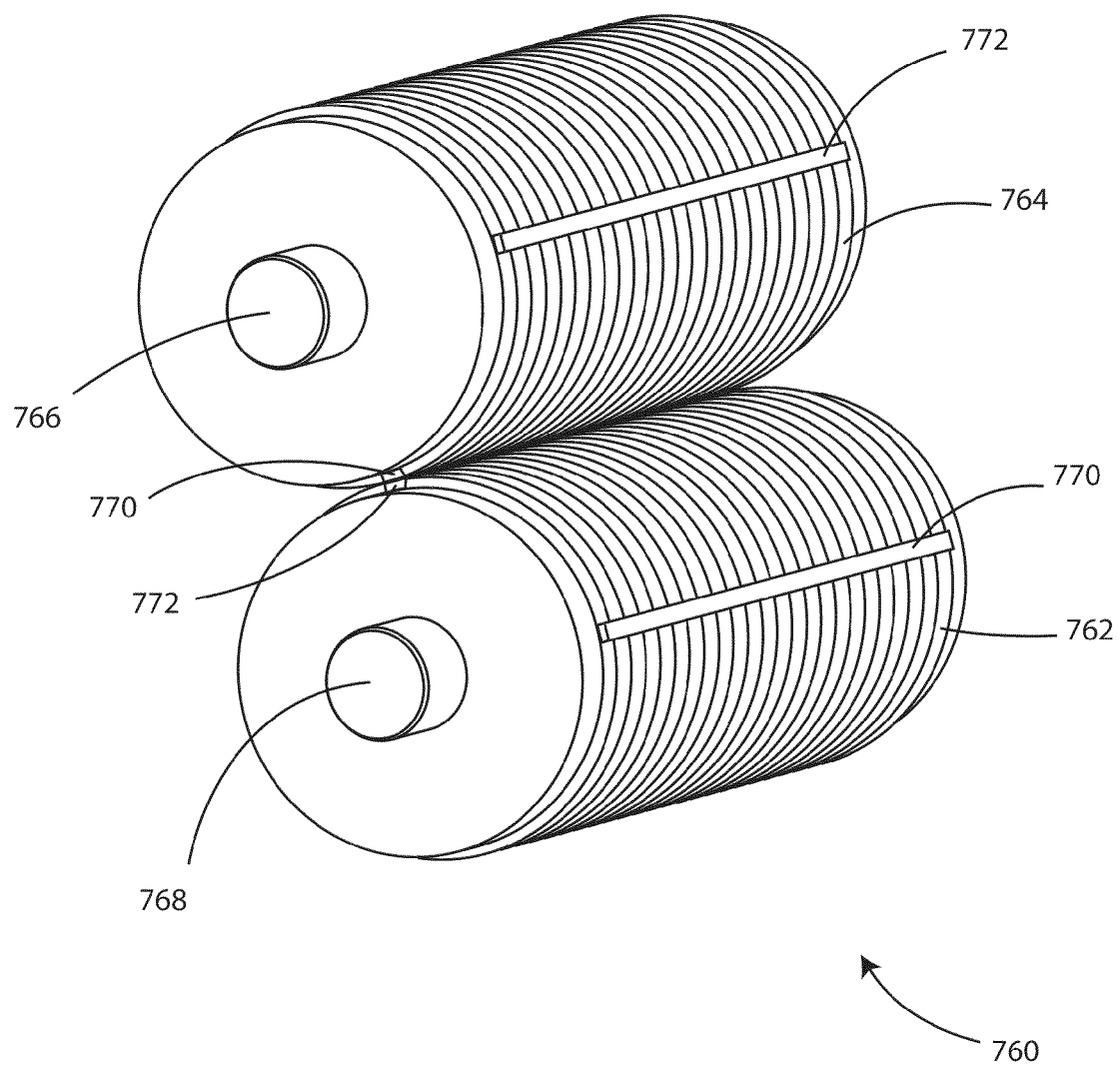
FIG. 23 is a side perspective view of alternative forming rollers made in accordance with an implementation of the invention, the forming rollers configured to create flutes in filter media.

In another embodiment, the media is shaped and scored with nip rollers. FIG. 23 depicts nip rollers 760 where a first nip roller 766 has plurality of score-bars 772 and a second nip roller 768 having a plurality of scoring surfaces 770 that are each configured to receive each of the respective score-bars 772. The scoring surfaces 770 can comprise a compressible material in one embodiment. In another embodiment, the scoring surfaces 770 are openings defined by the second nip roller 768 that accommodate the shapes of each of the respective score-bars 772. In yet another embodiment, the scoring surfaces 770 are female mating surfaces that accommodate the shapes of each respective score-bar 772.

Scoring the media generally results in bending the media at intervals in the cross-machine direction where the media will be folded. As such, a score-bar 772 can be used to "stamp" across the width of the media at intervals where the media will be folded. The profile of the score-bar 772 generally follows the profile of the local flutes. So, for example, with a media having tapered flutes, the score-bars 772 are tall where the local flutes are tall, and the height of the score-bar 772 decreases where the height of a local flute decreases.

As the media is generally folded accordion-style, such that it is first folded to a particular width, and then folded back on itself again, the media is consecutively scored from alternate sides. As such, the score-bars 772 and score surfaces 770 generally alternate consecutively on the surfaces of the nip rollers 760, such that both the first nip roller 766 and the second nip roller 768 have a plurality of score-bars 772 and a plurality of scoring surfaces 770. As depicted on FIG. 23, a score-bar 772 on the second nip roller 768 mates with a scoring surface 770 on the first nip roller 766.

Figure 24:
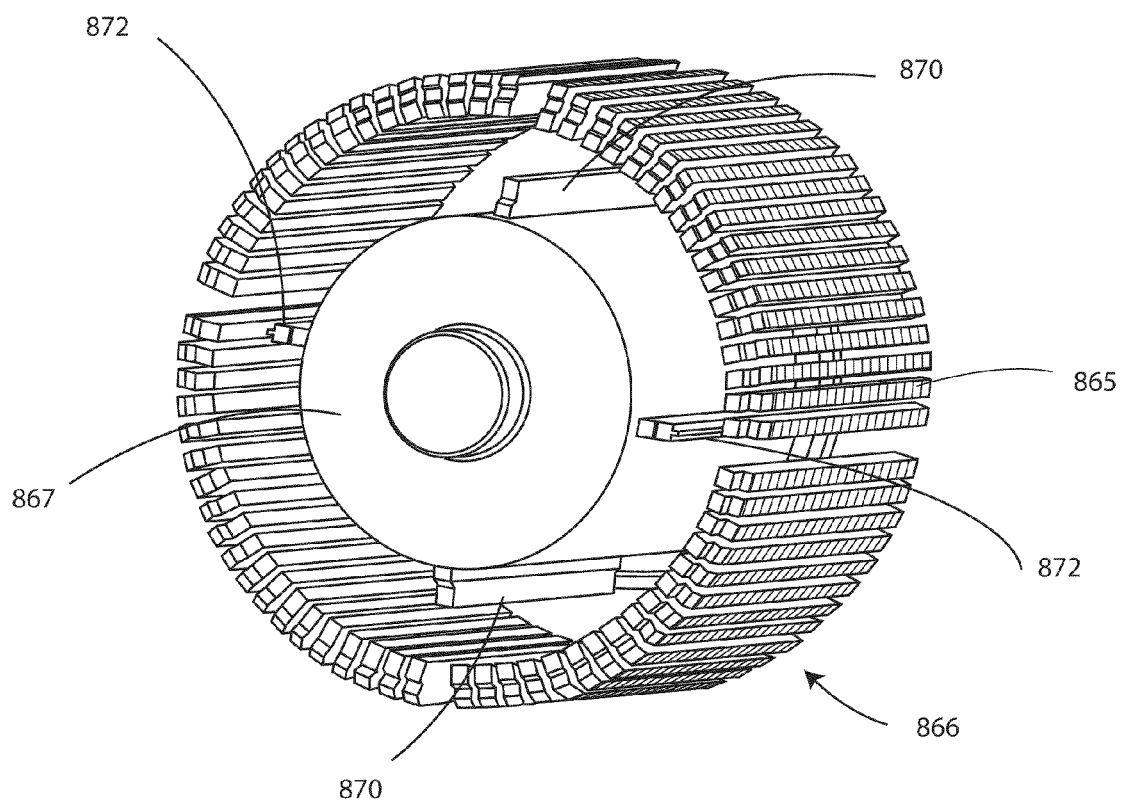
FIG. 24 is an exploded perspective view of a forming roller made in accordance with an implementation of the invention, the forming roller configured to create flutes in filter media.

In at least some embodiments of the technology described herein, the nip rollers can be altered to create various shapes of media. In such embodiments it can be desirable to have a nip roller than includes multiple components that can be replaced and changed according to the resultant shape of the media that is desired. FIG. 24 depicts one example segmented nip roller 866 having interchangeable and switchable components (showing the roller 866 in exploded view). The nip roller 866 has a roller base 867 that generally defines the shape of the roller, and provides a surface to which to couple other components. A plurality of segments 865 communally define the flute shape 864 that will be impressed on the media. Alternating score-bars 872 and score surfaces 870 extend at circumferential intervals across the width of the roller.

Figure 25:
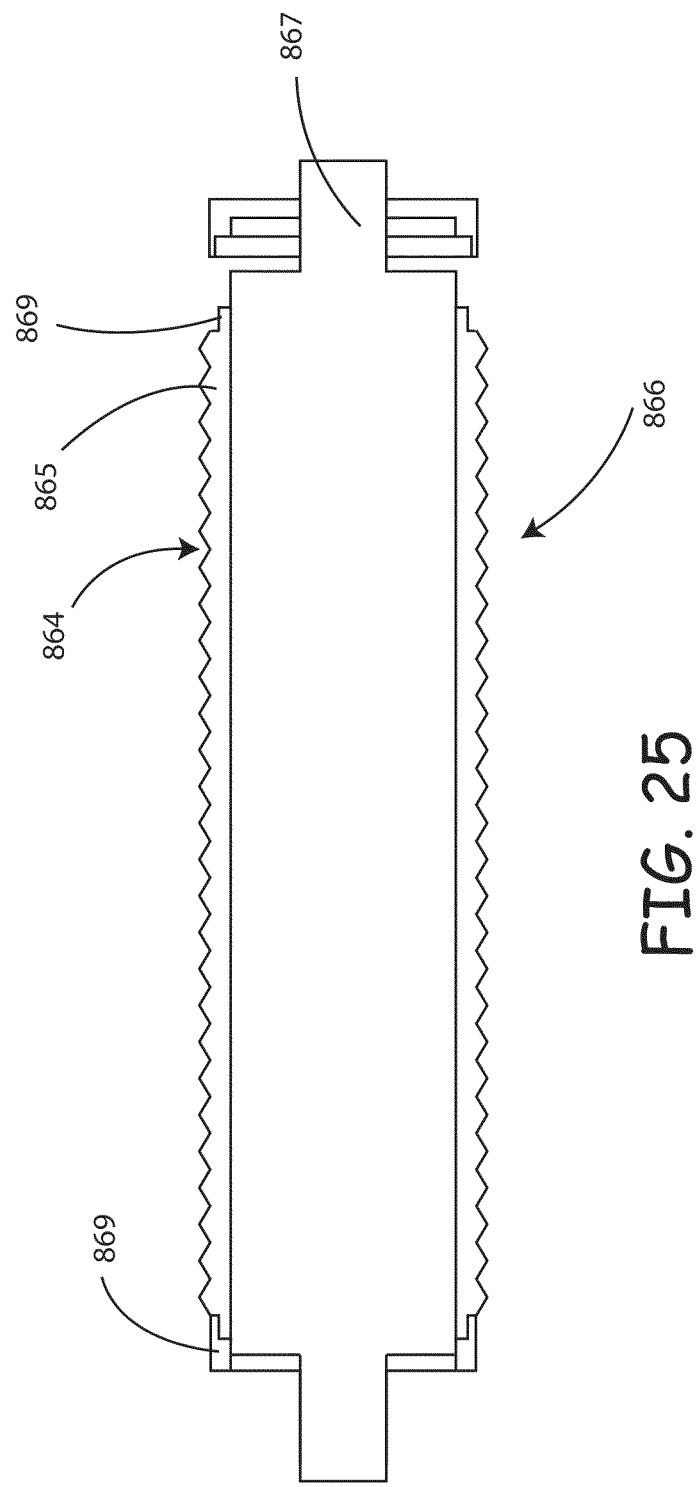
FIG. 25 is a cross section of a forming roller made in accordance with an implementation of the invention, the forming roller configured to create flutes in filter media.
Figure 26:
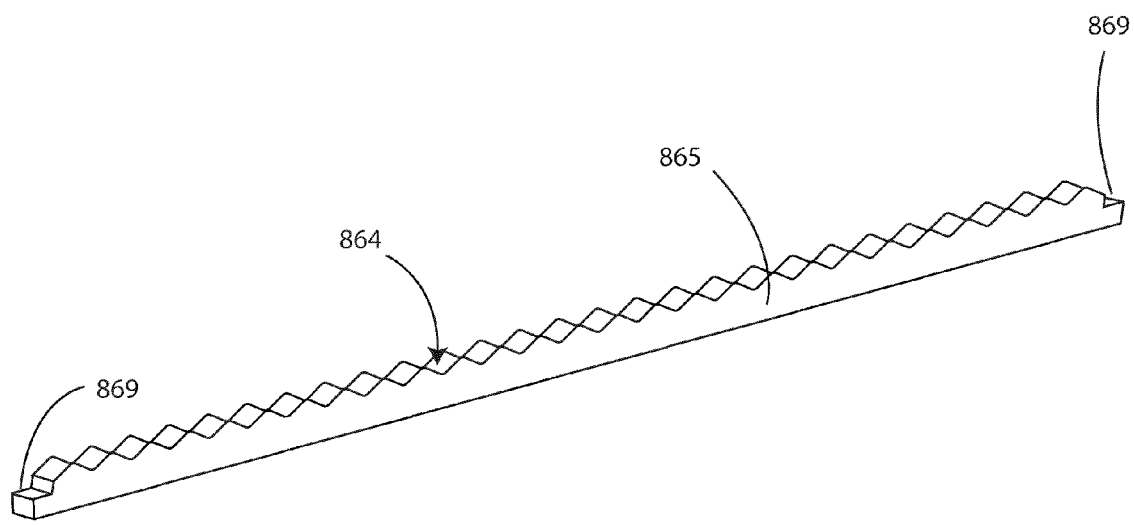
FIG. 26 a perspective view of a segment of a forming roller depicted in FIG. 25.

FIG. 25 depicts a cross-sectional view of the segmented nip roller 866 of FIG. 24, which provides a profile view of a portion of the flute shape 864 on a particular segment 865. FIG. 26 depicts a perspective view of the segment 865 depicted in FIG. 25. The segment 865 defines a coupling surface 869 by which the segment 865 is coupled to the nip roller 867. In a variety of implementations, segments 865 and score-bars 872 can be exchanged, interchanged, removed, and replaced to change the resultant media shape. In at least one embodiment the segments 865 and/or score-bars 872 are bolted, screwed, or otherwise fastened into place on the roller base 867. In another embodiment the segments and/or the score-bars are frictionally held into place through a snap-in fixture defined by the roller base 867, the segments 865 and/or score-bars 872, or both. In at least one embodiment, alignment pins are received by each segment 865 and the nip roller 867 to ensure proper placement.

Figure 27A:
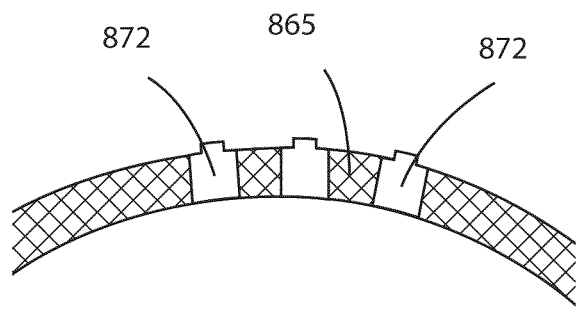
FIGS. 27A to 27C are cross sectional schematics demonstrating various spacing of the score-bars on a segmented nip roller, the score bars configured for forming proper pleat folds in continuous media.
Figure 27B:
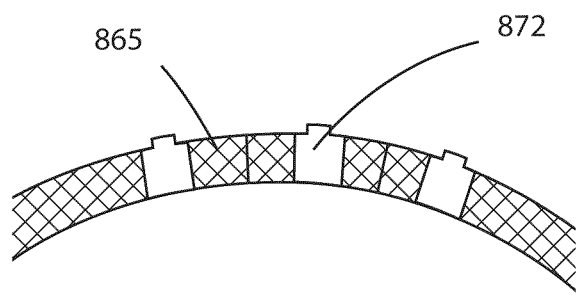
Figure 27C:
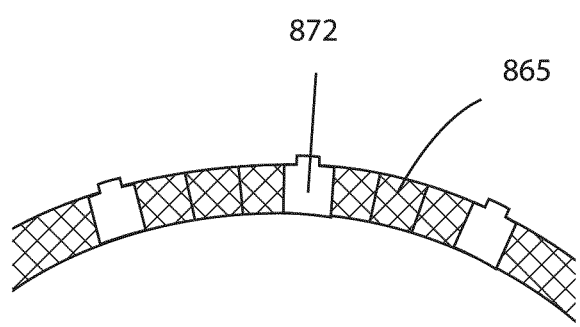

FIGS. 27*a*, 27*b*, and 27*c* are cross sectional schematics demonstrating various spacing of the score-bars on the segmented nip roller 866 of FIG. 24. While these schematics depict segments 865 that are largely uniform, it can be possible to have segments 865 of varying widths.

Figure 28:
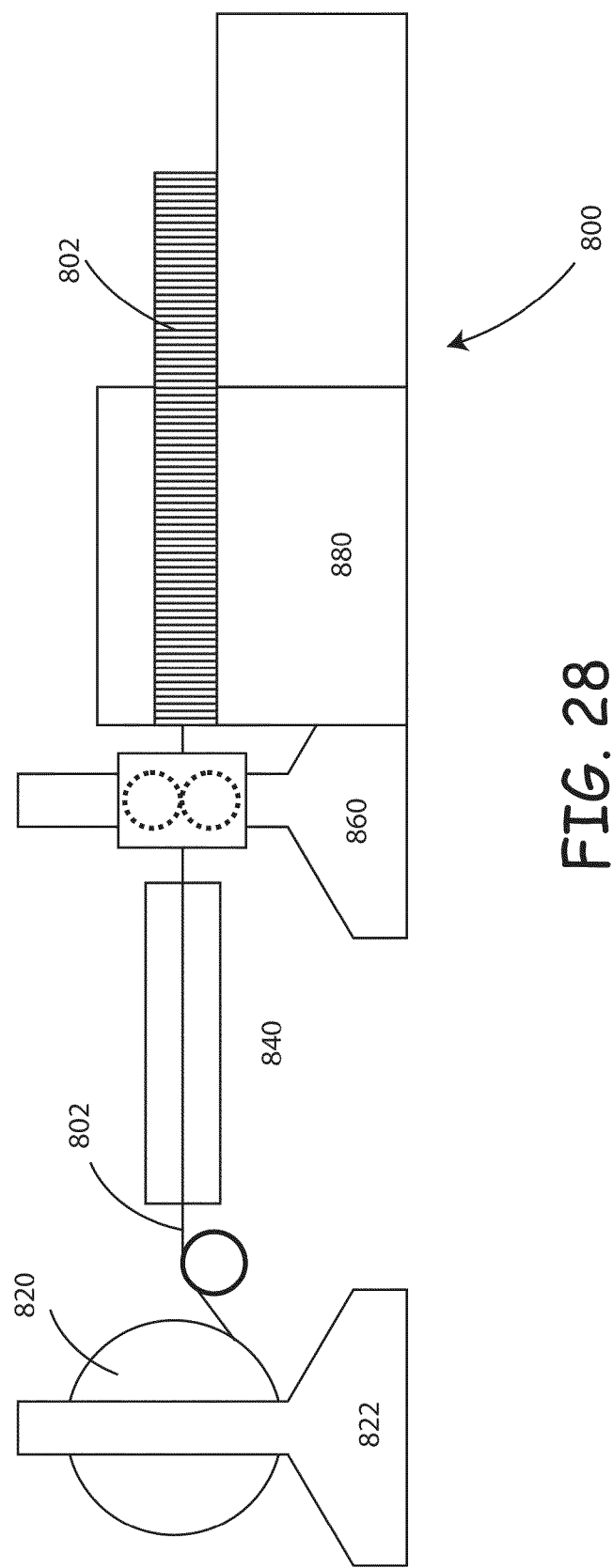
FIG. 28 is a schematic diagram of an apparatus for forming fluted media in accordance with an implementation of the invention.

FIG. 28 depicts another system consistent with the technology disclosed herein, incorporating a nip roll 860 that both shapes and scores the media. A roll of media 820 is on an unwind stand 822 in communication with a bunching mechanism 840 to bunch the media 802. The media 802 is passed through the shaping and scoring rolls 860 to shape and score rolls. After the media passes over the shaping and scoring rolls 860 it may also come into contact with a coating roll to administer adhesives or other coatings. After exiting the shaping and scoring rolls the media enters the reefing section 880, where it is folded along the scores and can be cut into media pleat packs.

Figure 29:
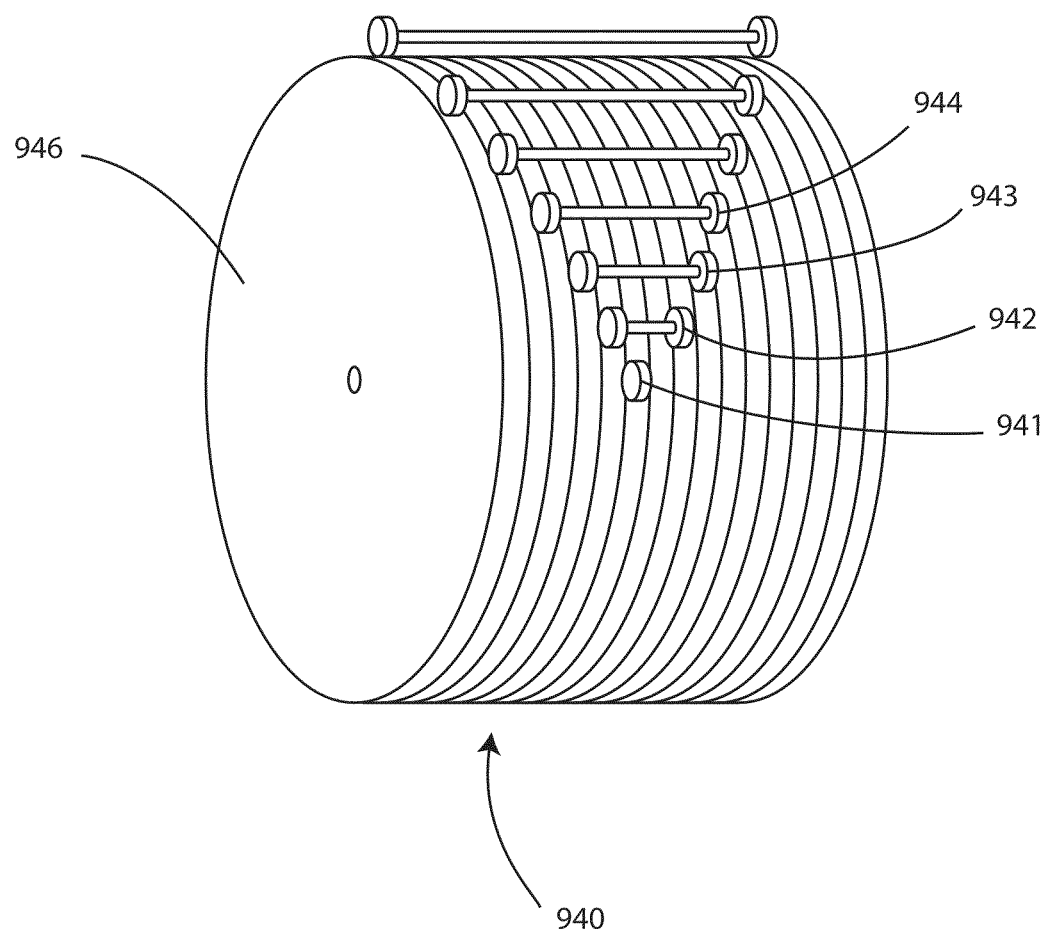
FIG. 29 is a schematic diagram of an apparatus for forming fluted media in accordance with an implementation of the invention.

An alternative bunching and shaping mechanism of FIG. 29 will be described. As described above, media is fed to pass over the circumference of a primary roll 946, and is gradually bunched as the media progresses about the primary roll 946. The primary roll 946 is generally configured to receive the media. A first bunching and forming roll 941 is positioned at the circumference of the primary roll 946 and central to the width of the primary roll 946. In multiple embodiments the first bunching and forming roll 941 is also positioned such that it will be central to the width of the media passing over the primary roll. The media is passed between the primary roll and the first bunching and forming roll 941 such that forces exerted on the media from the first bunching and forming roll 941 results in a flute along the length of the media.

After the media passes through the first bunching and forming roll 941 and the primary roll 946, it then passes through a pair of second bunching rolls 942, which are also positioned at the circumference of the primary roll 946. The distance between the second bunching and forming rolls 942 is greater than the width of the first bunching and forming roll 941, and the second bunching and forming rolls 942 are configured to exert forces on the media resulting in a flute along the length of the media on each side of the flute resulting from passing under the first bunching and forming roll 941. A pair of third bunching and forming rolls 943 and a pair of fourth bunching and forming rolls 944 are also positioned at the circumference of the primary roll 946, and are configured to exert forces of the media resulting in a flute along the length of the media on each side of the existing flutes. As such, the distance between the third bunching and forming rolls 943 is larger than the distance of the second bunching and forming rolls 942, and the distance between the fourth bunching 944 rolls is larger than the distance between the third bunching and forming rolls 943. The first bunching and forming roll 941 is generally substantially central to the distance between the second bunching and fluting rolls 942, third bunching rolls 943, and fourth bunching and fluting rolls 944.

In a variety of embodiments there is a pair of fifth bunching and fluting rolls, a pair of sixth bunching and fluting rolls, and a pair of seventh bunching rolls. In general, as many pairs of bunching rolls are implemented along the circumference of the primary roll as are needed to bunch media of a particular width. In at least one embodiment there are 50 pairs of bunching rolls.

Filtration Media

The filtration media can be provided as a relatively flexible media, including a non-woven fibrous material containing cellulose fibers, synthetic fibers, glass fibers, ceramic fibers, or combinations thereof, often including a resin therein, and sometimes treated with additional materials. An example filtration media can be characterized as a cellulosic filtration media that can tolerate about up to twelve percent (12%) strain without tearing when wet and warm, but which will rupture at lower percent strain when dry and cold (as low as 3% with some media). The filtration media can be fluted into various fluted shapes or patterns without unacceptable media damage and can be pleated to form pleated filtration media. In addition, the filtration media is desirably of a nature such that it will maintain its fluted configuration, during use. While some filtration media is available that can tolerate greater than about twelve percent (12%) strain, and such media can be used according to the invention, that type of media is typically more expensive because of the need to incorporate relatively large amounts of synthetic fibers.

In the fluting process, an inelastic deformation is caused to the media. This prevents the media from returning to its original shape. However, once the forming displacements are released, the flutes will sometimes tend to spring partially back, maintaining only a portion of the stretch and bending that has occurred. Also, the media can contain a resin. During the fluting process, the media can be heated to soften the resin. When the resin cools, it will help to maintain the fluted shapes.

The filtration media can be provided with a fine fiber material on one or both sides thereof, for example, in accord with U.S. Pat. Nos. 6,955,775, 6,673,136, and 7,270,693, incorporated herein by reference in their entirety. In general, fine fiber can be referred to as polymer fine fiber (microfiber and nanofiber) and can be provided on the media to improve filtration performance. The fine fiber can be added at various stages of the manufacturing process. For example, in some implementations the media will contain fine fiber before the flutes are formed, while in other implementations the fine fiber is added as a layer or layers to the fluted media. As a result of the presence of fine fiber on the media, it can be possible to provide media having a reduced weight or thickness while obtaining desired filtration properties. Accordingly, the presence of fine fiber on media can provide enhanced filtration properties, provide for the use of thinner media, or both. Exemplary materials that can be used to form the fine fibers include polyvinylidene chloride, polyvinyl alcohol polymers, polyurethane, and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Several techniques can be relied upon for enhancing the performance of pleated filtration media. The technique can be applied to pleated filtration media used in panel filter arrangements and for pleated filtration media used in cylindrical or conical filter arrangements. Depending on whether the pleated filtration media is intended to be used in a panel filter arrangement or a cylindrical or conical filter arrangement, alternative preferences can be provided. In view of this disclosure, one would understand when certain preferences are more desirable for a panel filter arrangement and when certain preferences are more desirable for a cylindrical filter arrangement.

Accordingly, it should be understood that the identification of a preference is not intended to reflect a preference for both panel filter arrangements and cylindrical filter arrangements. Furthermore, it should be understood that the preferences may change as a result of whether the cylindrical filter arrangement is intended to be an arrangement that can be characterized as a forward flow arrangement (where dirty air flows into the filter media pack from the exterior cylindrical surface) or a reverse flow filtration media pack (where dirty flows into the filtration media pack from the inner surface of the filtration media pack).

Pleat Pack and Filter Element Configurations

Filter elements are also provided according to the invention, the filter elements incorporating media having flutes. Filter elements are provided that can include a pleated filtration media pack and a seal arranged relative to the filtration media pack so that fluid to be filtered passes through the filtration media pack as a result of entering in through one face of the media pack and out the other face of the media pack. The seal can be attached directly to the pleated filtration media pack or indirectly via a seal support, and can be provided to engage a housing to provide a seal between the housing and the filter element. The seal can be provided as an axial seal, a radial seal, or a combination axial and radial seal. Crimp seals, pinch seals, and many other forms of seals are also possible.

A filter element or filter cartridge can be provided as a serviceable filter element. The term "serviceable" in this context is meant to refer to a filter element containing filtration media where the filter element can be periodically removed and replaced from a corresponding air cleaner. An air cleaner that includes a serviceable filter element or filter cartridge is constructed to provide for the removal, cleaning, and replacement of the filter element or filter cartridge. In general, the air cleaner can include a housing and an access cover wherein the access cover provides for the removal of a spent filter element and the insertion of a new or cleaned (reconditioned) filter element.

A pleated filtration media pack formed into a panel can be referred to as a "straight through flow configuration" or by variants thereof when the faces on the pleated filtration media are parallel. For example, a filter element provided in the form of a panel generally can have an inlet flow face and an exit flow face, with flow entering and exiting the filter element in generally the same straight through direction. In some instances, each of faces can be generally flat or planar, with the two parallel to one another. However, variations from this, for example non-planar faces, are possible in some applications.

Alternatively, the inlet and outlet flow faces can be provided at an angle relative to each other so that the faces are not parallel. In addition, a filter element can include a filtration media pack having a non-planar face, and a non-planar face can be considered non-parallel to another face. An exemplary non-planar face for a filtration media pack includes a face that forms the interior surface or the exterior surface of a filtration media pack formed in a cylindrical arrangement or in a conical arrangement. Another exemplary non-planar face for a filtration media pack includes a filtration media pack wherein the media surfaces have an inconsistent or irregular pleat depth (e.g., the pleat depth of one pleat is different from the pleat depth of another pleat). The inlet flow face (sometimes referred to as "end") can be referred to as either the first face or the second face, and the outlet flow face (sometimes referred to as "end") can be referred to as the other of the first face or the second face.

A straight through flow configuration found in filter elements containing pleated filtration media formed into a panel is, for example, in contrast to cylindrical filter elements containing pleated filtration media arranged in a cylindrical configuration of the type shown in U.S. Pat. No. 6,039,778, in which the flow generally makes a substantial turn as its passes through the filter element. That is, in a filter element according to U.S. Pat. No. 6,039,778, the flow enters the cylindrical filter cartridge through a cylindrical side, and then turns to exit through a cylindrical filter end in a forward-flow system. In a reverse-flow system, the flow enters the cylindrical filter cartridge through an end and then turns to exit through a side of the cylindrical filter cartridge. An example of such a reverse-flow system is shown in U.S. Pat. No. 5,613,992. Another type of filter element containing pleated filtration media can be referred to as a conical filter element because the filtration media pack is arranged in a conical form.

Figure 30:
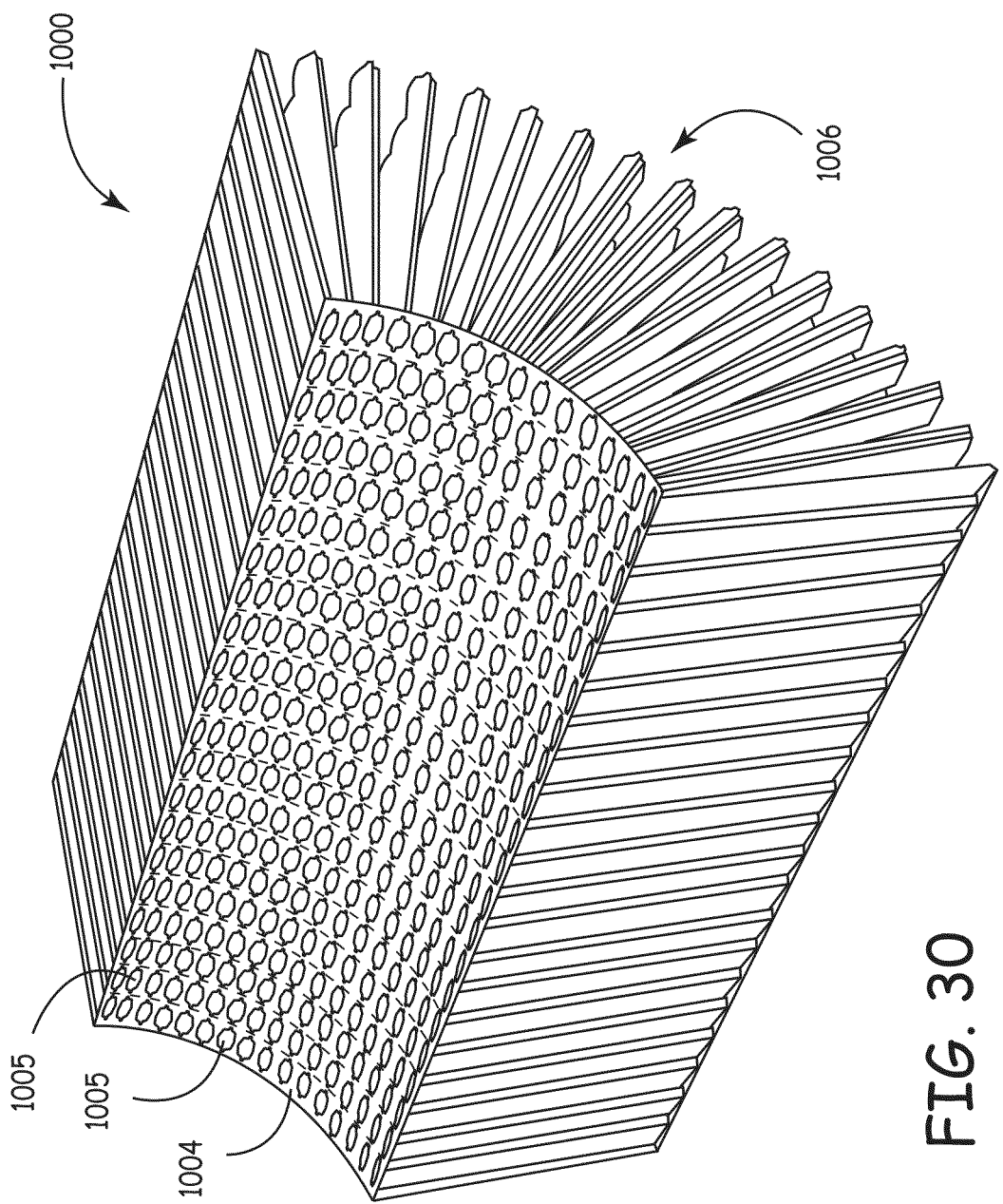
FIG. 30 is a perspective view of a portion of a cylindrical filtration media pack according to the principles of the invention.
Figure 31:
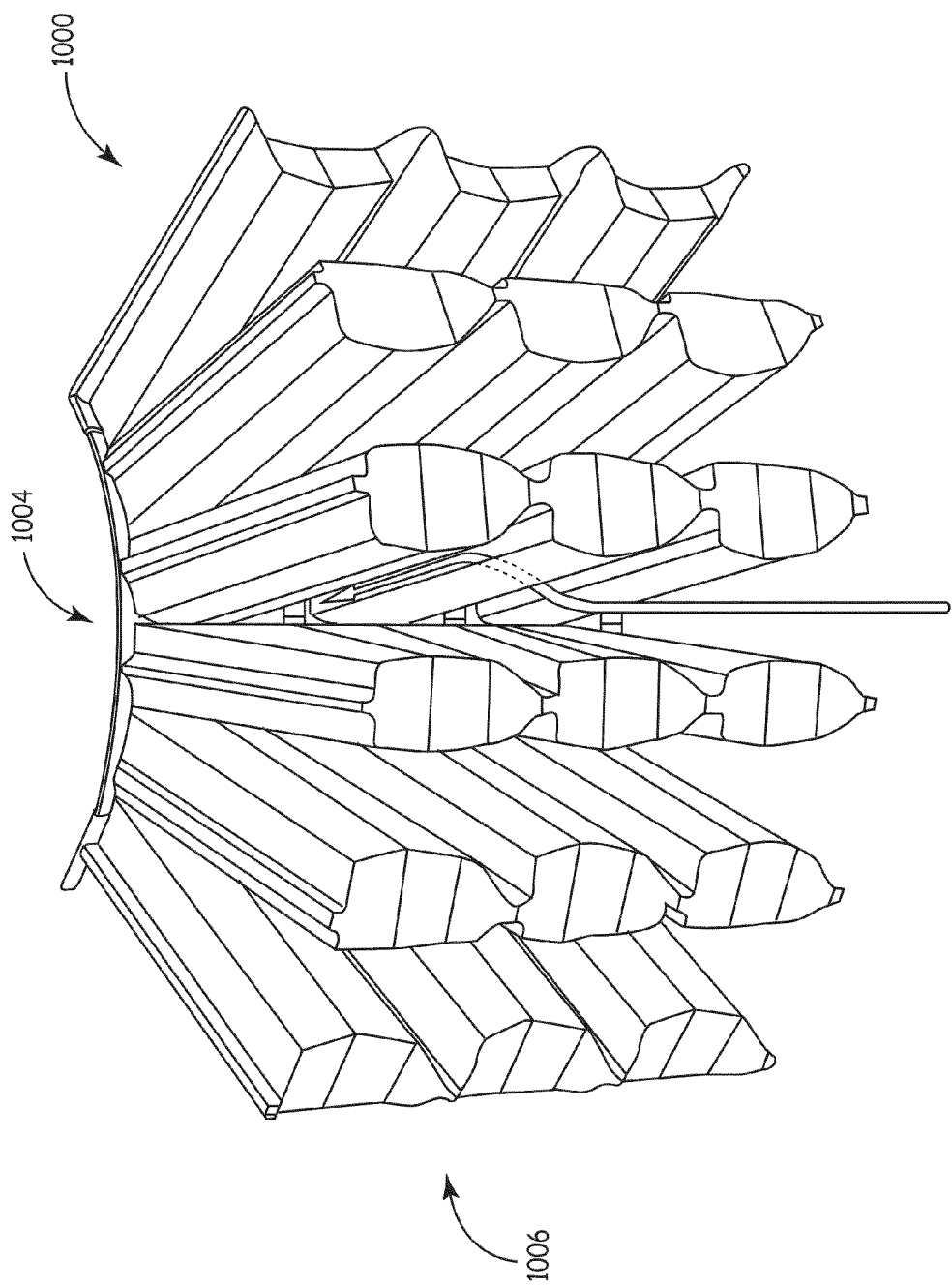
FIG. 31 is a perspective view of a portion of the cylindrical filtration media pack of FIG. 30 and showing outside to inside flow of fluid through the filtration media pack.

Now referring to FIGS. 30 and 31, a portion of a filtration media pack is shown at reference number 1000 in a partial cylindrical arrangement. The filtration media pack includes a first face 1004 and a second face 1006. For the cylindrical arrangement 1000, the first face 1004 can be considered the inner surface of the cylindrical arrangement, and the second face 1006 can be considered the outer surface of the cylindrical arrangement. The first face 1004 can be provided having the relatively large openings 1005 and the second face 1006 can be provided having the relatively small openings. When the filtration media pack 1000 is fanned, enhanced spacing is provided between the pleats at the second face 1006. As a result, the arrangement shown in FIGS. 30 and 31 can be advantageous when dirty air flows into the filtration media pack via the second flow face 1006 and exits the filtration media pack via the first flow face 1004.

Figure 32:
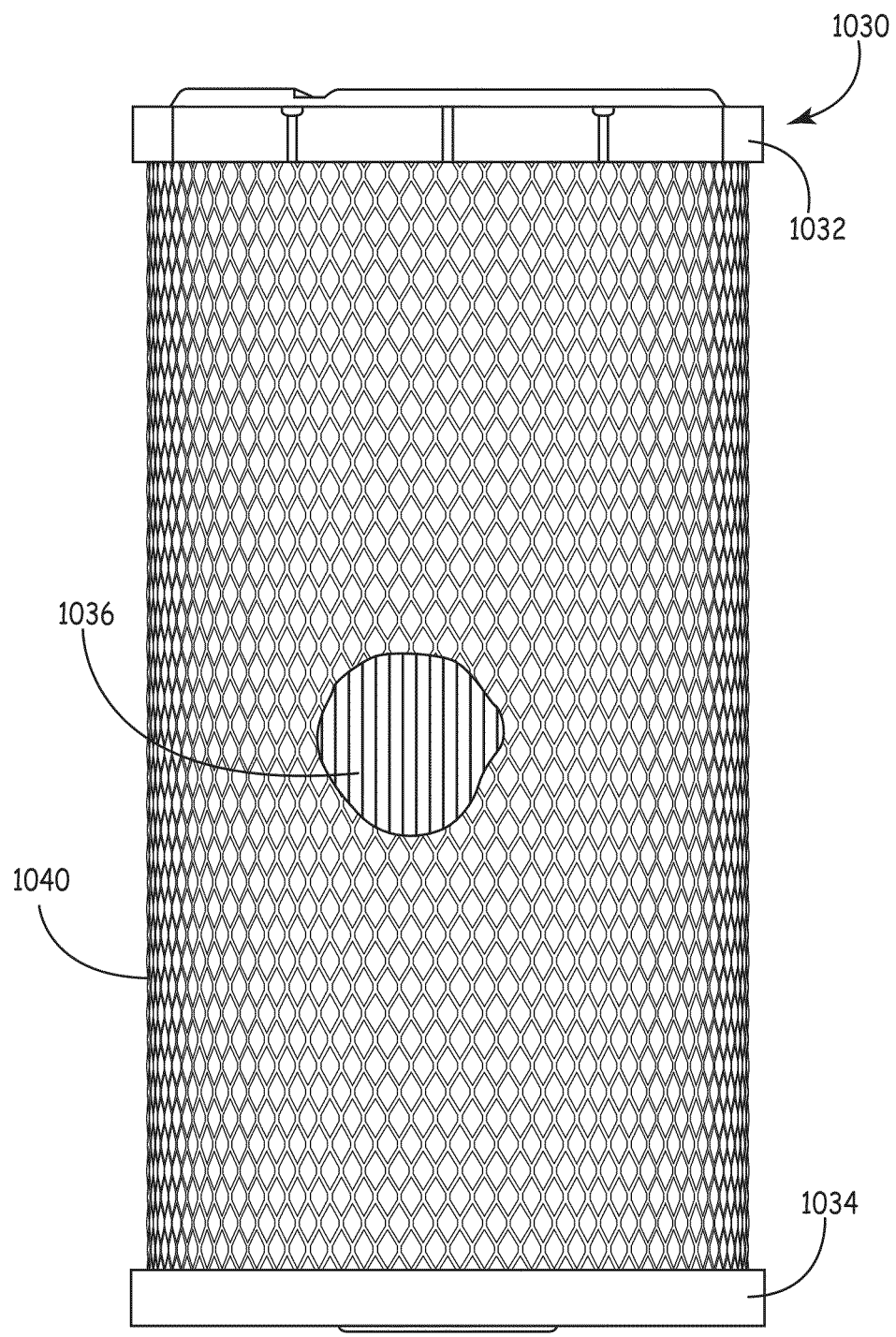
FIG. 32 is a side elevation view of a cylindrical filter element with a portion broken away.
Figure 33:
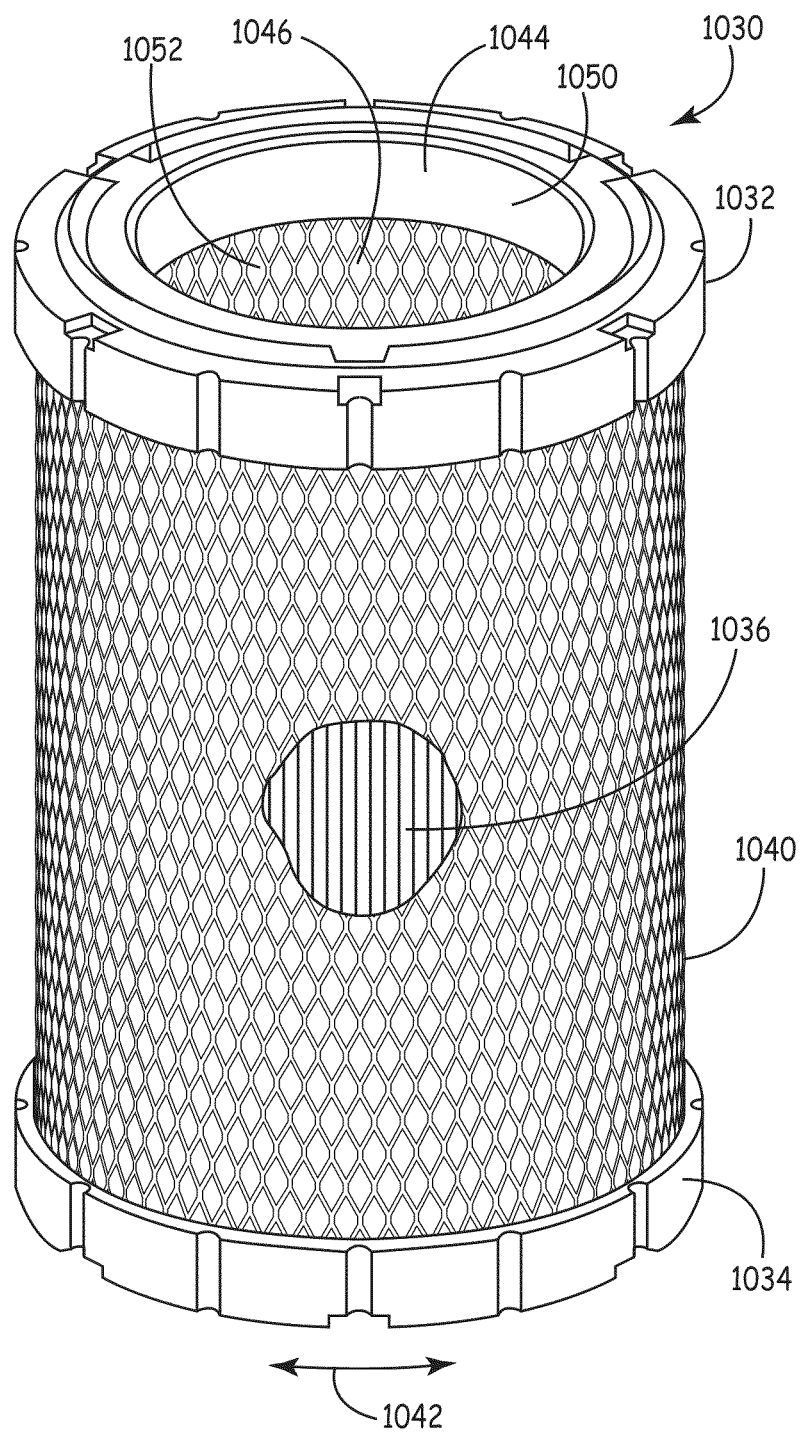
FIG. 33 is a perspective view of the cylindrical filter element of FIG. 32.

By fanning the filtration media pack, enhanced separation between the media surfaces and enhanced media area (as a result of a lack of masking) can be provided for receiving the dirty air, and a relatively large volume can be provided as the downstream or clean side volume so that the fluid can flow out of the filtration media pack with reduced restriction. As a result of the cylindrical arrangement 1000, the relatively larger volume (calculated as media pack volume) can be provided on the side open to the inner surface, and the relatively smaller media pack volume can be provided on the side open to the outer surface In other arrangements, the pleated media is configured or arranged around an open central area. An example of such a filter arrangement is depicted in FIGS. 32 and 33. Referring to FIG. 32, a filter arrangement 1030 is depicted. The filter arrangement 1030 comprises first and second end caps 1032 and 1034 having pleated media 1036 extending there between. The pleats of the pleated media 1036 generally extend in a direction between the end caps 1032 and 1034. The particular filter arrangement 1030 of FIG. 32 has an outer liner 1040, shown broken away at one location, for viewing pleats. (Although pleats can typically be viewed through the liner 1040, the arrangement 1030 shown in FIG. 32 is drawn w/o showing the pleats through the liner so as to avoid obscuring other features of the arrangement.) The outer liner 1040 shown comprises expanded metal, although a variety of alternative outer liners, including plastic and paper ones, can be used. In some instances, an outer liner is simply not used. Attention is also directed to FIG. 33, which is a side perspective view of arrangement 1030, showing end caps 1032 and 1034. Pleat folds 1036 are shown, as is outer liner 1040. For the particular arrangement 1030 of FIG. 33, a direction perpendicular to the pleat direction is generally a circumference of the filter arrangement 1030, indicated by the double headed arrow 1042.

The particular filter arrangement 1030 depicted is generally cylindrical, although alternatives are possible. Typically, such elements as element 1030 have an open end cap, in this instance corresponding to end cap 1032, and a closed end cap, in this instance corresponding to end cap 1034, although alternatives are possible. The term "open" when used in reference to an end cap, is meant to refer to an end cap which has an open central aperture 1044 to allow air flow between an interior space 1046 of the filter arrangement 1030 and the exterior, without passage through the media 1036. A closed end cap, by comparison, is an end cap which has no aperture therein. Although not depicted, flutes will typically be arranged in a direction from outer pleat folds of the pleated media 1036 perpendicularly (or near perpendicularly) into the interior of the element toward the inner volume 1046. However, it will be understood that the flutes do not have to run perpendicular to the outer pleat folds.

A variety of arrangements have been developed for end caps 1032 and 1034. The end caps may comprise polymeric material molded to the media. Alternatively they may comprise metal end caps or other preformed end caps secured to the media, with an appropriate adhesive or potting agent. The particular depicted end caps 1032 and 1034 are molded end caps, each comprising compressible foamed polyurethane. End cap 1032 is shown with a housing seal 1050, for sealing the element 1030 in a housing during use. The depicted seal 1050 is an inside radial seal, although outside radial seals and axial seals are also possible.

It is noted that the element may include an inner liner 1052 extending between end caps 1032 and 1034 along an inside of the media 1030 as shown in FIG. 33, although in some arrangements such liners are optional. The inside liner, if used, can be metal, such as expanded metal or perforated metal, or it can be plastic or paper (for example).

Figure 34:
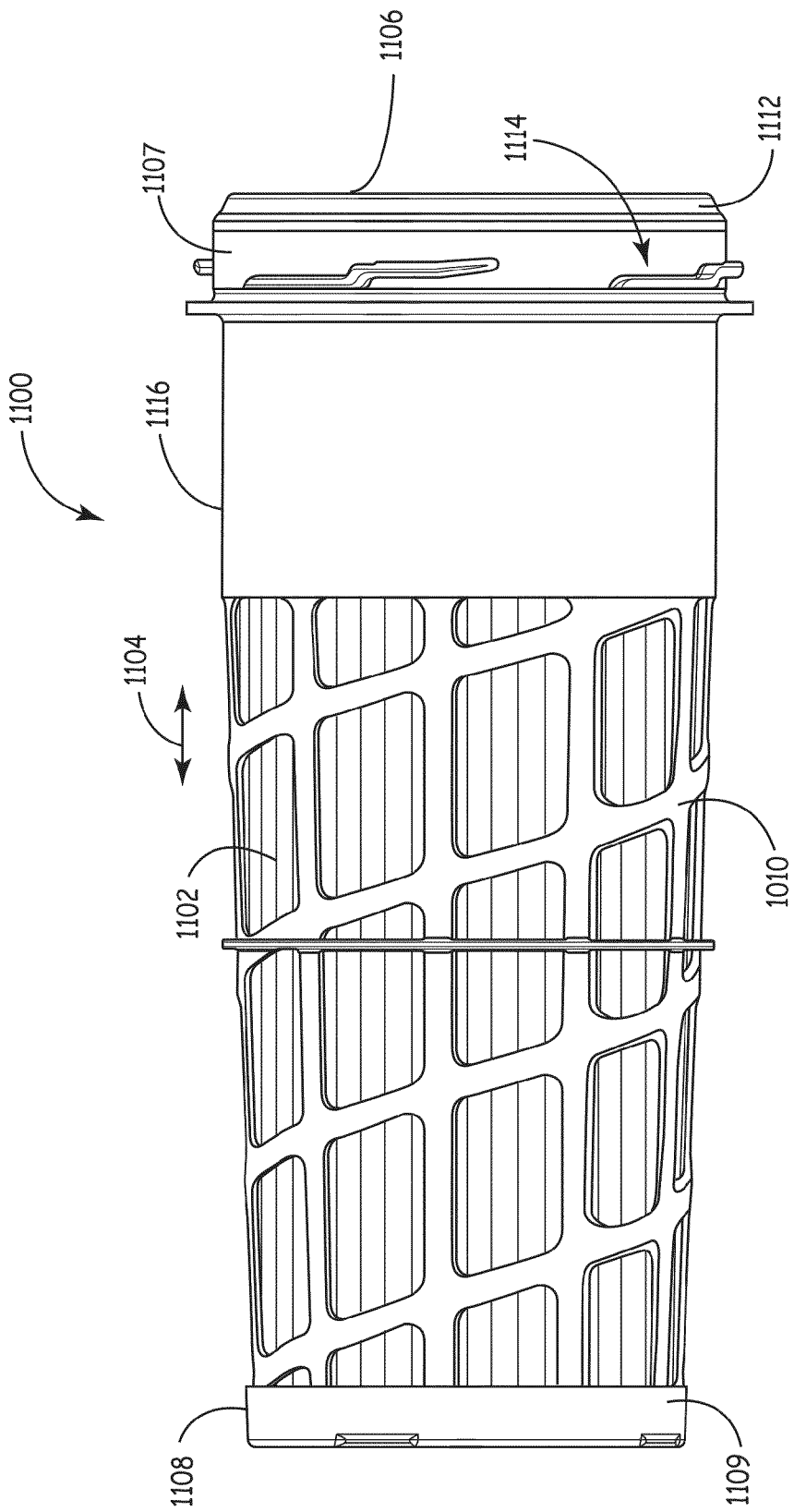
FIG. 34 is a schematic side elevation view of one type of a conical filter element.

An arrangement such as that depicted in FIGS. 32 and 33 are sometimes referenced herein as a "cylindrical arrangement," using "cylindrically configured" media, or by similar characterizations. Not all filter arrangements that utilize a tubular media are configured as cylinders. An example of this is illustrated in FIG. 34. Referring to FIG. 34, a filter arrangement 1100 comprises extension of media 1102 which is pleated, with pleat direction extending in the directions of arrow 1004. Filter arrangement 1100 is somewhat conical having a wide end 1106 and a narrow end 1108. At wide end 1106 is positioned an end cap 1107, and at narrow end 1108 is positioned an end cap 1109. As with the cylindrical arrangement, a variety of open and closed end caps can be used. For the specific example depicted, end cap 1107 is open and end cap 1108 is closed.

Filter arrangement 1100 includes outer support screen 1010 extending between end cap 1107 and 1009. The particular arrangement 1100 includes no inner support screen although one could be used. The filter element 1100 includes a seal arrangement 1112, in this instance an axial seal, although an inside or outside radial seal is possible. Element 1100 includes a non-continuously threaded mounting arrangement, 1114, for mounting a housing. The arrangement 1100 is generally described in detail in PCT/US2003/33952 filed Oct. 23, 2003, incorporated herein by reference.

Alternative configurations for media pleat packs and filter elements are possible, such as those taught in published U.S. Patent Application No. 20070209343 entitled "Filter Assembly with Pleated Media Pockets and Methods (Ser. No. 11/683,287), assigned to Donaldson Company Inc., and incorporated herein by reference in its entirety.

The filter elements can be utilized in various housing arrangements, and the filter elements can be replaced or cleaned or refurbished periodically, as desired. Cleaning can comprise, for example, mechanical cleaning, pulse cleaning, or reverse fluid flow cleaning. In the case of air filtration, the housing can be provided as part of an air cleaner for various air cleaning or processing applications including engine air intake, turbine intake, dust collection, and heating and air conditioning. In the case of liquid filtration, the housing can be part of a liquid cleaner for cleaning or processing, for example, water, oil, fuel, and hydraulic fluid.

The above specification provides a complete description of the present invention. Since many embodiments of the invention can be made without departing from the spirit and scope of the invention, the invention resides in the claims hereinafter appended.

I claim:

1. A pleated filtration media pack comprising:
    (a) filtration media having a first set of pleat folds forming a first face of the media pack and a second set of pleat folds forming a second face of the media pack, such that the filtration media extends between the first set of pleat folds and the second set of pleat folds in a back and forth arrangement; and
    (b) a plurality of flutes formed in the filtration media, said flutes having a length extending between the first and second faces of the media pack;
    wherein at least a portion of the plurality of flutes demonstrate a taper from the first face of the media pack to the second face of the media pack; and wherein the portion of the plurality of flutes demonstrating a taper have a taper in cross sectional area and a substantially uniform height from the first face of the media pack to the second face of the media pack; and wherein each flute has a flute width $D1$ and a media length along each flute width $D2$, wherein $D1$ and $D2$ remain constant along the length of the flute; wherein at least 25% of the flutes in the pleated filtration media pack comprise at least one ridge between adjacent flute peaks and extending along at least 25% of the flute length between the first set of pleat folds and the second set of pleat folds, where each ridge is a line of intersection between differently-sloped media portions; and wherein the flute profiles define the first set of pleat folds and the second set of pleat folds.

2. The pleated filtration media pack of claim 1, wherein the portion of the plurality of flutes demonstrating a taper have a substantially uniform taper from the first face to the second face of the media pack.

3. The pleated filtration media pack of claim 1, wherein the portion of the plurality of flutes demonstrating a taper have a taper in cross sectional area and a substantially uniform width from the first face of the media pack to the second face of the media pack.

4. The pleated filtration media pack of claim 1, wherein the filtration media comprises greater than 90 percent cellulose fibers by weight of the fibers in the filtration media.

5. The pleated filtration media pack of claim 1, wherein the filtration media has a dry stretch rupture threshold of less than 10 percent.

6. A pleated filtration media pack according to claim 1, wherein the filtration media exhibits a media volume asymmetry of at least 10%.

7. A pleated filtration media pack according to claim 1, wherein the flutes exhibit a width to height aspect ratio range of 4 to 8.

8. A pleated filtration media pack according to claim 1, wherein the flutes have a media cord percentage of at least 1%.

9. A pleated filtration media pack according to claim 1, wherein the flutes exhibit a $D2/D1$ value of at least 1.1.

10. A pleated filtration media pack according to claim 1, wherein at least 25% of the flutes in the pleated filtration media pack comprise at least two ridges between adjacent flute peaks.

11. A pleated filtration media pack according to claim 10, wherein the ridges are non-parallel to one another.

12. A pleated filtration media pack comprising:
(a) filtration media having a first set of pleat folds forming a first face of the media pack and a second set of pleat folds forming a second face of the media pack, such that the filtration media extends between the first set of pleat folds and the second set of pleat folds in a back and forth arrangement to define pleats defining a length extending from the first face to the second face and a width perpendicular to the length; and
(b) a plurality of flutes formed in the filtration media, said flutes extending between the first and second faces of the media pack;
wherein at least a portion of the plurality of flutes demonstrate a taper from the first face of the media pack to the second face of the media pack and wherein the length of the media defining each of the first set of pleat folds, each of the second set of pleat folds, and the width of each of the pleats from the first face to the second face of the media pack are equal.

13. The pleated filtration media pack of claim 12, wherein the filtration media comprises at least 90 percent cellulose fibers by weight of the fibers in the filtration media.

14. The pleated filtration media pack of claim 12, wherein the filtration media has a dry stretch rupture threshold of less than 10 percent.

15. A pleated filtration media pack according to claim 12, wherein the filtration media exhibits a media volume asymmetry of at least 10%.

16. A pleated filtration media pack according to claim 12, at least one of the plurality of flutes comprises a peak with a tip formed therein such that the tip extends beyond the general profile of the flute.

17. A pleated filtration media pack according to claim 12 wherein at least 25% of the flutes in the pleated filtration media pack comprise at least two ridges between adjacent flute peaks, wherein each ridge is a discontinuity in the curvature of the flute.

18. A pleated filtration media pack comprising:
(a) filtration media having a first set of pleat folds forming a first face of the media pack and a second set of pleat folds forming a second face of the media pack, such that the filtration media extends between the first set of pleat folds and the second set of pleat folds in a back and forth arrangement; and
(b) a plurality of flutes formed in the filtration media, said flutes extending between the first and second faces of the media pack;
wherein at least a portion of the plurality of flutes demonstrate a taper from the first face of the media pack to the second face of the media pack, wherein less than 10 percent of the media in the media pack is masked by other media in the media pack, and wherein each flute has a flute width D1 and a media length along each flute width D2, wherein D1 and D2 remain constant along the length of the flute, and wherein the flute profiles define the first set of pleat folds and the second set of pleat folds.

19. The pleated filtration media pack of claim 18, wherein the filtration media has a dry stretch rupture threshold of less than 10 percent.

20. A pleated filtration media pack according to claim 18, wherein the filtration media exhibits a media volume asymmetry of at least 10%.

21. A pleated filtration media pack according to claim 18, wherein the filtration media exhibits a media volume asymmetry of at least 50%.

22. A pleated filtration media pack according to claim 18 wherein at least 25% of the flutes in the pleated filtration media pack comprise at least two ridges between adjacent flute peaks, wherein each ridge is a discontinuity in the curvature of the flute.

23. A pleated filtration media pack according to claim 22, wherein the ridges are non-parallel to one another.

24. The pleated filtration media pack of claim 1, wherein the filtration media has at least one cross section wherein the flutes have a media cross-sectional area asymmetry greater than 50%.

25. A pleated filtration media pack according to claim 12, wherein the flutes exhibit a width to height aspect ratio range of 4 to 8.

26. A pleated filtration media pack according to claim 18, wherein the flutes extend at an angle of about 60 degrees to about 110 degrees relative to one of the first face or the second face.

* * * * *